United States Patent

Taylor

[15] 3,700,866

[45] Oct. 24, 1972

[54] SYNTHESIZED CASCADED PROCESSOR SYSTEM

[72] Inventor: Fredrick J. Taylor, El Paso, Tex.

[73] Assignee: Texas Instruments Incorporated, Dallas, Tex.

[22] Filed: Oct. 28, 1970

[21] Appl. No.: 84,858

[52] U.S. Cl. .................235/150.1, 340/172.5, 444/1

[51] Int. Cl..............................................G06f 15/18

[58] Field of Search...235/150.1; 340/146.3 T, 172.5

[56] References Cited

UNITED STATES PATENTS 3,358,271 12/1967 Marcus et al...........340/172.5

*Primary Examiner*—Eugene G. Botz
*Attorney*—Harold Levine, James O. Dixon, Andrew M. Hassell, Melvin Sharp, Rene' E. Grossman and James T. Comfort

[57] ABSTRACT

A single trainable nonlinear processor is trained with a single pass of training data through such processor. The single processor is then converted into a system of cascaded processors. In an execution mode of operation, each processor of the synthesized nonlinear cascaded processor system generates a probabilistic signal for the next processor in the cascade which is a best estimate for that processor of some desired response. The last processor in the cascade thereby provides a minimum entropy or minimum uncertainty actual output signal which most closely approximates a desired response for the total system to any input signal introduced into the system. The system is particularly useful for identification, classification, filtering, smoothing, prediction and modeling.

47 Claims, 57 Drawing Figures

Figures 1A, 1B, 1C:
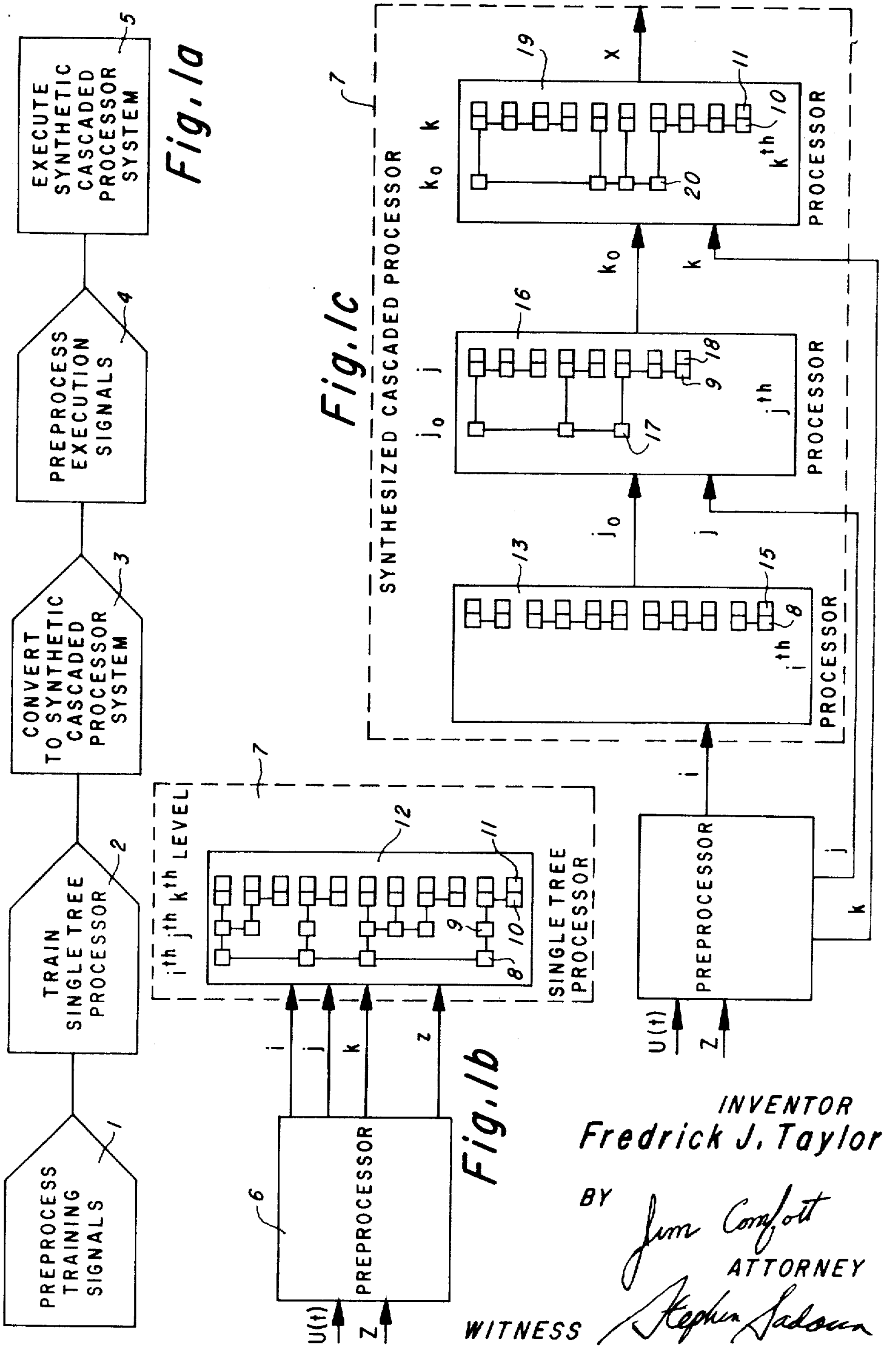

INVENTOR
Fredrick J. Taylor
BY Jim Comfort
ATTORNEY
WITNESS Stephen Sadoun

SYNTHESIZED CASCADED PROCESSOR SYSTEM

This invention relates to trainable nonlinear processor methods and systems for identification, classification, filtering, smoothing, prediction and modeling, and more particularly, to a system in which a plurality of nonlinear processors are synthetically cascaded to produce a minimum entropy or minimum uncertainty actual output signal most closely approximating a desired response for any input signal introduced into the cascaded processors after a training phase has been completed.

This invention further relates to the nonlinear processors disclosed in Bose, U.S. Pat. No. 3,265,870, which represents an application of the nonlinear theory discussed by Norbert Wiener in his work entitled Fourier Integral and Certain of Its Applications, 1933, Dover Publications, Inc., and to the trainable signal processor systems described in co-pending patent application, Ser. No. 732,152 for "Feedback Minimized Optimum Filters and Predictors," filed on May 27, 1968 and in co-pending patent application, Ser. No. 052,611 for "-Trainable System of Cascaded Processors," filed on July 6, 1970, all assigned to the assignee of the present invention.

Nonlinear processors are generally employed for identification, classification, filtering, smoothing, prediction and modeling where the characteristics of a signal or noise are nongaussian, where it is necessary to remove nonlinear distortions, or where a nonlinear response is desired (e.g., classification). It is important to note at the onset that linear behavior is not excluded. In fact, the nonlinear processor will adapt to a linear configuration whenever the latter is truly optimal (e.g., in the case of estimating a signal in the presence of additive Gaussian noise). Linear behavior implies that the law of superposition is valid. That is, if inputs $u(t)$ and $v(t)$ produce responses $x(t)$ and $y(t)$, respectively, then input $\alpha u(t) + \beta v(t)$, where $\alpha$ and $\beta$ are scalers, will produce output $\alpha x(t) + \beta y(t)$. Conversely, the failure of superposition implies nonlinear behavior. For the most part however, the optimum processor will be nonlinear. One reason is that linear processors are unable to utilize any a priori information regarding the amplitude characteristics of the signal or noise. Another is that they are unable to remove nonlinear distortions, or provide nonlinear responses to the signal. Stated differently, the law of superposition implies that linear processors can separate signals only on the basis of their power spectral density function, calculable from second-order statistics, whereas nonlinear processors can make use of higher-order statistics. Thus, while a linear processor would be worthless in separating signals with proportional power spectra, a proper nonlinear processor could be very effective.

A trainable processor is a device or system capable of receiving and digesting information in a training mode of operation and subsequently operating on additional information in an execution mode of operation in the manner determined or learned during training.

The process of receiving and digesting information comprise the training mode of operation. Training is accomplished by subjecting the processor to typical input signals together with desired response or desired output to those signals. The input and desired output signals used to train the processor are called training functions. During training the processor determines and stores cause-effect relationships between input signals and corresponding desired outputs. The cause-effection relationships determined during training are called trained responses.

The post training process of receiving additional information via input signals and operating on it in some desired manner to perform useful tasks is called execution. More explicitly, for the system considered herein, one purpose of execution is to produce from the input signal an output, called the actual output, which is the best, or optimal, estimate of the desired output signal. There are a number of useful criteria defining "optimal estimate." One is minimum mean squared error between desired and actual output signals. Another, particularly useful in classification applications, is minimum probability of error.

The synthesized cascaded nonlinear processor of the present invention may either of the Bose type or the feedback type described in patent application, Ser. No. 732,152, referenced above. For convenience, however, the processors described herein will be of the former type.

In a system identification problem, it is desired to determine a working model which has the same input-output relationship as the system being identified, hereafter called the plant. In identification the same input is introduced into the synthesized cascaded processor system and the plant during training. In addition, the output of the plant is fed into the synthesized cascaded processor system as the desired output. Thus, in an execution mode of operation, the actual output of the synthesized cascaded processor system is a minimum entropy approximation of the output which would have been obtained from the plant had the same input signal been applied to it.

Knowing how it is desired to have a plant operate, in a control problem, it is desired to fabricate a control system which will operate the plant in that desired fashion. Thus, in operation, the desired output is fed into the controller, the output of the controller is fed into the plant to obtain an actual output from the plant corresponding to the desired output. In general terms, the inverse $S^{-1}$ of a system S has the property that, when cascaded with the system, the output of the cascaded combination is equal to the input. This is precisely what is required of the controller. An important property of $S^{-1}$, when it exists is that it commutes with S, that is, the order of the cascaded combination is immaterial. This allows the controller to be determined as follows. The input to the plant is the same as the desired output signal fed into the synthesized cascaded processor system during training. The input to the synthesized cascaded processor system then becomes the output of the plant, and the synthesized cascaded processor system is required to estimate the input to the plant from its output. The synthesized cascaded processor system now meets the definition of the inverse of the plant and by the commutivity property, may be installed as the controller.

Filtering is of importance in communication systems, tracking of airborne vehicles, navigation, secure communications, and many other applications. The objective is to estimate the present value of a signal from an input which is a function of both signal and noise. In this problem then, a signal without the noise is introduced into the synthesized cascaded processor system as the desired output while the input to the synthesized cascaded processor system is the same signal combined with noise. The actual output of the synthesized cascaded processor system during an execution phase is then a minimum entropy approximation of the signal with the noise removed.

Smoothing finds wide use in trajectory analysis, instrumentation, and in the estimation of an originating event from succeeding events (e.g., the estimation of the firing site of a mortar from radar tracking data of shell trajectory). It differs from filtering in that the objective is to estimate a past value of the signal from the input rather than the current value. Thus, the training phase for smoothing is the same as that of filtering except that now a pure time delay is required between the signal and the desired output being fed into the synthesized cascaded processor system. The desired output at time $t$ is signal $s(t-\Delta)$. The delay time delta ($\Delta$) may be fixed or variable. As an illustration of a variable delay, $\Delta=t$ yields an estimate of the initial value of the signal which then becomes more refined as additional data is used. This technique would be utilized in the mortar firing site detection problem mentioned above.

To realize the potential importance of prediction, one need only consider the stock market, the weather, the economic and political trends of a country, inventory levels or the consumption of natural resources. To obtain the minimum entropy predictor, the synthesized cascaded processor system is trained in much the same manner as for filtering. In this case, however, a future, rather than a current value of the signal is to be estimated from the input. Therefore, a pure time advance between the input signal and desired output being fed into the synthesized cascaded processor system is indicated. But, as a pure time advance is physically unrealizable, it is necessary to use an alternate approach: The desired result can be achieved by delaying the input to the synthesized cascaded processor system relative to an undelayed signal employed as the desired output signal. The prediction estimator can be updated continually with future events, as such events become present events. The output of the predictor is a minimal entropy estimate of $s(t+\Delta)$, where, in analogy to smoothing, the lead time $\Delta$ can be either fixed or variable. As an illustration of a variable $\Delta$, consider for example the case in which the choice $\Delta$ being equivalent to the difference between the future time and the present time yielding an estimate of $s(t+\Delta)$ which becomes more redefined as additional data becomes available (i.e., as the predicted event approaches reality).

Inasmuch as the training phase is concerned, modeling is identical to identification. The distinction between the two is made on the use of the identified model. In modeling, the primary purpose is to gain analytical insight into the process being studied. This insight can be derived in several ways. One is to ascertain the critical inputs. To do this, one can hypothesize that certain inputs to the system being modeled are critical to the certain outputs of interest. By using the synthesized cascaded processor system to identify the process while employing these inputs and outputs as training functions, the hypothesis can be tested. If the identification succeeds as measured by execution, the hypothesis is proven. If the identification yields a poor representation of the physical system as measured by execution, a poor (or incomplete) selection of inputs is indicated. Another way is to assume that certain inputs and outputs act independently. This assumption can be forced upon the synthesized cascaded processor system; again, successful identification would be the measure of the correctness of the hypothesis. Still another way is to assume that the other system can be described by a differential equation of order less than a certain preassigned value. This constrain can be forced on the nonlinear entropy system and the hypothesis tested as before. Once a satisfactory model has been obtained through identification, it is possible to obtain a mathematical description of the system by "looking into the black box" defining the adapted nonlinear entropy system.

The practical applications of modeling are vast and include the study of mechanical systems such as airframe or satellite configurations as well as chemical processes, weather models, diurnal effects on communication channels, and cause-effect functional relationships implicit in health survey data. Even the modeling of complex political and economic systems is possible.

Classification differs from filtering in that the objective is not to recover the signal but to derive a decision based on the estimated signal. Thus, the signal and desired output of the synthesized cascaded processor system will not be proportional, but rather, the output will be some discrete valued function of the signal representing the class to which it belongs. In the problem of alpha-numeric character recognition, for example, the input signal might correspond to the class of video signals obtained from a scan of the character which assumes various physical orientations. In addition, during training, the desired output is an identification code designating the alpha-numeric character to which the video signal corresponds (A,B,C...1,2,3, etc.). Therefore, the actual output, during execution, is a minimum entropy estimate of the character represented by the video signal at the input.

Speech (verbal word) recognition or interpretation is a classification problem of considerable importance. The synthesized cascaded processor system operates on an analog speech input (which may be preprocessed into digital form) to produce a series of outputs which constitute a code identifying the particular word which has been spoken. This code could be used as an input to a computer thereby greatly enhancing man-computer communications. Language translation is another closely related problem. For example, the time sequence constituting the input language could be classified and converted into a time sequence of code symbols which designates the meaning of the sequence of words in the output language.

Although other nonlinear processors generally are useful in solving the above kind of problems, a system of cascaded processors disclosed in patent application, Ser, No. 052,611, referenced above, has several advantages. Specifically, the system of cascaded processors is comprised of a series of smaller well trained nonlinear processors which interact with one another and which may be trained over a relatively short sequence of information as compared to that which is necessary for the training of one large processor. Taken another way, the system of cascaded processors will be better trained if sequences of data of the same length are applied to it as compared to a single nonlinear processor of the same capability.

Another desirable attribute of the system of cascaded processors is that it defines in a probabilistically optimum way a series of paths through a large group of processors to generate an output signal which is based on a statistically significant sample of training functions. Once a partial path is chosen through the single nonlinear processor, it is necessary to continue along a path emanating from that partial path and all future decisions must be based thereupon. This dichotomy of the input space may limit the amount of training information available for defining the subsequent path to a statistically insignificant level. When a path has been chosen through one of the cascaded processors, the choice of paths through subsequent processors may be precursed by a number of paths in that processor and thus this difficulty circumvented. In the case of an untrained path through one of the processors, that is, an input condition for which no path has previously been defined, errors resulting from the response chosen by that processor does not propagate as a component of future input signals. In fact, a valid untrained path policy is to ignore instants at which untrained paths occur; no such option exists in the case of a single feedback nonlinear processor for example. Furthermore, untrained paths are rare with the system of cascaded processors since each processor stage of the system may be less complex in nature and since the full set of training information is available for training it. That is, since each path is based on a statistically significant sample, the probability that an input condition will occur in execution which did not occur during training is small.

Put another way, the system of cascaded processors involves Markovian decision making, that is, a decision is made probabilistically at each stage considering only the information derived from an estimate made by the immediately preceding stage; a single nonlinear processor is non-Markovian in nature and makes its decisions based on all past history.

Each stage of the system of cascaded processors is feedforward, so that training of a single stage requires one pass of the training data. Therefore, the data is employed $k$ times to train all $k$ stages. The synthetic cascaded processor system disclosed herein has all of the above advantages of the system of cascaded processors and the additional distinct advantage of being trainable in a single pass of the training data through the processor rather than having to sequentially train and execute each individual processor in the cascade by a separate pass of training data.

In one embodiment of the invention, the cascaded processors are directly linked by storage in a preceding processor of the addresses of registers in the next processor. This eliminates the need for storing probabilistic signals at each previous stage and comparing those probabilistic signals at the next stage. Hence, the system requires less storage or memory registers and operates at a higher speed.

It is therefore a primary object of the present invention to synthetically provide a nonlinear system of cascaded processors which is trainable in a single pass of the training data.

Another primary object of the invention is to provide a trainable single tree structured nonlinear processor which is convertable into a nonlinear system of cascaded processors and the means and method for making such conversion.

An object of an embodiment of the invention is to provide direct register address linkage between each previous processor and each next processor in the cascade.

These and other objects and advantages are accomplished in accordance with the present invention by providing a method and system for training a single nonlinear processor on signals for which certain desired responses to these signals are known, converting the single processor into a system of cascaded processors and then solving real world problems by executing the system of cascaded processors on input signals for which desired responses are unknown. During execution, the first processor in the system of cascaded processors generates a probabilistic signal which is a best estimate of a desired response for that processor based on the information it received during training. The probabilistic signal generated by the first processor is then fed forward to a second processor in the cascade along with additional information derived from the input signal and the second processor generates a probabilistic signal which is a best estimate for that processor of a desired response. This process continues for each processor in the cascade, the last processor generating an actual output signal which is a best estimate for the system of a desired response to the input signal.

More particularly, during the training mode of operation, the signal nonlinear processor adapts to form a tree-structured memory matrix. Stored in this tree-structured matrix are both pertinent values associated with each input signal fed into the system during training and statistical data derived from the desired responses to those input signals. During the conversion step, the statistical data is utilized to rearrange the tree matrix into a plurality of individual processors, each processor corresponding to one level of the tree-structured matrix of the single nonlinear processor. This is accomplished by reconstructing the original tree-structured matrix into a new tree-structured matrix having linkages between various memory registers corresponding to the linkages between each processor in the cascade for execution. In one embodiment, the linkages are provided by direct storage of the addresses of registers in the next processor of the cascade according to the statistical data derived during training. During execution, an input signal is applied to the newly constructed tree-structured matrix, the feedforward process takes place according to the linkages set up in the new matrix and an actual output signal is generated by the system accordingly. Thus, one might consider the entropy being succeedingly decreased at each processor in the cascade as the probability of finding a correct response increases and the actual output of the last processor in the cascade, a minimum entropy approximation for the system of such correct response to the input signal applied to the system during execution.

Figure 2:
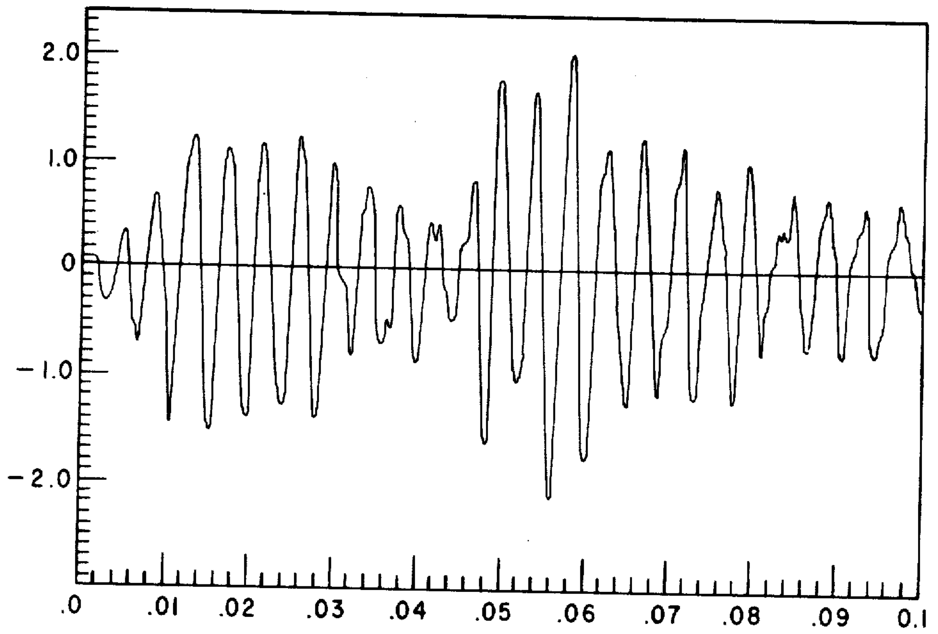
Figure 3:
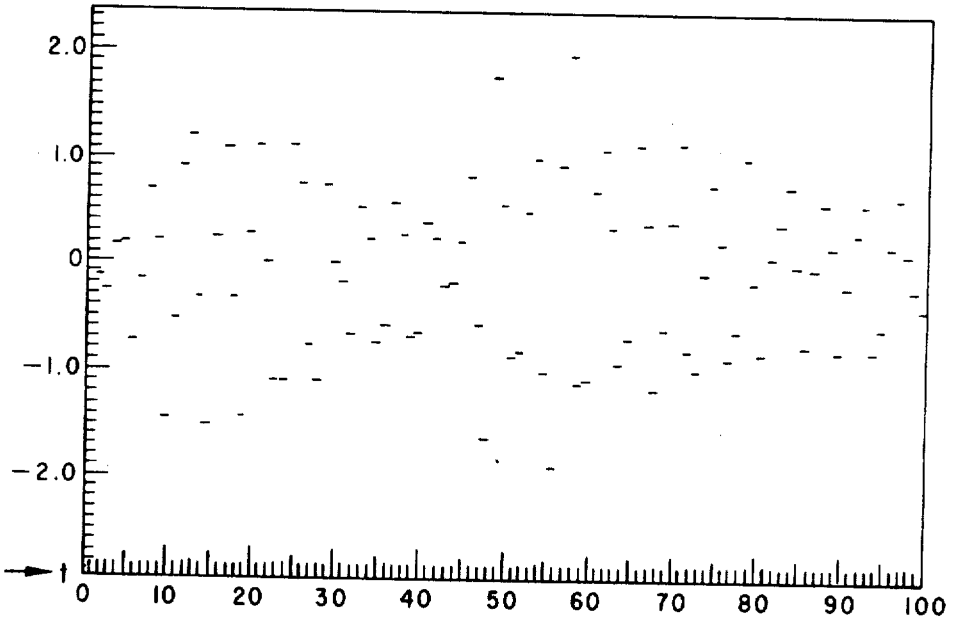
Figure 4:
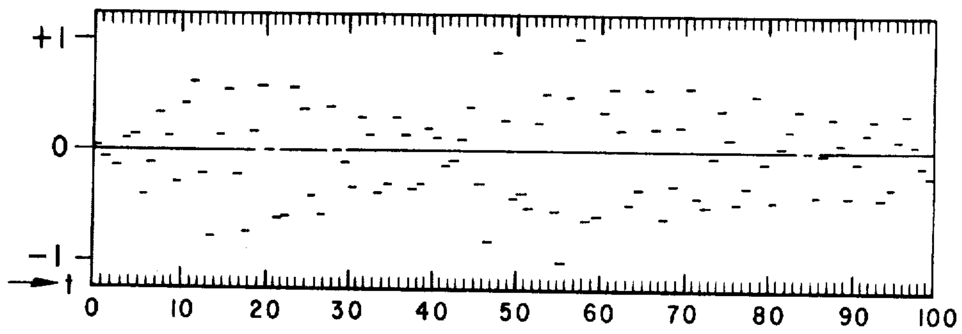
Figure 5:
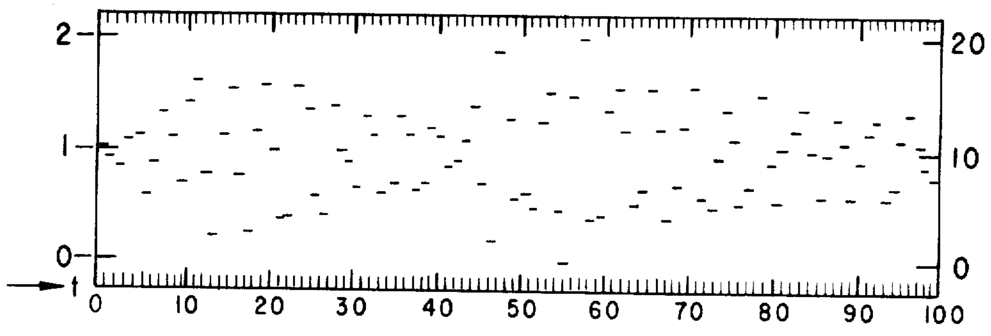
Figure 6:
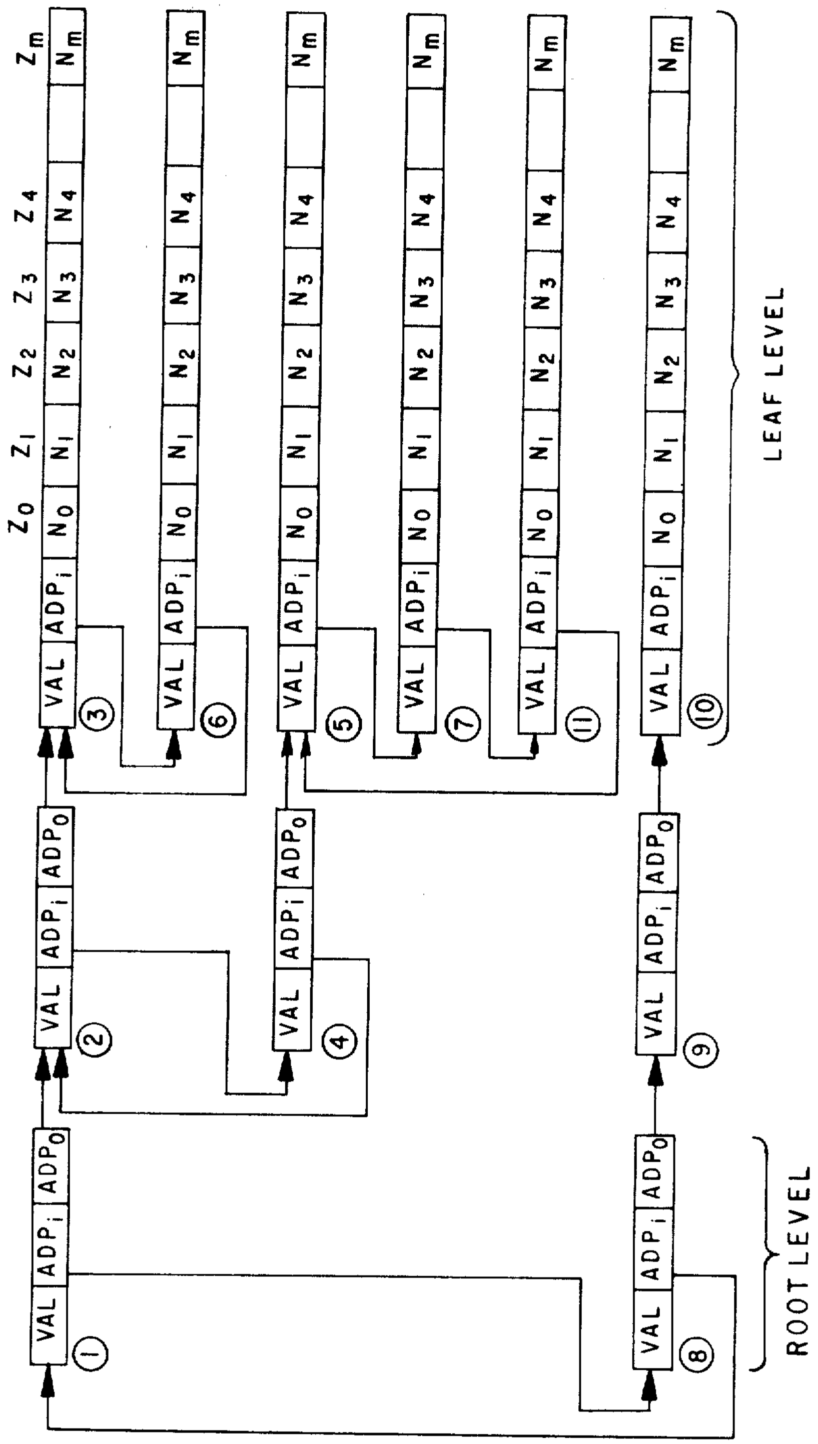
Figure 19:
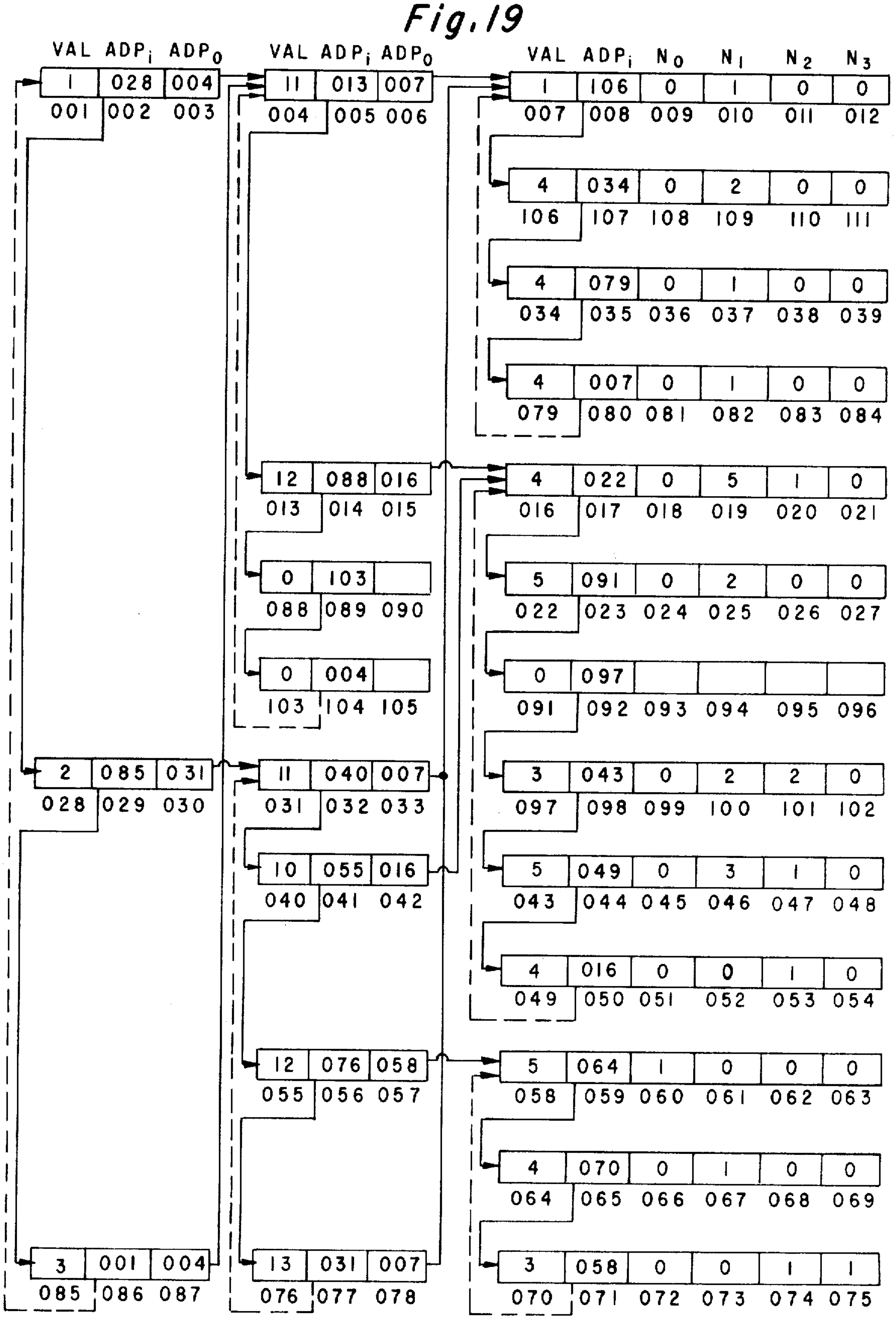
Figure 20:
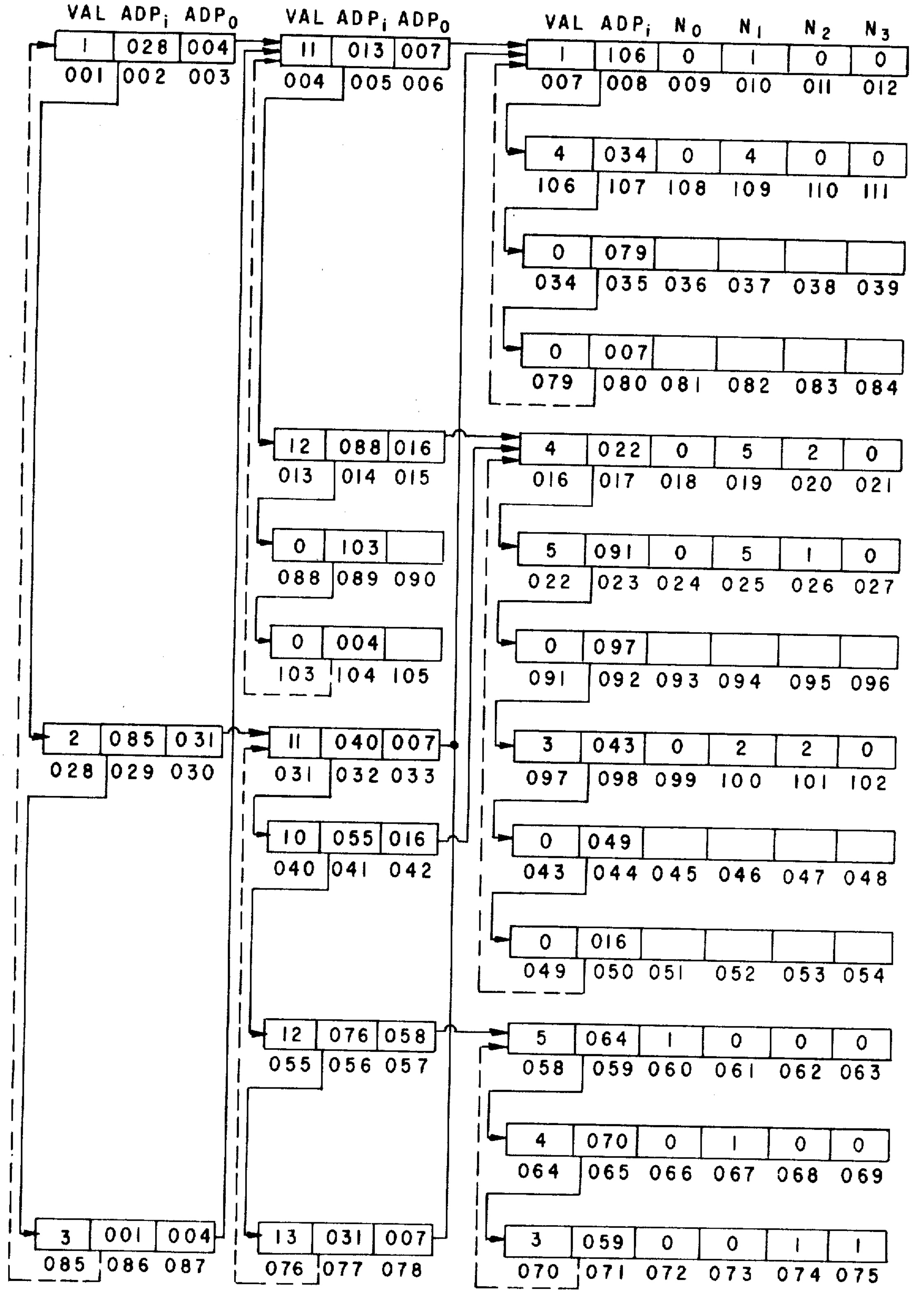
Figure 21:
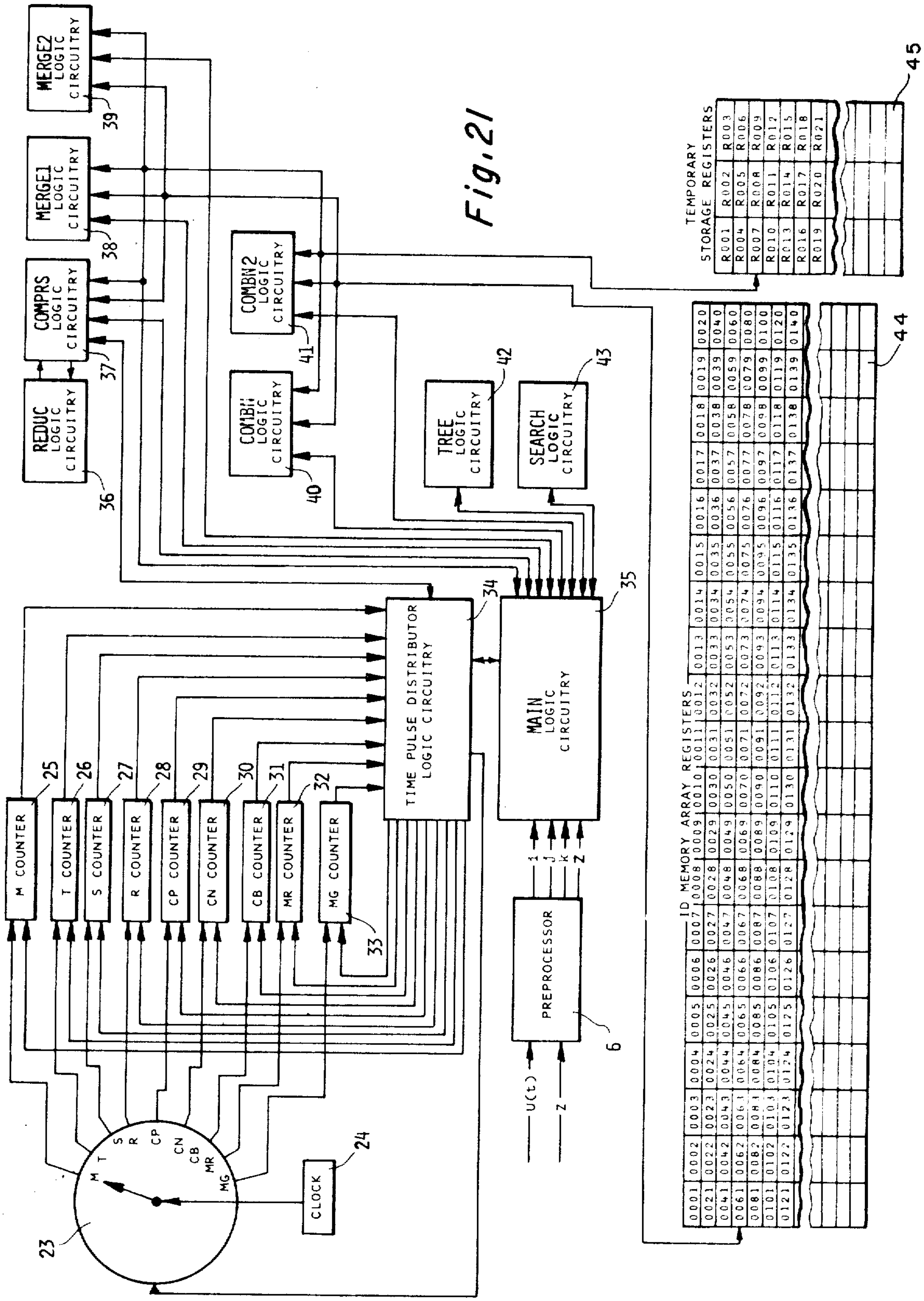
Figure 24A:
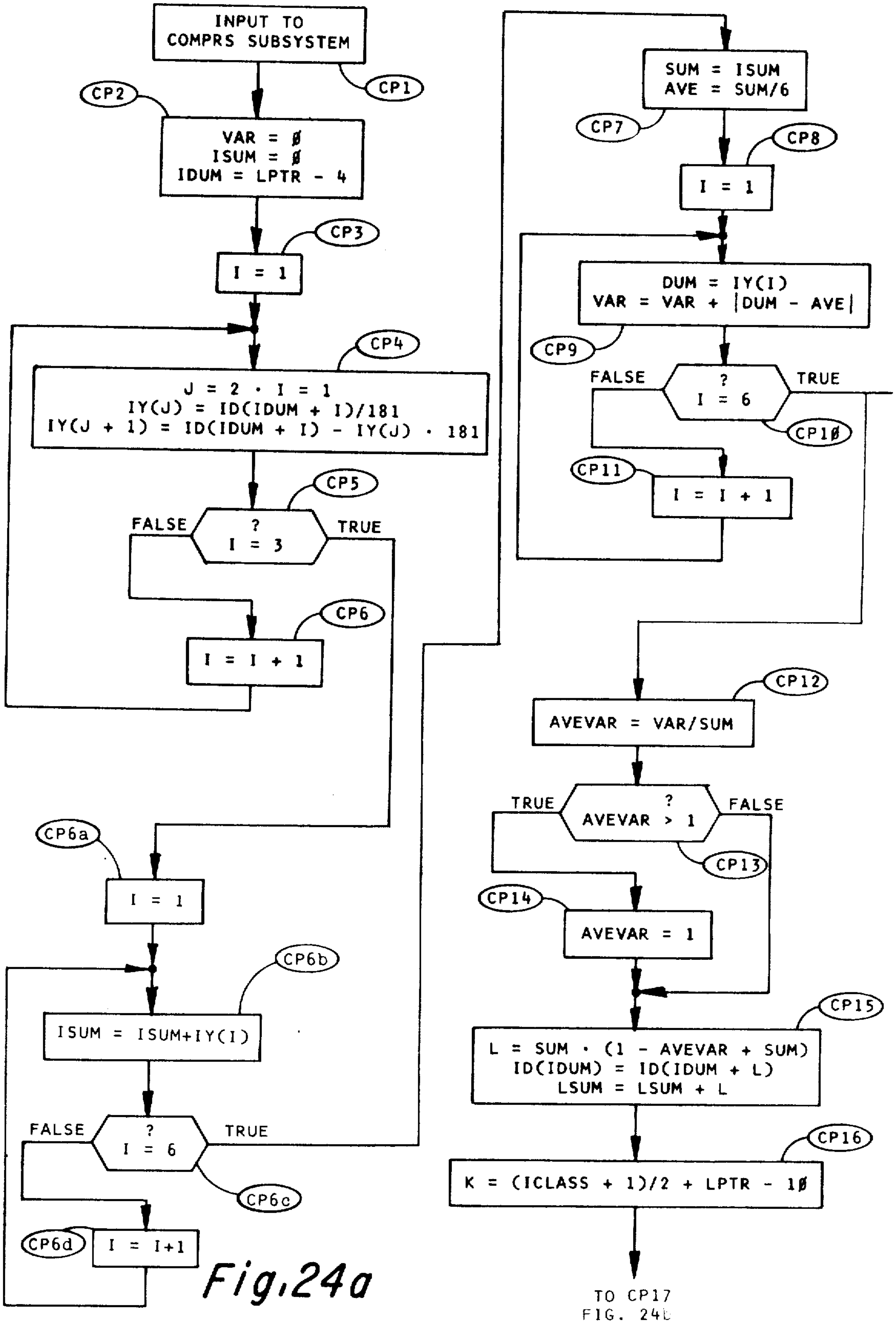
Figure 24B:
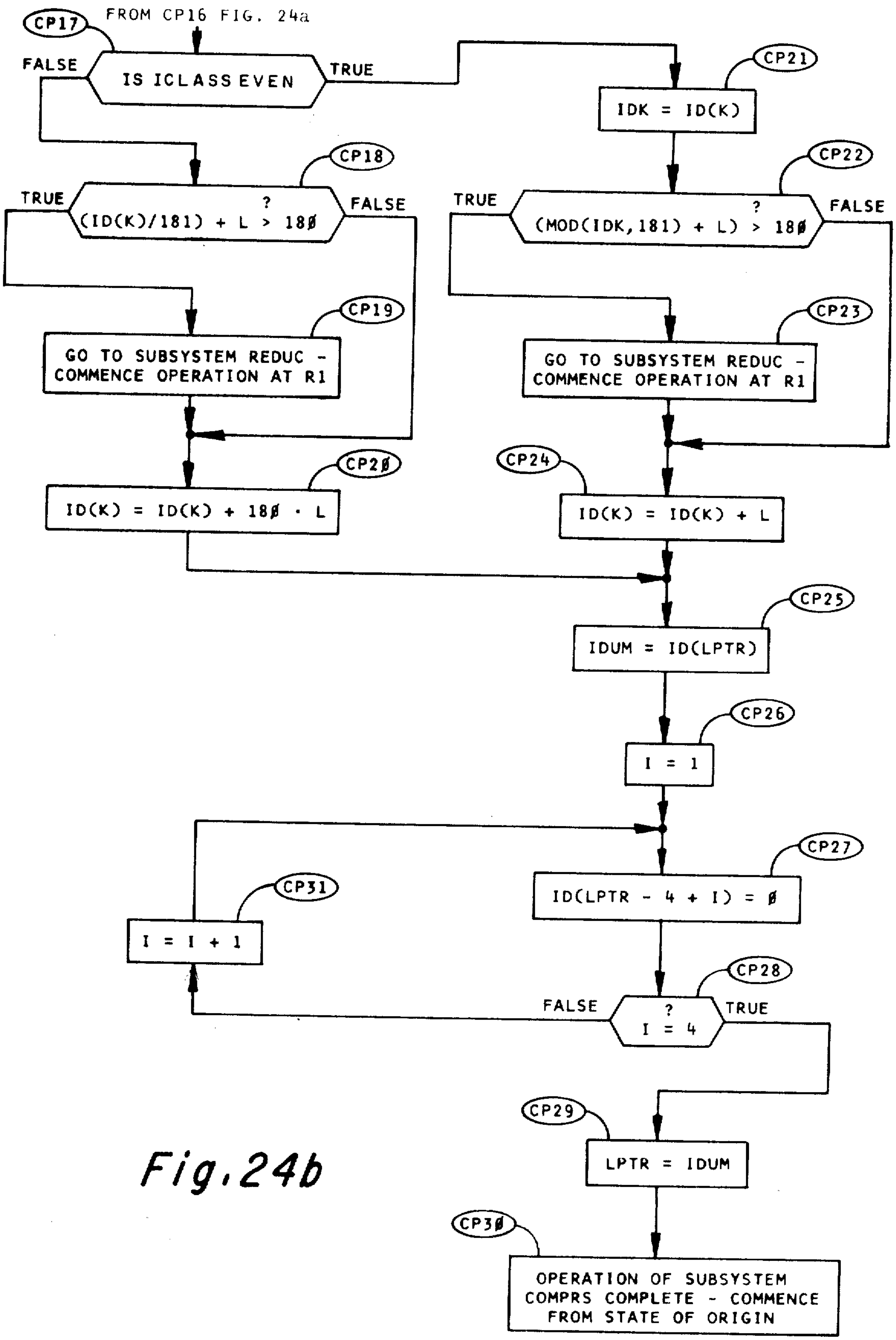
Figure 25:
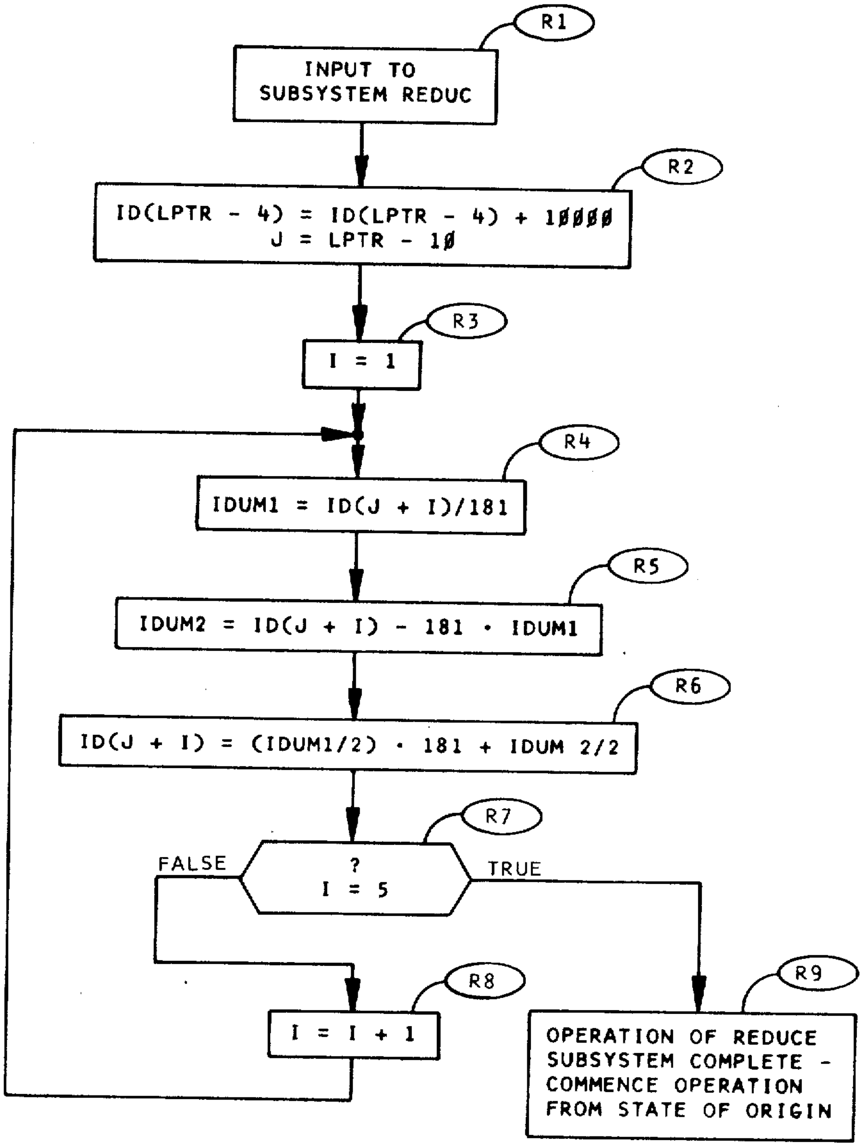
Figure 26A:
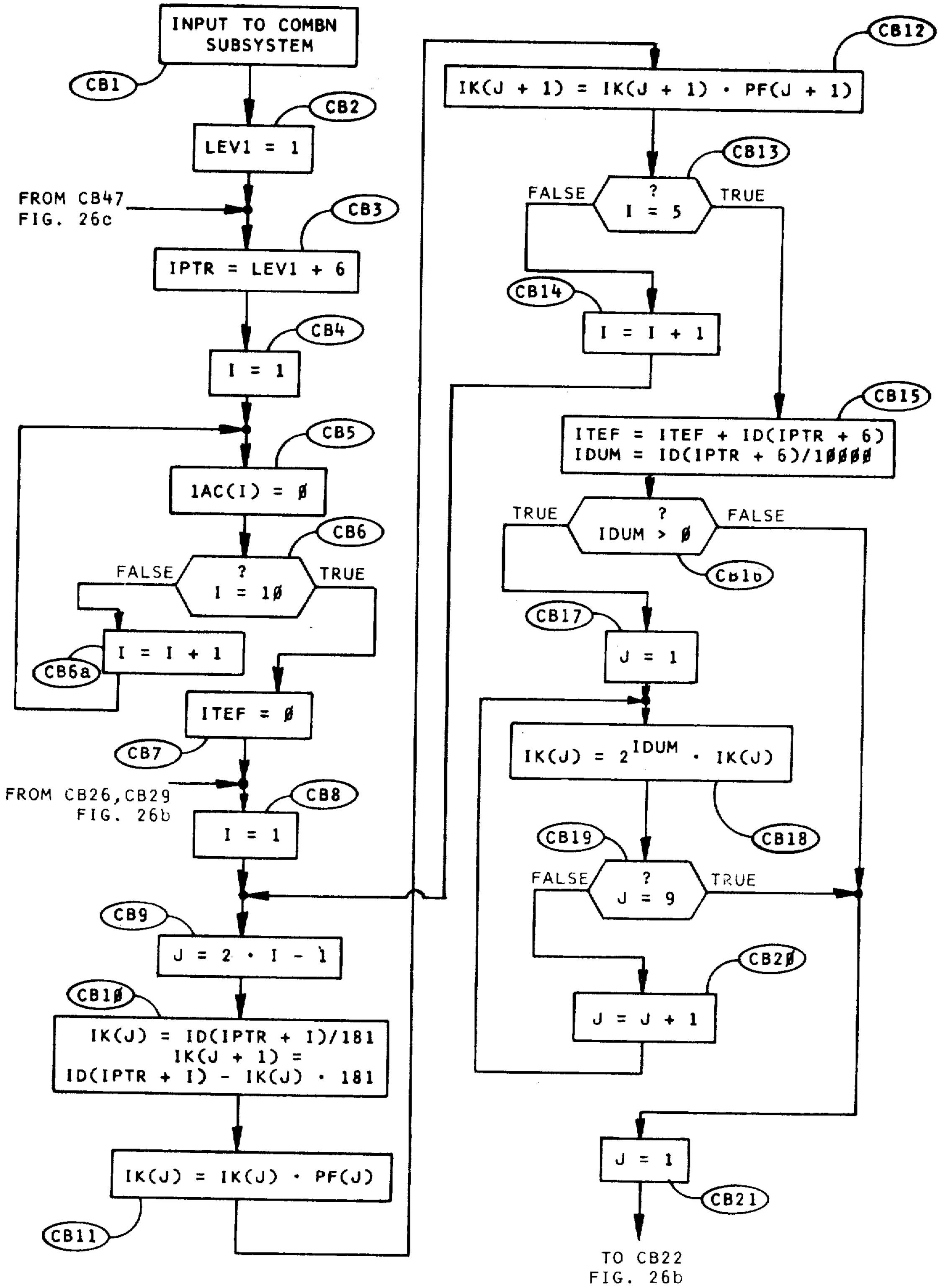
Figure 26B:
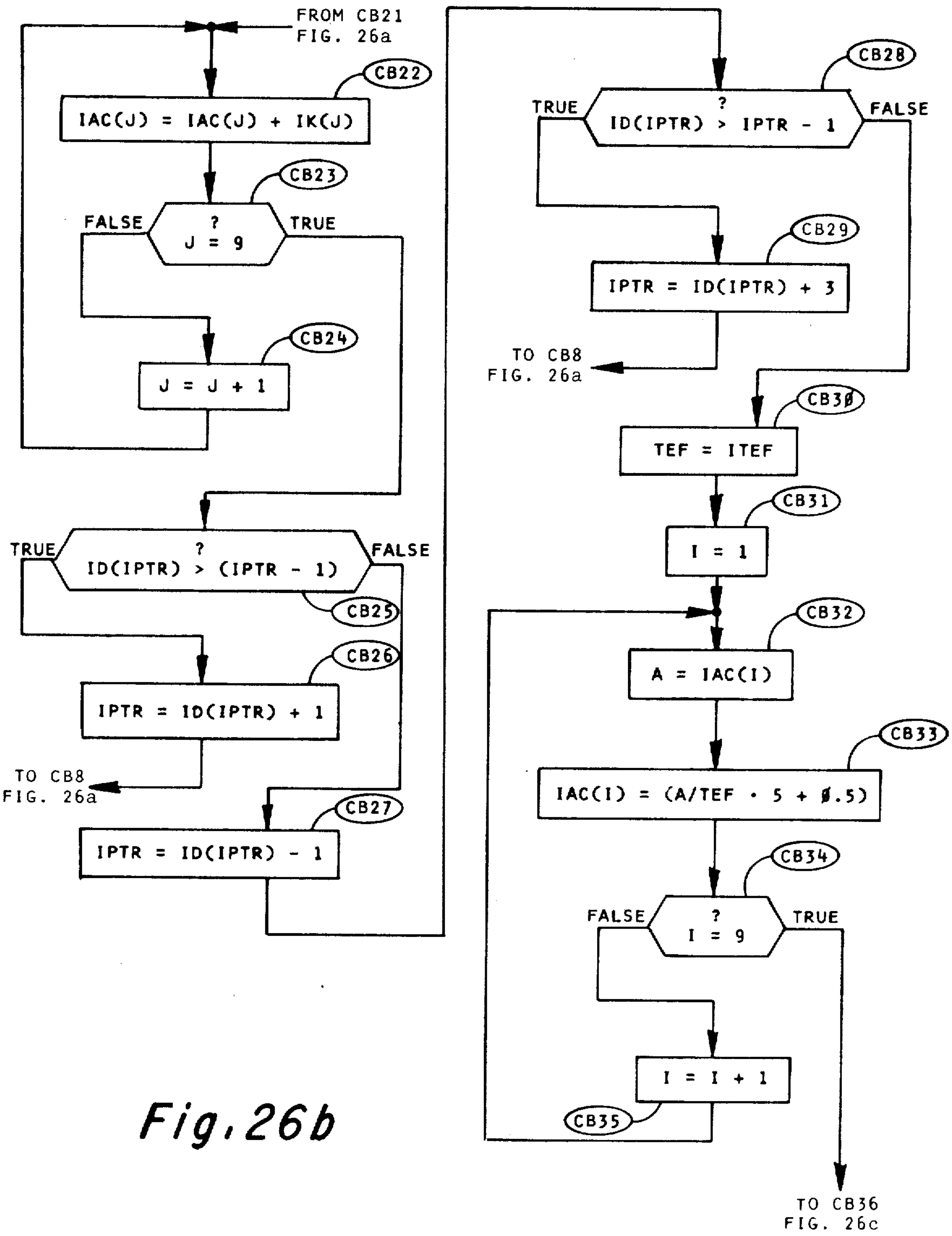
Figure 30A:
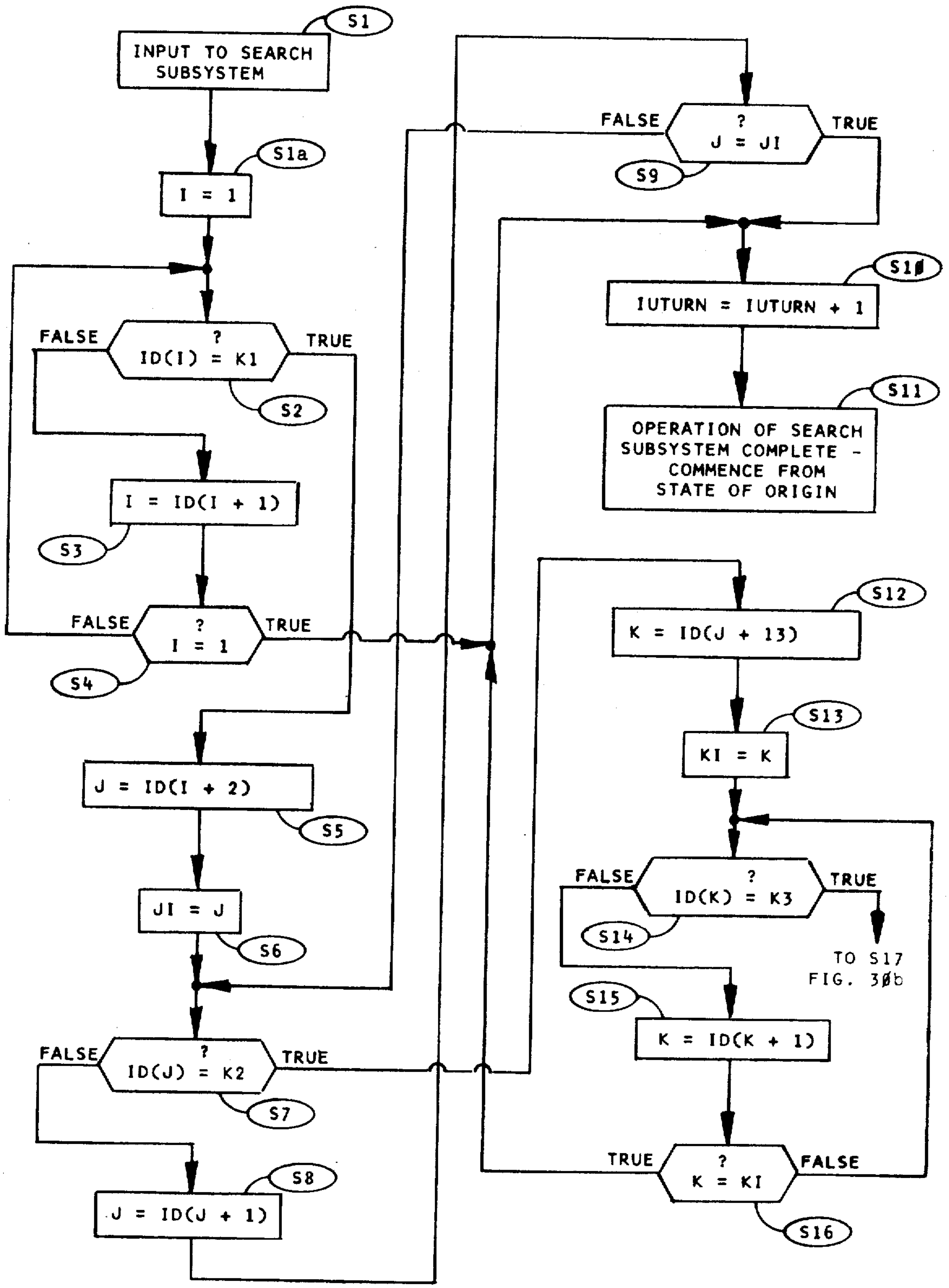
Figure 30B:
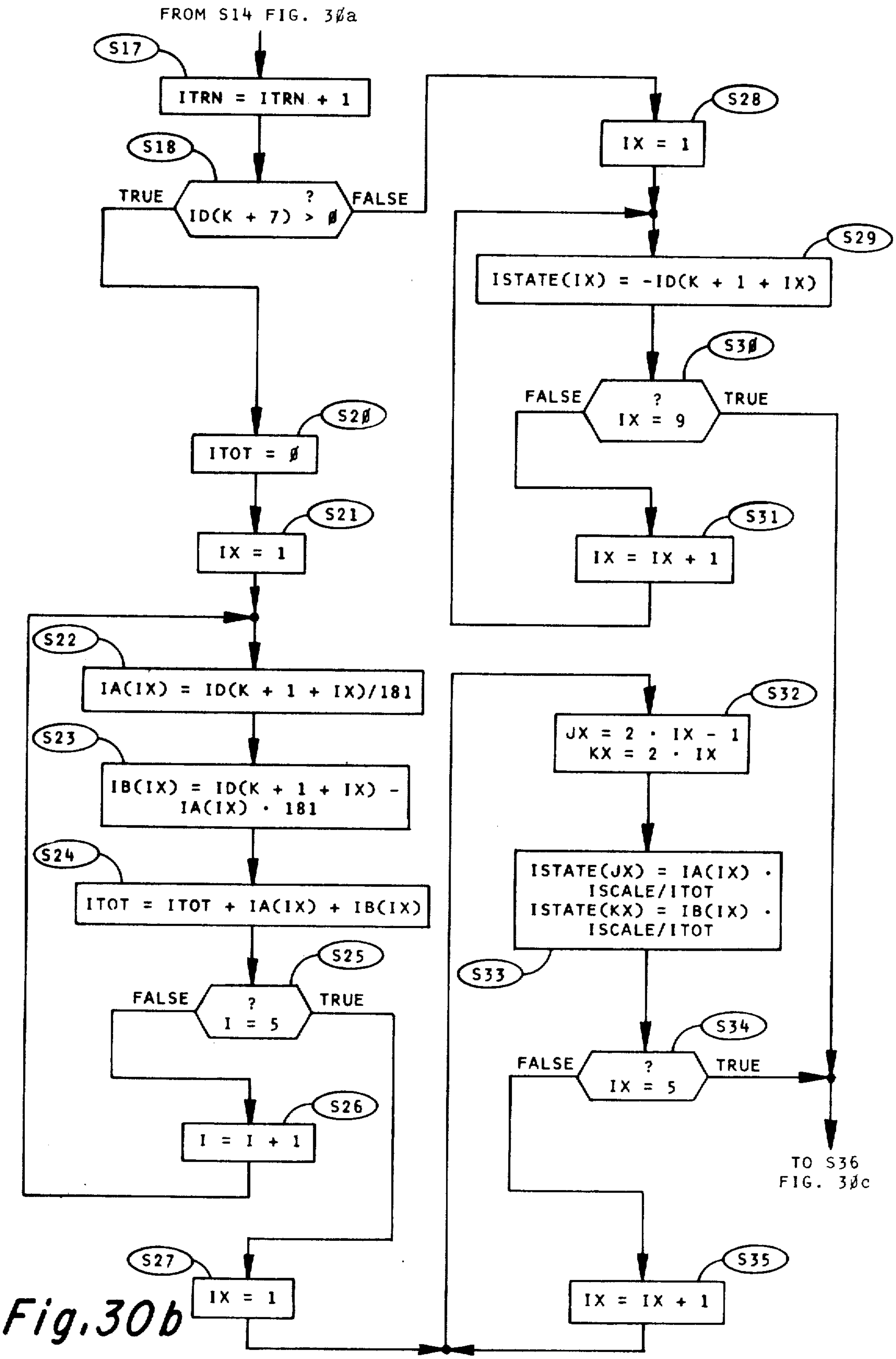
Figure 30C:
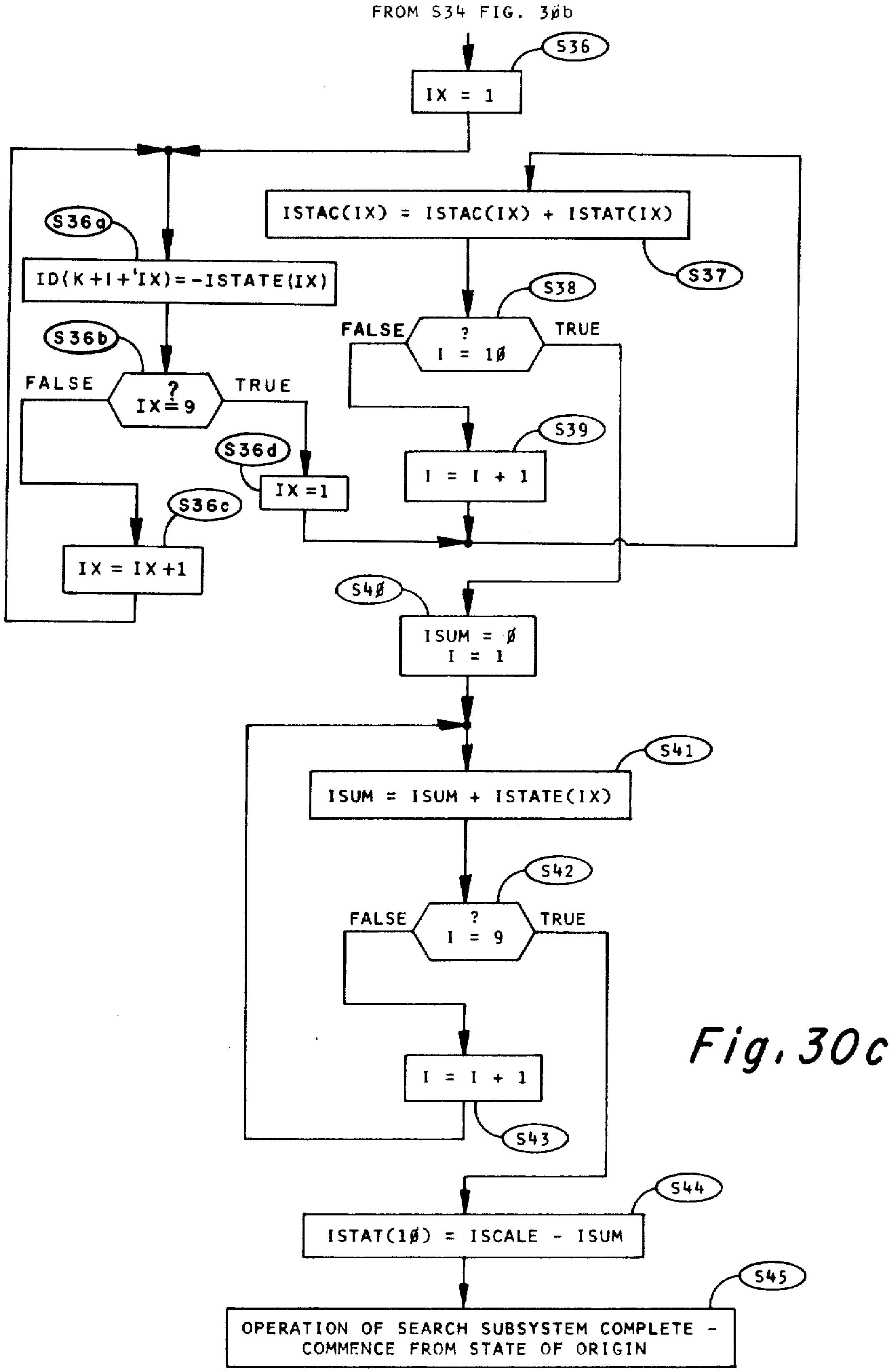

Still further objects and advantages of the invention will be apparent from the following detailed description and claims and from the accompanying drawings illustrative of the invention wherein:

FIGS. 1*a*–1 *c* illustrate generally the method and system of the invention,

FIG. 2 illustrates an example of a typical spoken word input signal for which an embodiment of the invention may be utilized to classify, FIGS. 3–5 illustrate the operation of a preprocessor in preparing the signal of FIG. 2 for the cascaded processor system, FIG. 6 illustrates, generally, an example of the internal structure of the memory matrix utilized in one embodiment of the system comprising a multi-level tree-arranged storage array, FIGS. 7–13 illustrate the formation of an example of the tree-arranged storage array utilized in an embodiment of the invention during a plurality of training cycles, FIGS. 14–20 illustrate the conversion of the tree-structured memory matrix comprising the single nonlinear processor into a system of cascaded processors including the formation of the feedforward linkages between processors, FIG. 21 illustrates one embodiment of the system of the invention which forms the tree-structured memory matrix for the single nonlinear processor during training, reforms that matrix into a new matrix in accordance with the system of cascaded processors, and then executes on input signals for which no desired response is known, FIGS. 22*a–i* are flow charts illustrating the operation of the preprocessor and MAIN subsystem logic circuitry, FIGS. 23 *a* and *b* are flow charts illustrating the operation of the preprocessor and TREE subsystem logic circuitry, FIGS. 24 *a* and *b* are flow charts illustrating the operation of the preprocessor and COMPRS subsystem logic circuitry, FIG. 25 is a flow chart illustrating the operation of the preprocessor and REDUC subsystem logic circuitry, FIGS. 26 *a–c* are flow charts illustrating the operation of the preprocessor and COMBN subsystem logic circuitry, FIGS. 27*a–d* are flow charts illustrating the operation of the preprocessor and MERGE1 subsystem logic circuitry, FIGS. 28*a–d* are flow charts illustrating the operation of the preprocessor and COMBN2 subsystem logic circuitry, FIGS. 29*a–f* are flow charts illustrating the operation of the preprocessor and MERGE2 subsystem logic circuitry, FIGS. 30*a–c* are flow charts illustrating the operation of the preprocessor and SEARCH subsystem logic circuitry.

Referring then to the drawings, in simplest form, the method of operation of the synthesized cascaded processor system of the invention is as shown in FIG. 1*a*. Step 1 of the method is to preprocess training signals to derive therefrom pertinent information which can be used to form meaningful training functions. During training, the system determines and stores cause-effect relationships between the information derived from the training signals and corresponding desired responses to the training signals. The type of information derived from the signal varies according to the eventual use of the system, and thus is selected accordingly. After the training signals have been preprocessed, step 2 is to train the system as a single tree-structured nonlinear processor. That is, the registers of a large memory array are linked together to store all of the pertinent information corresponding to the particular training signal and statistical data derived from a desired response to the training signal are stored in registers at the end of this linkage. Each input signal of a different class (depending upon the type of problem which the system is ultimately to solve during execution) follows a linkage pattern and updates a different desired response in the storage registers at the end of that linkage. A complete tree-structured storage matrix is thereby formed when all of the training signals and corresponding desired responses have been applied to the system. Next, step 3 is to synthetically convert the single nonlinear processor comprised of the tree-structured storage matrix into a system of cascaded processors. Basically, this step is accomplished by rearrangement and re-linkage of the registers in the memory array based upon the stored statistics. After the conversion has taken place, step 4 is to preprocess execution signals, that is, signals for which no desired response is known on which the system is used to solve real life problems. The signals are preprocessed in a manner identical to that of the training signals as the same pertinent information is necessary to search the converted matrix and generate a response based upon the training information now stored in the system. After the execution signals have been preprocessed, step 5 is to apply these signals to the synthetically converted system of cascaded processors. During this step, the system searches through the matrix in accordance with the linkages formed during conversion to locate a response for the system to the applied execution signal. The linkages formed during conversion allows the system to generate a first approximation based upon one piece of information derived from the input signal, then make a second better approximation based upon a second piece of information derived from the input signal, and the approximation made from the first piece of information which is transferred through the tree linkages.

The system is illustrated generally in FIG. 1*b*. An input signal $U(t)$ is introduced into preprocessor 6 along with a response Z which the system is to associate with the input signal $U(t)$. $U(t)$ is usually an analog signal such as a time function, but may be digital or binary data as well. Z is usually digital or alphanumeric information but may likewise be an analog signal. From input signal $U(t)$ the preprocessor derives a set of pertinent pieces of information ($i, j$ and $k$ illustrated in this embodiment) which are introduced into system 7.

System 7 is comprised of a plurality of storage registers where information $i$, $j$ and $k$ are stored during training. As the pieces of information are stored, the registers containing the set $\{i, j, k\}$ of the input signal are linked together in tree-structured fashion with the $i$ piece of information stored in level 8, the $j$ piece of information stored in level 9, and the $k$ piece of information stored in level 10. Once a particular $i$ value has been stored, it need not be stored again. Instead, the register which contains that same particular $i$ value is merely linked to the $j$ and $k$ values associated with the current input signal thereby linking the current $\{i, j, k\}$ set in the tree. Likewise, once a set of $i$ and $j$ values have been stored and linked together, they need not be stored again. If the $k$ value of another applied input signal has not been associated with the $\{i,j\}$ set, only the $k$ value is stored and the previously stored and linked $\{i,j\}$ set is linked to the new $k$ register. When a set of $i, j$ and $k$ values have once been applied to system 7, another identical set of $i, j$ and $k$ values need not be stored and the system will merely follow the linkage between the $i, j$ and $k$ values already stored and update the desired response statistics associated with that set in registers 11 of leaf level 10.

The actual number of pieces of information derived from the input signal and corresponding number of tree levels which are necessary to solve any given problem, is determined by the complexity of the signal $U(t)$ being operated upon and the execution accuracy desired; the only limitation being that there be at least two such pieces of information and two such tree levels. The reason for this is that the number of levels in the tree determines the number of processors which are cascaded together after the conversion takes place. All of the input signals $U(t)$ and corresponding desired responses Z upon which the system is trained are preprocessed by preprocessor 6 and utilized in forming and updating the tree-structured memory matrix of single tree processor 12 which is the resulting structure after training is complete.

As illustrated in FIG. 1c, system 7 contains logic circuitry which reorganized processor 12 to provide a plurality of cascaded processors, $i$ processor 13, $j$ processor 16 and $k$ processor 19 corresponding to $i^{th}$ level 8, $j^{th}$ level 9 and $k^{th}$ level 10 of single tree processor 12. $j_o$ is a probabilistic signal generated by $i^{th}$ processor 13 from statistics stored in registers 15 of level 8 for $j^{th}$ processor 16 and $k_o$ is a probabilistic signal generated by $j^{th}$ processor 16 from statistics stored in registers 18 of level 9 for $k^{th}$ processor 19. Registers 15 and 18 of levels 8 and 9 may contain values of probabilistic signals $j_o$ and $K_o$ which are compared with values in levels 17 and 20 of the next processor, 16 or 19 respectively, but in a preferred embodiment contain addresses of registers in next processor 16 and 19 respectively. Thus, levels 17 and 20 may be eliminated entirely. Output X from $k^{th}$ processor 19 is the output of system 7 during execution and is derived from those statistics stored in registers 11 of level 10 during training, The signal transmitted from the X output may comprise a plurality of signals, or digital or binary components of a single signal, in which case such output signal represents a set. X is the system's estimate of Z and will be referred to as the "actual output" of the system to distinguish it from the "desired output or response" Z.

As mentioned previously, the trainable system of cascaded processors is applicable to problems of classification, identification, filtering, smoothing, prediction and modeling. Since the internal structure of the system is generically identical in each instance, however, it is believed both impractical and unnecessary to discuss each and every environment in which the system may be embodied. Thus, only a classification embodiment, and more particularly, a system for verbal word recognition will be described in detail herein.

Referring then to FIG. 2, a typical verbal word pattern is illustrated graphically. The amplitude of the signal (on the vertical axis) is plotted against real time (on the horizontal axis).

The preprocessor utilized in conjunction with the present embodiment, first digitizes the analog signal by dividing the time length of the signal into a fixed number of segments $n$ (1,000, for example, although 100 are shown for purposes of illustration) and measuring the amplitude value for each of the $n$ segments as illustrated in FIG. 3. The input signal U then forms a set of n discrete amplitude values $\{U_{t_1}, U_{t_2}, U_{t_3} \ldots U_{t_{n-1}}, U_{t_n}\}$.

Next, the preprocessor is utilized to perform a threshold test on each member of the set in order to distinguish an amplitude value containing information from an amplitude value which is merely noise. Thus, when the value of any member of the set is less than a threshold value such as 0.1, for example, the signal is assumed to be only noise and such member of the set is ignored by the system. In addition, the signal amplitudes are normalized to range from values of +1 to −1 as shown in FIG. 4. This is accomplished by dividing the amplitude value of each segment by the absolute value of the segment having the greatest (either positive or negative) amplitude value. An essential feature of the normalization process is that the pattern becomes independent of the volume (decibels) at which the words are spoken. That is, if the speaker uses variable volumes in pronouncing the same word, the resulting normalized signals are approximately the same and therefore more easily recognizable.

As a next step in the operation of the preprocessor, an amplitude value of one is added to the signal so that the signal now ranges from a value of "0" to "2," as illustrated in FIG. 5, rather than from −1 to 1.

In the embodiment of the invention considered herein, the pertinent information derived from the input signal $U(t)$ by the preprocessor and transmitted to the system is the set $\{i, j, k\}$. This set will hereinafter be referred to as a key function of the signal and the components of the set $i, j$, and k will be referred to as key components. As previously mentioned, the criteria utilized in selecting the particular key components which are to be derived from a signal in training the system to solve a particular problem is dependent upon the type of problem being solved. Among the criteria which might be used are the following: one key component may be merely a digital signal which is equal to the amplitude value $U$ for each time interval $t$ normalized from 0 to 2 and thereafter quantized by the preprocessor to range, for example, from 0 to 100. A second useful criteria in selecting a key component is the root mean squared average of the signal $\sqrt{B/D}$ for an interval of D data points where B is equal to $U_{t_1}^2 + U_{t_2}^2 + U_{t_3}^2 + \ldots + U_{t_D}^2$. A third useful criteria for the value of a key component is the average rectified wave amplitude per interval of D data points which is equal to A/D where A is equal to $|U_{t_1}| + |U_{t_2}| + |U_{t_3}| + \ldots + |U_{t_D}|$. Another useful criteria which can be used as a key component is a notation of the frequency of the waveform, that is, the number of zero crossings, ZERO of the waveform in an interval of $x$ data points. A similar useful criteria is IX/0MAX where IX is equal to the number of data points in an interval having $y$ zero crossings and 0MAX is equal to $n$, the total number of data points. Still another similar criteria is IU which is equal to the total number of zero crossing intervals for the 0MAX data points, each interval containing y zero crossings. A further criteria which can be used in the selection of key components is the average difference between successive data points C/D where C is equal to $(U_{t_2}-U_{t_1})+(U_{t_3}-U_{t_2})+\ldots+U_{t_D}-U_{t_{D-1}}$ or $U_{t_D}-U_{t_1}$. Many more criteria can be employed in selecting the value of the key components, but for purposes of the illustrative embodiments described herein the key components are selected from the above list.

The basic internal structure of the single nonlinear processor and of the synthesized cascaded processor after conversion has taken place will next be discussed in detail with reference to FIGS. 6–20. As previously mentioned, the internal structure of the system is comprised of a memory or storage array which is first linked together to form a tree-structured matrix during training and then rearranged and relinked during conversion.

A graph comprises a set of nodes and a set of unilateral associations specified between pairs of nodes. If node $r$ is associated with node $s$, the association is called a branch from initial node $r$ to terminal node $s$. A path is a sequence of branches such that the terminal node of each branch coincides with the initial node of the succeeding branch. Node $s$ is reachable from node $r$ if there is a path linking node $r$ to node $s$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length ($s$-1) from a root is on the $s^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node m comprises the filial set of node $m$, and $m$ is the parent node of that set. A set of nodes reachable from node m is said to be governed by $m$ and comprises the nodes of the subtree rooted at $m$. A chain is a tree, or subtree, which has at most one branch leaving each node.

In the present system, as illustrated in FIG. 6, a node is realized by a portion of storage consisting of at least two components, a node value equal to the value of the key component stored in a VAL register associated with the node and an inner ADP address component designated $ADP_i$. The node value serves to distinguish a node from all other nodes of the filial set of which it is a member and corresponds directly with the key component which is associated with the particular level of the node. The $ADP_i$ component serves to identify the location in memory of another node belonging to the same filial set. Thus, all nodes of a filial set are linked together by means of their $ADP_i$ components. For example, node 1 is linked to node 8 in the root level and node 2 is linked to node 4 in the second level. These linkages commonly take the form of a "chain" of nodes constituting the filial set, and it is therefore meaningful to consider the first member of the chain the entry node and the last member the terminal node. The terminal node may be identified by a distinctive property of its $ADP_i$. In addition, the nodes in the first two levels of the tree structure of the illustrated embodiment contains an outer ADP address component $ADP_o$ and the leaf level of the tree contains statistical data stored in series of $m$ registers. The $ADP_o$ links a given node to its filial set at a next level of the tree after conversion has taken place and will later be discussed in detail.

In operation, the nodes of the tree are processed in a sequential manner with each operation in the sequence defining in part a path through the tree which corresponds to the key component, the entire key function providing access to the appropriate trained response. This sequence of operations, searches each level of the tree to determine if a component of the particular key function is contained therein. If during training the component cannot be located, the existing tree structure is augmented so as to incorporate the missing item into the file. In this setting the system inputs are key components and are compared with a node value stored in a VAL register at the appropriate level of the tree. When the node value stored in the VAL register matches a key component, the node is said to be selected and operation progresses to the next level of the tree. If the node value and key component output do not match, the node is tested, generally by testing the $ADP_i$ to determine if other nodes exist at the same level within the set which have not been considered in the current search operation. If one or more nodes exist, transfer is effected to the node specified by the $ADP_i$ and the value of that node is compared with the key component. Otherwise, a node is created and linked to the filial set by the $ADP_i$ of what previously was the terminal node. The created node, which becomes the new terminal node, is given a value equal to the key component which is then stored in the VAL register of the new node, an $ADP_i$ component indicating termination, and a chain of nodes is initiated for the remaining levels from the new node out to the leaf level. Every time such a sequence is initiated and completed, the processor is said to have undergone a training cycle.

The three levels of the tree-structured memory matrix, having both VAL and $ADP_i$ registers to link nodes in the same level, corresponds to the $i$, $j$ and key components of the key function. In other embodiments of the invention, additional key components may be utilized and corresponding intermediate levels are added therefore.

The leaf level of the tree then, contains a plurality of registers including a first VAL register and second $ADP_i$ registers as previously noted. In addition, series of $m$, N registers, one series of which is associated with each node in the leaf level are reserved for storing statistics relating to each one of the desired outputs of the system $Z_1 - Z_m$. Specifically, such registers are utilized to store the number of times N that each of such desired outputs has been associated with the key function defining a path to such leaf node.

The operations of the processor during training can be made more concrete by considering a specific example of several training cycles.

Figure 7:
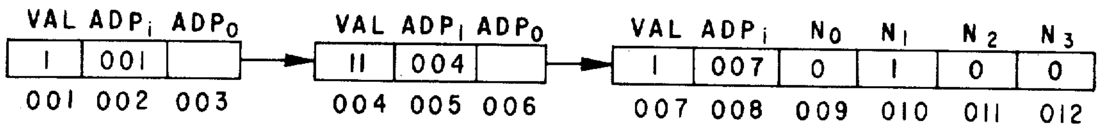

Referring then to FIG. 7, assume that the key function $\{i, j, k\}$ for the first training cycle is, for example, {1,11,1} with an associated desired response of $Z_1$. The blocks in FIG. 7 represent the one or more registers comprising each node of the tree structure and the numbers below the subdivisions of the blocks represent the address number of each register in its respective block and corresponds to the location of the register in the memory array. The address of the first register in each block represents the node number of the block. Prior to the first training cycle all registers are blank. In the first or root level iteration, the $i$ value of 1 is stored in register 001 which becomes the VAL register of the first node in the first level. Since there are no other nodes in the first level as yet, the $ADP_t$ register 002 of node 001 is set equal to the address of the entry node, 001. The 003 register is skipped over and reserved for an $ADP_0$ register of node 001. The next available register is 004 which now becomes the first node in the second or $j$ level filial set extending from node 001. Therefore, the $j$ value of 11 is inserted into register 004 and becomes the value thereof. As there are no other nodes in the second level extending from node 001, the $ADP_t$ register 005 of node 004 is set equal to the address of the entry node of the filial set to which it belongs or 004. The 006 register is reserved as an $ADP_0$ register for node 004. The next available register is therefore 007 which then becomes the VAL register for node 007 in the leaf level extending from node 004. Again, since there are no other nodes in the leaf level extending from node 004, inserted in $ADP_t$ register 008 is the number 007 referring the node back to itself as entry node. $N_1$ register 010 is updated to indicate the key components leading to this leaf node has once been associated with a $Z_1$.

Figure 8:
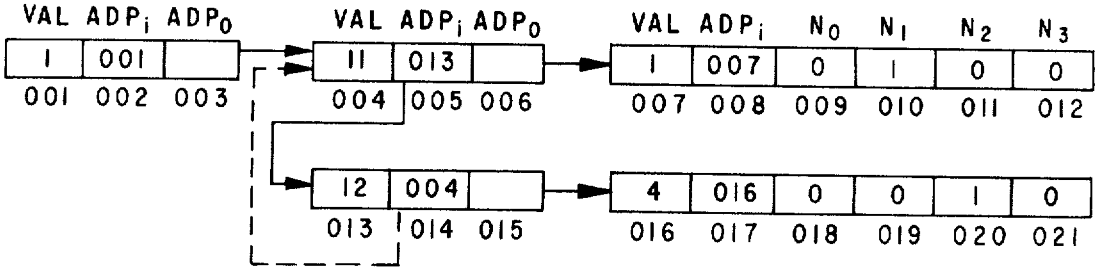

The key function for the second training cycle is {1,12,4} with an associated desired response of $Z_2$. Referring then to FIG. 8, the first key component 1 is compared with the value 1 stored in VAL register 001 of node 001. There is a match, so the $ADP_1$ and $ADP_0$ registers 002 and 003, respectively, are skipped and the second or $j$ key component 12 is compared to the value 11 stored in VAL register 004 of node 004 in the second level. These numbers do not match and as there are no other nodes in the filial set, indicated by the $ADP_t$ of node 004 referring back to itself, a new node is created in the second level and joined in the filial set of which node 004 is a member. The next available register is 013, so the number stored in $ADP_t$ register 005 is changed to 013, thereby linking node 004 to node 013. The $j$ value of 12 is next inserted into register 013 which is a VAL register. The 014 register of node 013 is an $ADP_t$ register, and as node 013 is the last node in the filial set, its $ADP_t$ is set equal to the address of the entry node of the filial set 004. Register 015 is reserved as an $ADP_0$ register for node 013 which makes 016 the next available register for the leaf level node extending from node 013. The $k$ value of 4 is therefore stored in VAL register 016 and, since there are no other members of the filial set extending from node 013, $ADP_t$ register 017 contains the address 016 referring the node back to itself. Registers 018–021 are added to node 016 as N registers of which register 020 is updated to indicate that the set {1,12,4} has once been associated with a $Z_2$.

Figure 9:
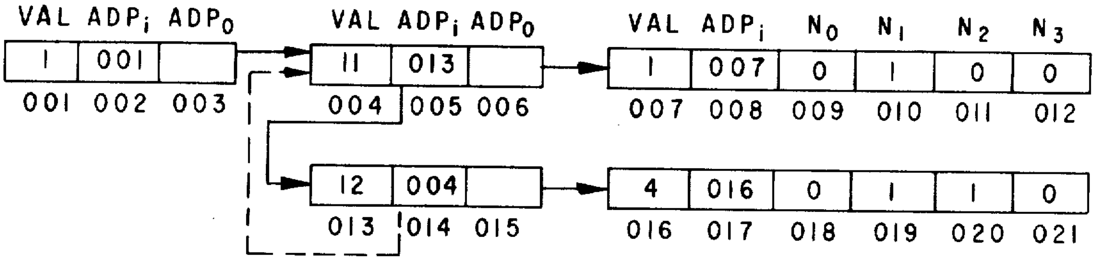

With reference to FIG. 9, the key function for the third training cycle is again {1,12,4}; now, however, the key function has an associated desired response of $Z_1$. The key component 1 matches the value stored in VAL register 001 of node 001, so that the 002 $ADP_t$ register and the 003 $ADP_0$ registers are skipped and the $j$ key component value of 12 is compared to the value 11 stored in VAL register 004 of node 004. The two values do not match but $ADP_t$ register 005 of node 004 indicates the address of another node 013 in the filial set which must also be tested for a comparison. The $j$ value of 12 is now compared with the contents of VAL register 013. There is a match and, therefore, $ADP_t$ register 014 and $ADP_0$ register 015 of node 013 are skipped over and the $k$ key component value of 4 is compared with the contents of VAL register 016 of node 016. Again, there is a match, and $N_1$ register 019 is updated to indicate the association of key function {1,12,4} with the desired response $Z_1$.

Figure 10:
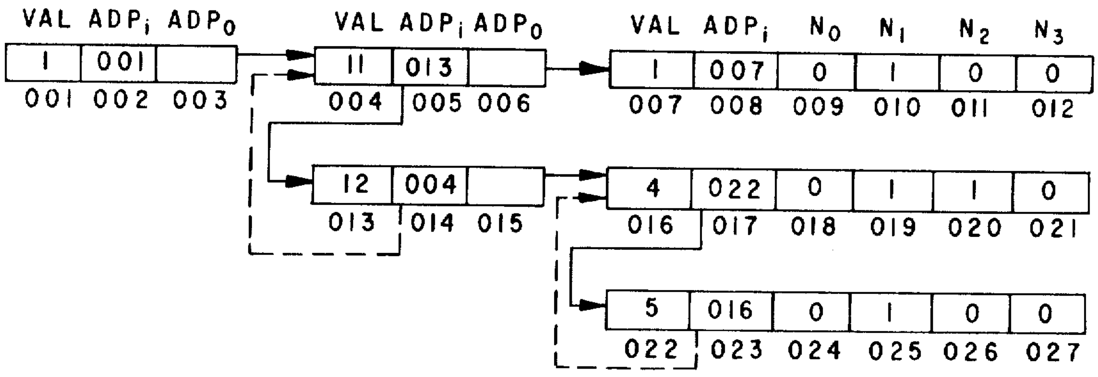

For the fourth training cycle the key function is {1,12,5} and a desired response of $Z_1$ associated therewith. Once again, as illustrated in FIG. 10, the value 1 of the $i$ key component is compared to the contents of VAL register 001 of node 001 in the first level. There is a match, so the next node to be examined is 004 in the second level. The $j$ value of 12 is compared to the value 11 in VAL register 004 and there is no match. $ADP_t$ register 005 of node 004 then addresses node 013 and the $j$ value of 12 is compared to the contents of VAL register 013 of node 013. The $j$ key component matches the contents of the VAL register and therefore the $k$ key component 5 is compared to the contents of VAL register 016 of node 016 in the leaf level. The two values do not match and therefore a new node must be added to the filial set in the third level extending from node 013. The next available register is the 022 register and therefore the address 022 is inserted into $ADP_t$ register 017 of node 016. The $k$ value of 5 is then inserted into register 022 which becomes the VAL register of node 022. The 023 register of node 022 is an $ADP_t$ register and since node 022 is the last node in the filial set, it contains the address of the entry node 016. Four N registers 024–027 are reserved for storing statistical data associated with the desired responses the $N_1$ register 025 is updated corresponding to a desired response of $Z_1$ to key function {1,12,5}.

Figure 11:
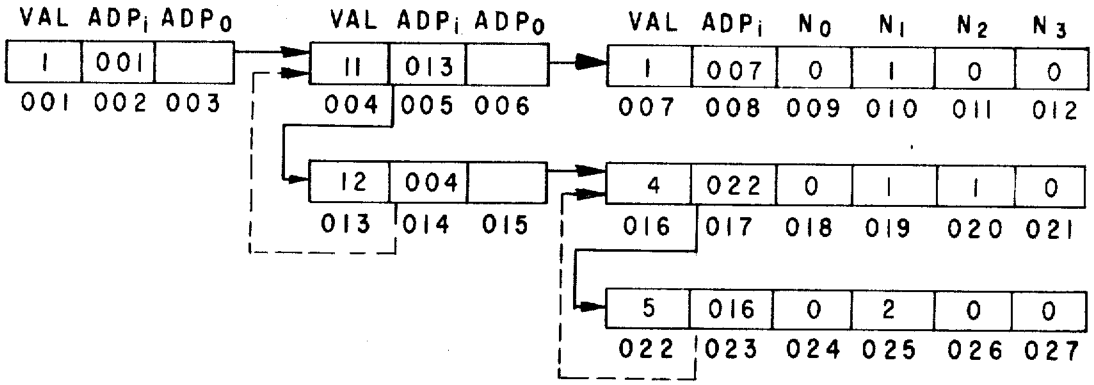

The key function for the next training cycle is again {1,12,5} and is again associated with a desired response of $Z_1$. Referring to FIG. 11, in the first level iteration the $i$ key component 1 is compared to the value 1 stored in VAL register 001. There is a match and therefore we next examine node 004. VAL register 004 contains a value of 11 which does not match the $j$ key component 12. The 013 address stored in $ADP_t$ register 005 of node 004 addresses node 013 where the $j$ key component is then compared to the value 12 stored in VAL register 013. There is a match; the $k$ key component 5 is next compared to the contents of VAL register 016 of node 016 in the third level. These values do not match, however, the address 022 contained in $ADP_t$ register 017 of node 016 indicates that the next node which must be examined in the filial set is 022. The $k$ value of 5 is now compared with the contents of VAL register 022 and there is a match. Since the key function {1,12,5} has now twice been associated with the same desired response of $Z_1$, $N_1$ register 025 of node 022 is updated to contain the number 2.

Figure 12:
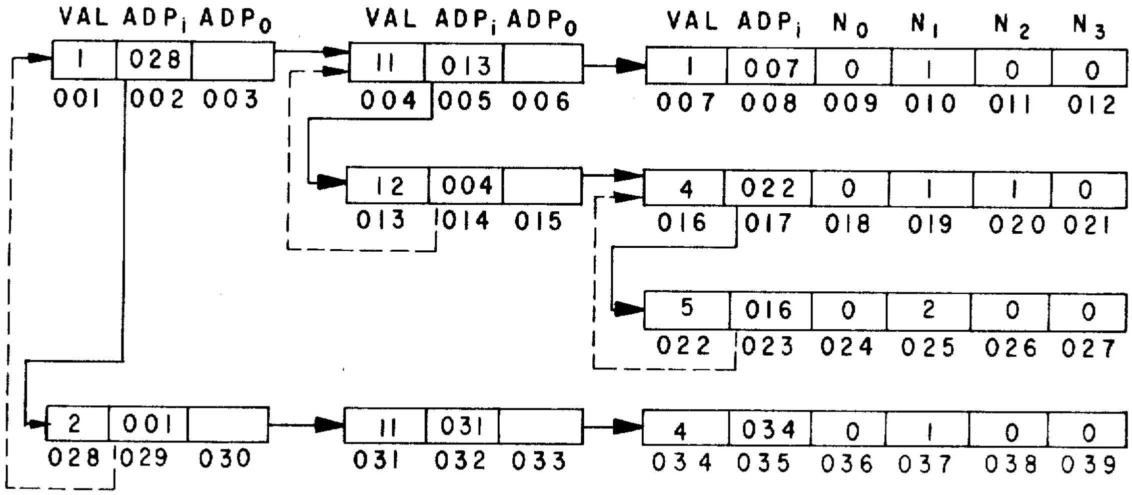

For the sixth training cycle, with reference to FIG. 12, the training function is {2,11,4} with an associated desired response of $Z_1$. In the first level iteration, the *i* value of 2 is compared to the contents of VAL register 001 of node 001. These two values do not match, and therefore a new node must be constructed in the first level. The next available register is the 028 register which becomes the VAL register of node 028 and the *i* value of 2 inserted therein. Since node 028 is the second node in the first level, node 001 must be linked to node 028. Therefore, the address contained in $ADP_i$ register 002 of node 001 is changed to 028 and $ADP_i$ register 029 of node 028 is set equal to 001, the address of the entry node. Register 030 is reserved as an $ADP_0$ register for node 028 and the next available register is 031 which becomes the VAL register for node 031 in the second level. The *j* value of 11 is then inserted into VAL register 031 and as there are no other nodes in the filial set extending from node 028, register 032 which is an $ADP_i$ register contains the address 031 referring the node back to itself. The 033 register is reserved as an $ADP_0$ register for node 031, and the next available register, 034, becomes the VAL register for node 034 in the third level extending from node 031. The *k* value of 4 is next inserted into register 034 and as node 034 is the first node in the filial set extending from node 031, the next register 035 which becomes an $ADP_i$ register, refers node 034 back to itself. Four N registers 036–039 are reserved to store statistical data associated with desired responses $Z_0$–$Z_3$. Since the key function {2,11,4} has in this cycle been associated with desired response $Z_1$, $N_1$ register 037 is updated accordingly.

The training process continues, as illustrated above, until the processor has been sufficiently trained. It is obvious that sufficiency, however, is going to be only a small percentage of all possible combinations of input signals and corresponding key functions. If too many input signals are examined during training, it costs additional training time, execution time and memory space. If too few signals are examined, on the other hand, the probability that the system will make an error in classification, for example, increases. Optimum systems must therefore be chosen with the above criteria in mind, with reference to the particular problem to be solved and with reference to the degree of accuracy required.

Figure 13:
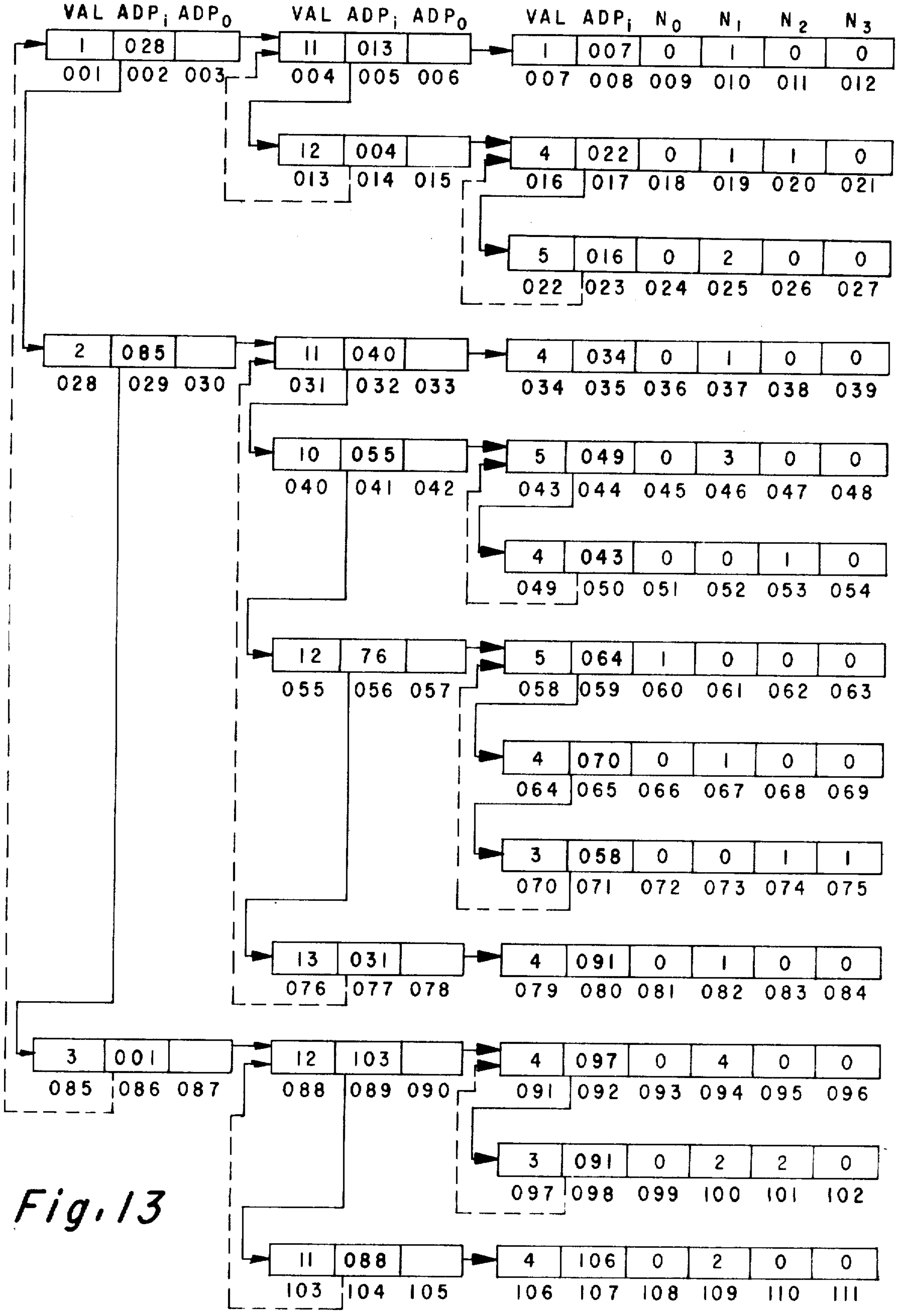

FIG. 13 illustrates an example of the above tree-structured matrix after 25 training cycles have occurred. Assume training has been completed; the system is now ready to convert the tree-structured matrix into a system of cascaded processors. It should be remembered that the first processor in the cascade will generate a probabilistic signal which is then utilized in defining a path to the leaf level of the second processor in the cascade. Several probabilistic signals generated by the first processor may be identical and therefore might lead to the same node in the second cascaded processor. Looked at the other way, the second processor considers only the probabilistic signal and not the path it came from in the first processor.

Figure 14:
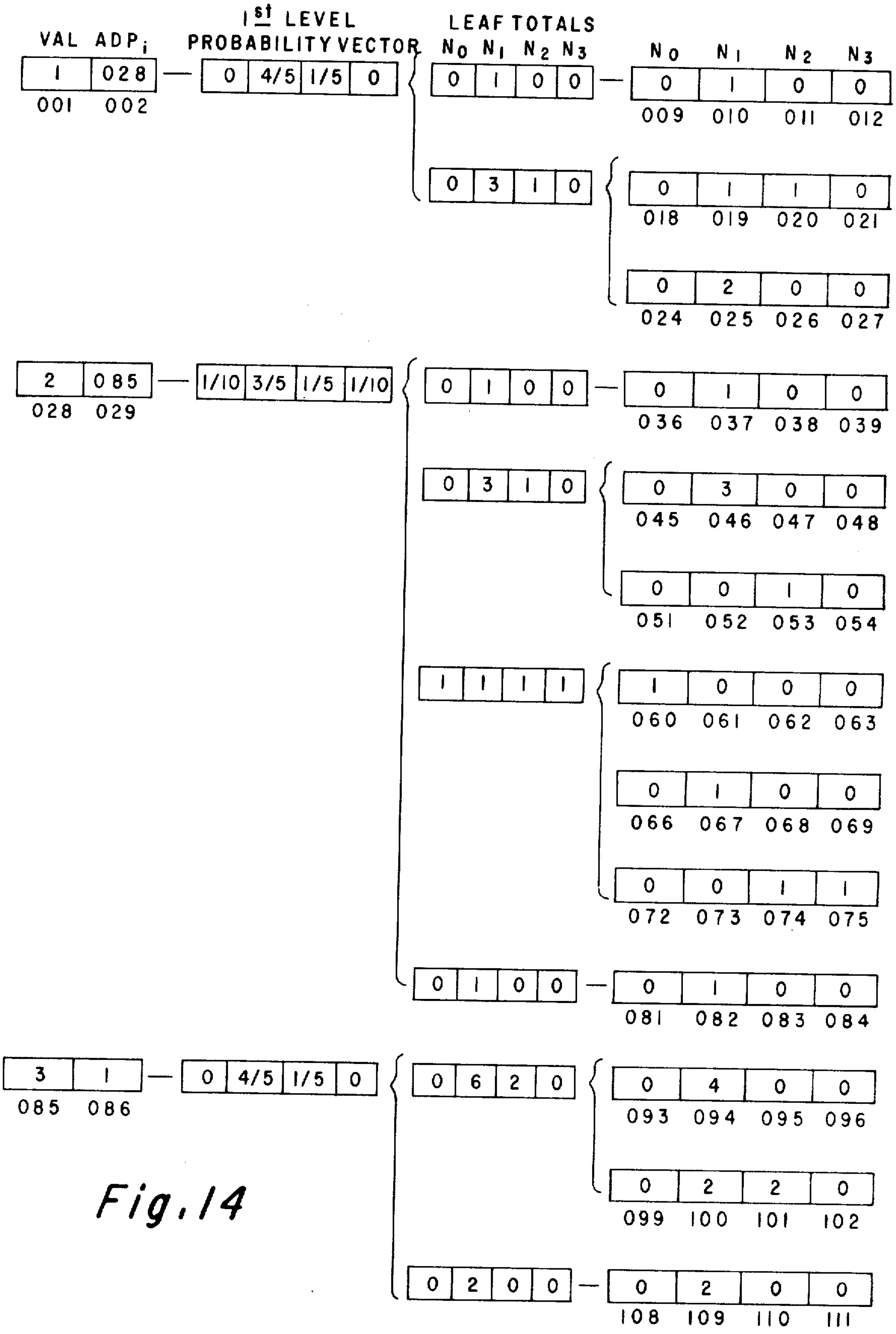

In order to convert the tree-structured matrix of FIG. 13 into the system of cascaded processors, the first step is to combine all of the statistics in the $N_0$–$N_3$ registers extending from each second level node and then form first level probability vectors from the combined statistics. This is accomplished, as illustrated in FIG. 14, by finding the leaf totals for each node in the second level. Thus, for the filial set extending from node 004 the only member is node 007 with N registers 009–012. The leaf totals for this filial set is therefore $N_0 = 0$, $N_1 = 1$, $N_2 = 0$ and $N_3 = 0$. In the filial set extending from node 013, there are two members: node 016 and node 022. The respective *N* registers of these two nodes are added together and therefore, for this filial set, the leaf totals are $N_0 = 0$, $N_1 = 3$, $N_2 = 1$ and $N_3 = 0$. The filial sec extending from node 031 has only one member, node 034. The leaf totals for that filial set is therefore equal to the contents of the 036, 037, 038 and 039 registers, respectively, or $N_0 = 0$, $N_1 = 1$, $N_2 = 0$ and $N_3 = 0$. There are two nodes, 043 and 049, in the filial set extending from node 040 and therefore the contents of the respective *N* registers are added together. The contents of the $N_0$ registers, 045 and 051, are added together; the contents of the $N_1$ registers, 046 and 052, are added together; the contents of the 047 and 053 registers are added together; and the contents of the 048 and 054 registers are added together. The leaf totals for this filial set is then $N_0 = 0$, $N_1 = 3$, $N_2 = 1$ and $N_3 = 0$. In the filial set extending from node 055 there are three nodes: node 058, node 064 and node 070. The contents of the $N_0$ registers, 060, 066 and 072, are added together; the contents of the $N_1$ registers, 061, 067 and 073 are added together; the contents of the $N_2$ registers, 062, 068 and 074 are added together; and the contents of the $N_3$ registers, 063, 069 and 075, are added together. The leaf total for these three nodes is then $N_0 = 1$, $N_1 = 1$, $N_2 = 1$, and $N_3 = 1$. There is only one member of the filial set extending from node 076, namely, node 079. The leaf totals for this filial set is therefore the contents of registers 081, 082, 083 and 084 so that $N_0 = 0$, $N_1 = 1$, $N_2 = 0$, and $N_3 = 0$. In the filial set extending from node 088 there are two members: node 091 and node 097. The leaf totals for this filial set is determined by adding the contents of the 093 and 099 registers together, the contents of the 094 and the 100 registers together, the contents of the 095 and 101 registers together, and the contents of the 096 and 102 registers together, resulting in leaf totals of $N_0 = 0$, $N_1 = 6$, $N_2 = 2$ and $N_3 = 0$. Lastly, node 106 is the only member of the filial set extending from node 103; therefore the contents of registers 108, 109, 110 and 111 determine the leaf totals for that filial set, which are $N_0 = 0$, $N_1 = 2$, $N_2 = 0$ and $N_3 = 0$.

The first level probability vectors are now obtained by combining all of the respective *N*'s in the leaf totals for nodes in the second level filial set extending from each node in the first level and dividing by the total number of times the respective first level node has been selected. Thus for the nodes extending from node 001, the leaf totals are added together, giving a result of (0, 4/5, 1/5, 0). For those nodes extending from node 028, the leaf totals are added together with a resulting first level probability vector for node 028 of (1/10, 6/10, 2/10, 1/10), which is equal to (1/10, 3/5, 1/5, 1/10). For the nodes extending from node 085, two leaf totals must be added together to find the first level probability vector for node 085, which becomes (0, 8/10, 2/10, 0) or (0, 4/5, 1/5, 0).

Figure 15:
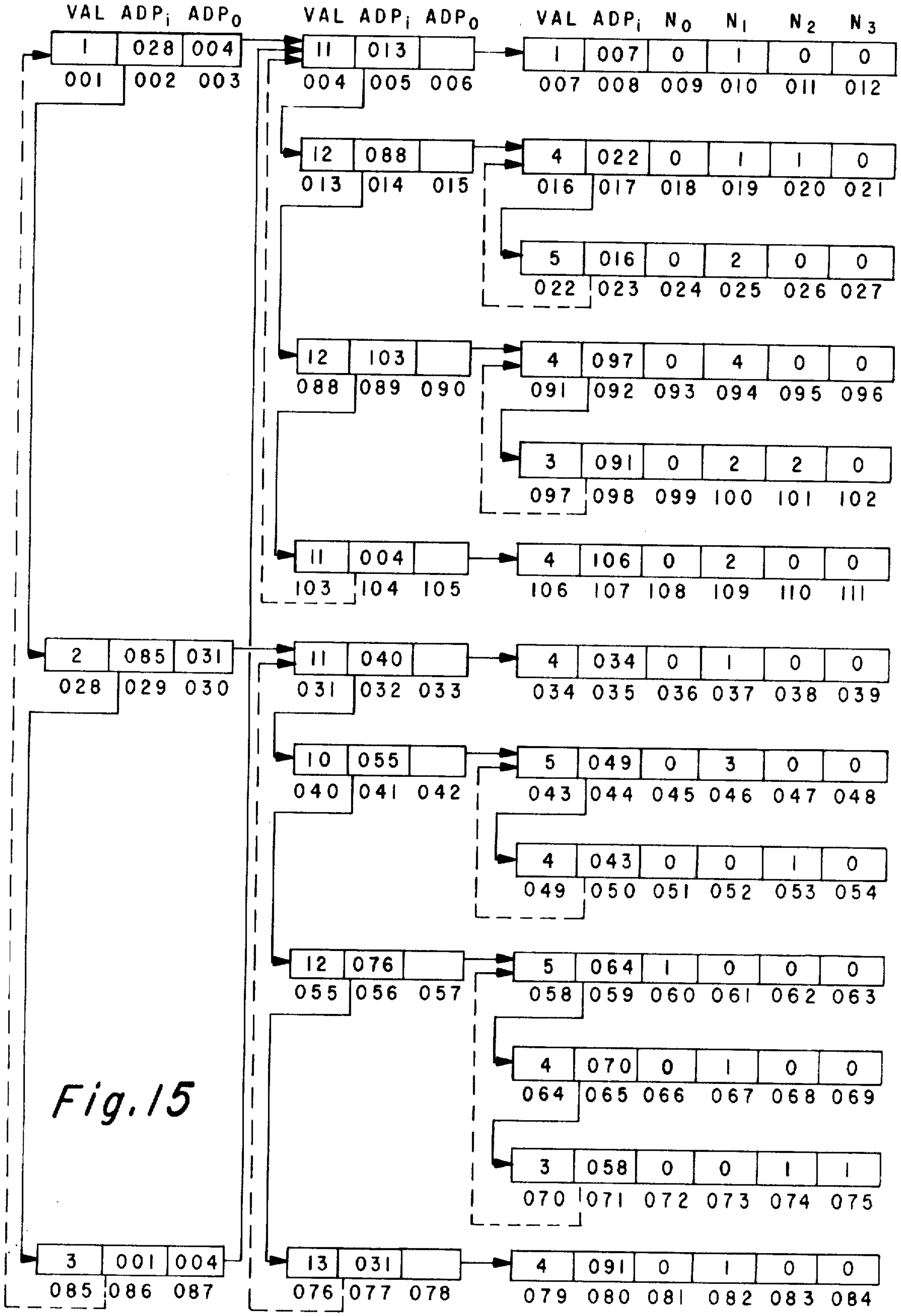

It should be noticed that the first level probability vectors for the nodes extending from node 001 and for the nodes extending from node 085 are the same (0, 4/5, 1/5, o). As previously mentioned, the first level of the tree-structured memory matrix represents the first processor in the system of cascaded processors. Since the first level probability vector transmitted from nodes 001–085 of the first processor to the second processor are the same they will select a same node in the second level of the second processor of the system of cascaded processors. In one embodiment of the invention, the probability vectors would merely be stored in a second level of the first processor and compared with probabilistic values stored in VAL registers of the second level of a tree-structured matrix in the second processor of the cascade during execution. In a preferred embodiment, however, what is stored in the first processor is the address of the nodes which would have been selected, had the comparison taken place. Since the probability vector of node 001 and node 085 are the same, and since they would select the same node in the second level of the second processor, it is now advantageous to merge these two nodes together and at the same time store the address of the nodes in the second level which would be selected by the generation of a particular probability vector. This is accomplished, as illustrated in FIG. 15, by placing the address of the first node in the second level 004 extending from the first node having a common probability vector 001 in the $ADP_o$ registers of each of the common nodes. Thus, the address 004 is placed in $ADP_o$ register 003 of node 001 and in $ADP_o$ register 087 of node 085. In addition, the nodes in the second level extending from node 085 are merged together with the nodes extending from node 001; the nodes in the leaf level linked to the nodes in the second level remaining linked thereto. This is accomplished by linking node 013 which was the last node in the filial set extending from node 001 to node 088 which was the first node in the filial set extending from node 085 via $ADP_f$ linkage registers. Thus, $ADP_f$ register 005 contains the address 013 to link node 004 to node 013; $ADP_f$ register 014 contains the address 088 to link node 013 to node 088; $ADP_f$ register 089 contains the address 103 to link node 088 to node 103; and $ADP_f$ register 104 contains the address 004 of entry node 004 to link node 103 to node 004. The address 031 is placed solely in $ADP_o$ register 030 of node 028 since there is only one (1/10, 3/5, 1/5, 1/10) first level probability vector.

Figure 16:
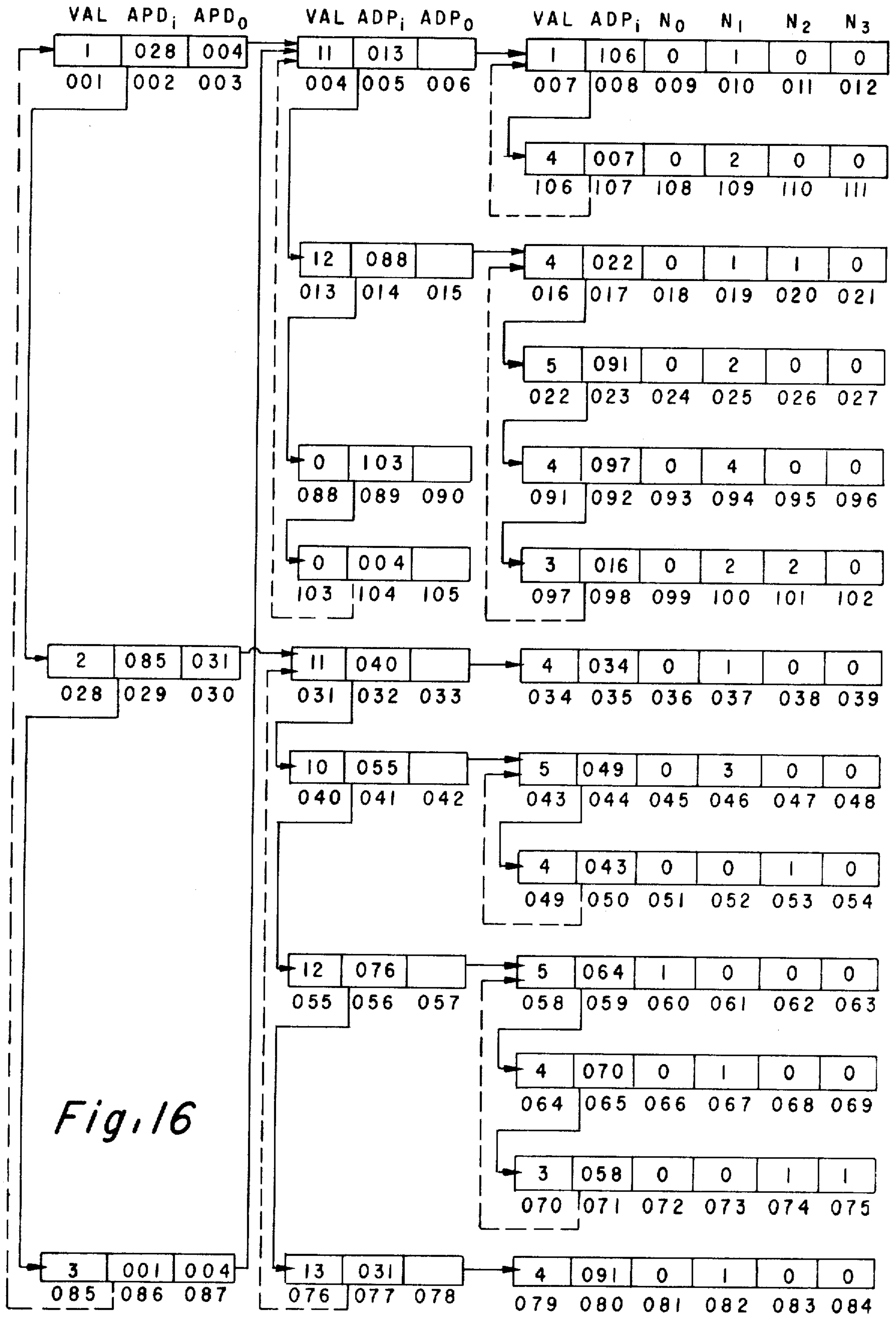

Now, looking at the filial set extending from node 001 it is seen that both node 004 and node 103 have the same value stored in their respective VAL registers 004 and 103 and that both node 013 and node 088 have the same value of 12 stored in their respective VAL registers 013 and 088. In this situation, during execution, when a $j$ key component reaches the nodes of this filial set for comparison, only one of the duplicate stored values could be selected. Thus, it is now necessary to merge all duplicate nodes in each filial set of the second level together. Referring to FIG. 16, this merger is accomplished by setting the VAL register of each of the duplicate nodes in the filial set to 0. The VAL registers of nodes 088 and 103 are set equal to 0. The nodes in the leaf level of the filial set extending from these nodes are then merged into the filial sets extending from the remaining duplicate nodes which have not been set equal to 0. Node 106 is therefore added to the filial set extending from node 004 and nodes 091 and 097 are added to the filial set extending from node 013. In order to accomplish this operation, the address 106 is inserted into $ADP_f$ register 008 of node 007 making node 106 the last node in the filial set extending from node 004; $ADP_f$ register 107 of node 106 is given the address of the entry node, 007. Likewise, $ADP_f$ register 017 of node 016 contains the address 022, linking node 016 to node 022 and $ADP_f$ register 023 is given the address 091, thereby linking node 022 to node 091. $ADP_f$ register 092 contains the address 097, linking node 091 to node 097. As node 097 is the last node in the filial set now extending from node 013, $ADP_f$ register 098 is given the address of entry node 016, completing the linkage chain of that filial set.

Examining the leaf level of the filial set extending from node 013, it is now seen that the value stored in the VAL registers of nodes 016 and 091 are the same and when a $k$ key component of 4 is introduced into that filial set during execution, only the first of the two nodes can be selected. It is therefore necessary to merge the registers of the filial set extending from node 013 in the leaf level of the tree.

Figure 17:
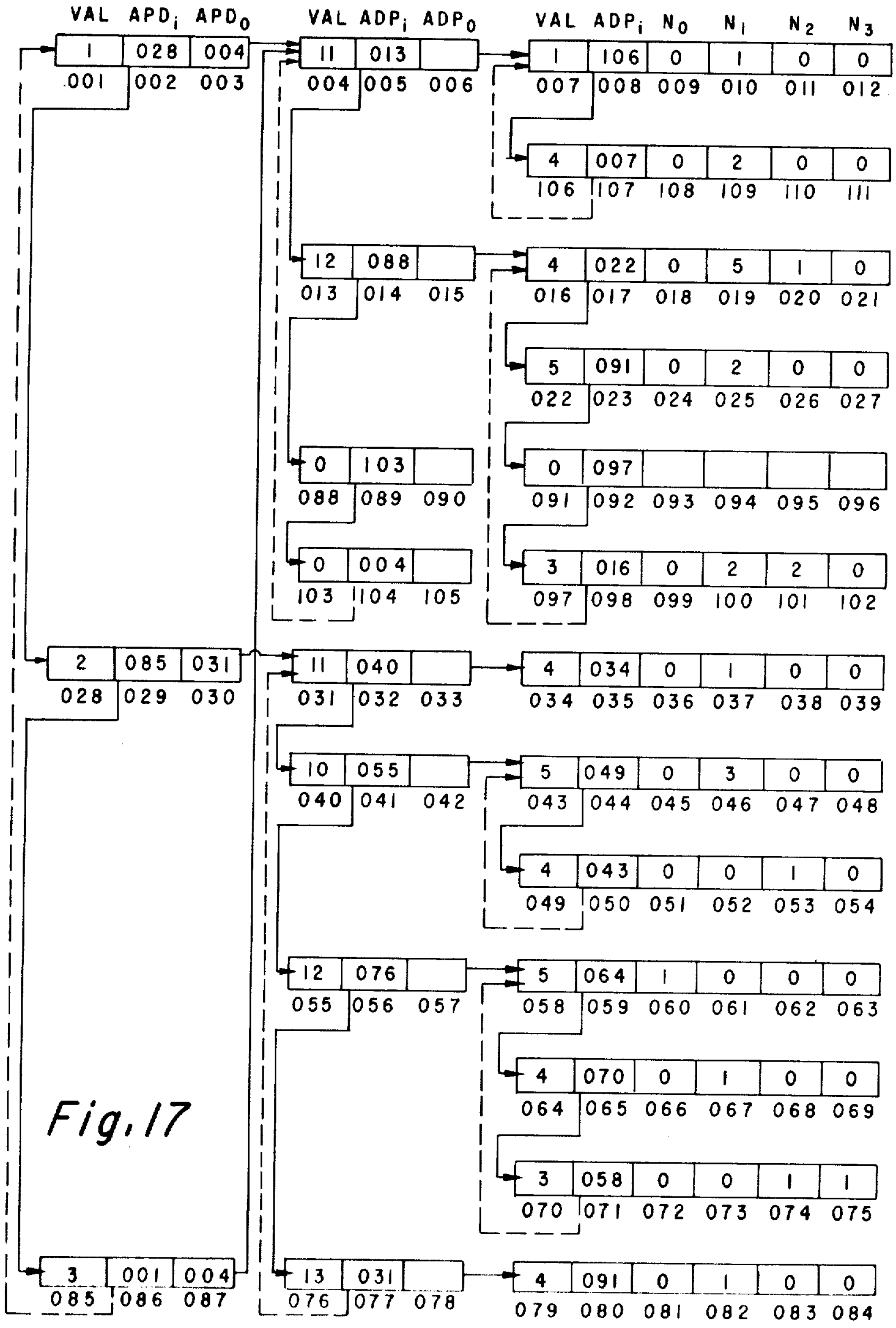

The leaf level merger is accomplished, as illustrated in FIG. 17, by adding the statistics stored in registers 093–096 of node 091 to the statistics stored in registers 018–021 respectively of node 016 and setting VAL register 091 of node 091 equal to 0. Register 018 remains equal to 0, register 019 now has a value of 5, register 020 remains equal to 1, and register 021 remains equal to 0. Registers 093–096 are blanked out and may be reused if desired or eliminated entirely in an embodiment of the system utilized for execution only. All three levels of the tree-structured matrix have now been merged.

Figure 18:
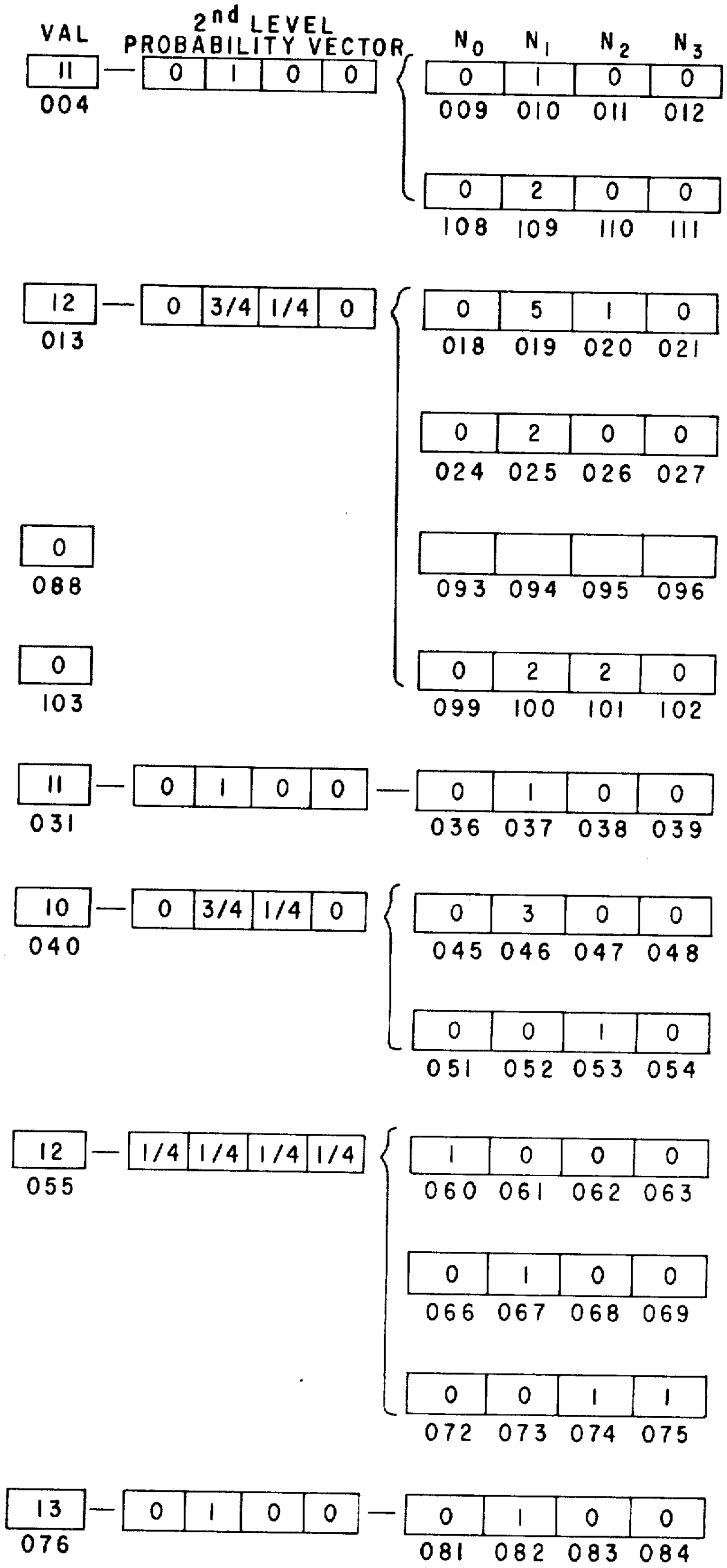

The next step in the conversion of the tree-structured matrix is to determine the second level probability vectors as illustrated in FIG. 18. This is accomplished by combining the respective statistics of the nodes in each filial set extending from a node in the second level. There are two nodes, 007 and 106 extending from node 004 and thus the contents of $N_0$ registers 009 and 108 are added together; the contents of $N_1$ registers 010 and 109 are added together; the contents of $N_2$ registers 011 and 110 are added together; and the contents of $N_3$ registers 012 and 111 are added together. The resulting second level probability vector for node 004 is then (0, 3/3, 0, 0) which is equal to (0, 1, 0, 0). The second level probability vector for node 013 is determined by adding the respective N registers of nodes 016, 022, 091, and 097 which is equal to (0, 9/12, 3/12, 0) or (0, 3/4, 1/4, 0). There is only one node in the filial set extending from node 031 so the probability vector is derived directly from N registers 036–039 of node 034 which is (0, 1, 0, 1). In the filial set extending from node 040 there are two members, nodes 043 and 049. The N register of these nodes are respectively added together to produce a second level probability vector of (0, 3/4, 1/4, 0). There are three nodes in the leaf level extending from node 055: nodes 058, 064, and 070. The respective N registers of these nodes are added together to determine a second level probability vector for node 055 of (1/4, 1/4, 1/4). Extending from node 076 in the second level, there is one node in the leaf level 079. N registers 081–084 of node 079 then form the second level probability vector for node 076 (0, 1, 0, 0).

As illustrated in FIG. 19, the next step in the conversion operation is to merge the nodes in the second level in accordance with the second level probability vectors. As can be noted from FIG. 18, nodes 004, 031, and 076 all have the probability vector (0, 1, 0, 0) and nodes 013 and 040 have the probability vector (0, 3/4, 1/4, 0). Therefore, $ADP_o$ registers 006, 033, and 078 of nodes 004, 031 and 076 are each set equal to the address of node 007 and $ADP_o$ registers 015 and 042 of nodes 013 and 040 are each set equal to the node address 016. Since node 004 is the first node in the second level with a probability vector of (0, 0, 1, 0), the nodes of the filial set extending from nodes 031 and 076 respectively are merged with the nodes in the filial set extending from node 004. $ADP_f$ register 008 has the address of node 106 contained therein which links node 007 with node 106. $ADP_f$ register 107 is given the address 034 to link node 106 with node 034; $ADP_f$ register 035 is given the address 079 to link node 034 with node 079; and as node 079 is now the last node in the filial set extending from node 004, $ADP_f$ register 080 is given the address of the entry node of the filial set 007. Likewise, the nodes in the filial set extending from node 040 are merged into the filial set extending from node 013. Node 022 is linked to node 016 via $ADP_f$ register 017, node 091 is linked to node 022 via $ADP_f$ register 023, and node 097 is linked to node 091 via $ADP_f$ register 092. Node 043 is then linked to node 097 by setting $ADP_f$ register 098 equal to the address 043 of that node. Node 049 has been linked to node 043 via $ADP_f$ register 044 of node 043. $ADP_f$ register 050 of node 049, now the last node in the filial set, is set equal to the address 016 of the entry node of the filial set. The probability vector for node 055 in the second level (1/4, 1/4, 1/41/4) is unique with respect to the other second level probability vectors and therefore no change is made to the nodes in the filial set extending from node 055. As a last step in the conversion of the three level tree-cascaded processor system, the third or leaf level is again merged to eliminate a condition whereby multiple nodes in the same filial set have the same value stored in their respective VAL registers.

Thus, for the filial set extending from node 004, it is seen that nodes 106, 034, and 079 each have the value 4 contained in their VAL registers. In order to merge the three nodes together, the values stored in the VAL registers of the second and third nodes 034 and 097 respectively are replaced by 0's, as illustrated in FIG. 20. Then, the statistics stored in the N registers 036–039 of node 034 and 081–084 of node 079 are combined with the statistics of node 106 stored in N registers 108–111. $N_0$ register 108 has a value of 0; $N_1$ register 109 now has a value of 4; $N_2$ register 110 has a value of 0; and $N_3$ register 111 has a value of 0. The statistical registers of nodes 034 and 079 have been blanked out and may either be utilized for other purposes or eliminated entirely from an execution-only embodiment of the system. In the filial set extending from node 013, it is seen in FIG. 19 that the contents of the VAL registers of nodes 016 and 049 are equal to 4 and the contents of the VAL registers of nodes 022 and 043 are equal to 5. These duplicated values are now eliminated as shown in FIG. 20 by setting the VAL register of node 043 to 0 and combining the statistics stored in registers 045–048 with the statistics of node 022 and by setting the VAL register of node 049 to 0 and combining the statistics stored in registers 051–054 with the statistics of node 016. Accordingly, the contents of $N_0$ register 018 is 0, the contents of $N_1$ register 019 is 5, the contents of $N_2$ register 020 is 2, and the contents of the $N_3$ register 021 is 0. The contents of $N_0$ register 024 is 0, the contents of $N_1$ register 025 is 5, the contents of $N_2$ register 026 is 1, and the contents of $N_3$ register 027 is 0. The conversion of the system is complete and the system, now comprising a plurality of feed-forward processors, is ready for execution.

In order to test the accuracy of the system, one or more additional training signals for which a desired response is known may be introduced into the system via the preprocessor and execution cycles performed thereon. In this manner the system is utilized to find the system's best statistical estimate of a desired response. The system's estimate and the actual desired response may then be compared for accuracy.

Actual execution of the system on signals for which the desired response is unknown, but for which desired responses are to be generated by the system, is commenced by introducing the signals into the preprocessor to derive from such signals sets of *i*, *j* and *k* key components. The *i* key component of a signal is compared to the value stored in the first VAL register of the memory array. If there is a match, the $ADP_o$ register directs the system to the second cascaded processor node in the filial set and the *j* key component is compared to the value stored in the VAL register of that node. When, on the other hand, the *i* key component does not match the value stored in the VAL register of the first node of the first processor, the $ADP_f$ register of the first node is utilized to address a second node in the filial set of which the first node is a member and the *i* key component is next compared to the value stored in the VAL register of such second node. Again, if the *i* key component matches the value stored in the VAL register of the node tested in the first processor, its $ADP_o$ register directs the system to a node in the second cascaded processor and the *j* key component is compared to the value stored in the VAL register of that node. Until a match is found in the first processor, the first level iteration continues via the $ADP_f$ registers of the nodes in the first processor. If all nodes in the first level have been tested and no match has been found, the key function is said to be an untrained function. One method of dealing with such untrained functions is to find the closest key component value stored in a VAL register and follow the path extending from that node into the next processor. Another method of dealing with untrained functions which is particularly useful for the present system when dealing with a fairly large data set is to ignore such untrained functions altogether. For each voice signal for example, 3,000 data points are examined in determining a desired response.

Once a node has been selected in the first processor by having a match of the key component with the value stored in the VAL register of that node, the $ADP_o$ register of the selected node is examined to determine the node in the second processor which is to be compared to the second or $j$ key component. In one embodiment of the system where the probability vector has been stored in the $ADP_o$ register, the contents of the $ADP_o$ of the selected node is compared to a VAL register in a first level of the second processor. When a match is found, the first node in the second level of the second processor extending from the selected node in the first level of the second processor is the first node which is examined to find a match for the $j$ key component. In the preferred embodiment, however, stored in the $ADP_o$ of the selected node of the first processor is the address of the node in the second level of the second processor at which the $j$ key component can be compared directly, the elimination of the first level of the second processor having been made and accounted for during the conversion process by linking the first processor to the second processor via and $ADP_o$ address. The $j$ key component is now compared to the values stored in the VAL registers of the filial set of the selected node in the second processor. During this second processor iteration, each node of the filial set is examined until a match is found or if the last node of the filial set has been examined and a match has still now been found, the untrained point policy for the system is utilized. The filial set in the third processor from which a match for the $k$ component is sought is determined by the contents of the $ADP_o$ register of the selected node in the second processor and if the $ADP_o$ register of the second processor contains an address, the filial set of the third processor is addressed directly. The $k$ key component is then compared with the VAL registers of the nodes in the filial set of the selected third processor node. In the event that the third processor contains the leaf level statistics, the $k$ key component is compared to the VAL registers of the filial set and when a match is found the statistical N registers of the selected node are examined, and the desired response having the highest probability in the statistical registers of the selected node is generated as the actual output of the system.

Again referring to FIG. 20, an example of an execution cycle for the illustrated embodiment described in FIGS. 6–20 will next be explained in detail. Consider, for example, an execution input signal having a key function of {3,12,5}. In the first level iteration, the $i$ key component 3 is compared with the value stored in VAL register 001. There is no match, and since the $ADP_t$ register 002 of node 001 is not equal to 001, there is an indication that there are further nodes in the filial set of the first processor to be considered. The address 028 as indicated by the contents of the $ADP_t$ register is next examined, and the $i$ key component is compared to the value 2 stored in VAL register 028. Again, there is no match; $ADP_t$ register 029 contains an address other than the address of entry node 001 indicating there are still further nodes in the filial set to be tested. Address 085 which is contained in $ADP_t$ register 029 links to node 085 which is next examined, the $i$ key component being compared to the value 3 stored in VAL register 085. This time there is a match.

Stored in $ADP_o$ register 087 of node 085 is the address of the entry node of a filial set in the second synthetically cascaded processor. If register 087 contained a probability vector as in one embodiment, that probability vector would be compared to probability vectors stored in VAL registers of a first level of the second processor. Extending from the selected first level node would the filial set having that probability vector. In the illustrated embodiment, the address of the first or entry node of the filial set having that probability vector was stored directly in $ADP_o$ register 087 during conversion. Thus, $ADP_o$ register 087 links the system directly to node 004 of the third processor and therefore the contents of VAL register 004 is next compared to the $j$ key component to determine if there is a match. The $j$ key component of 12 does not match the value stored in VAL register 004, and as $ADP_t$ register 005 contains an address other than 004, the address 013 contained in register 005 indicates the next node in the filial set to be examined. This time there is a match for the $j$ key component and $ADP_o$ register 015 of node 013 indicates the node to be examined in the third processor. The $k$ key component is now compared to the value stored in VAL register 016 of node 106. These values do not match, and since $ADP_t$ register 017 contains an address other than 016, there is an indication to the system that there are other nodes in the filial set which must be examined. $ADP_t$ register 017 contains the address 022 which is the VAL register of node 022. The contents of register 022 is then compared to the $k$ key component 5. This time there is a match, and as the third processor is the last processor in the cascade and contains the leaf level statistics, N registers 024–027 are examined to determine a best estimate for the key function { 3,12,5 }. Looking at registers 024–027, it is seen that statistically the best estimate for the key function is $Z_1$ which has a probability of 5/6.

It should be remembered at this point that the input signal has been preprocessed into perhaps 1,000 data points. Let us assume then that three pieces of information $i, j$ and $k$ were derived from these data points in intervals of 3 and replaced the data points. In that case, there would be 333 key functions, each having 3 key components derived from a single input signal. Each one of the 333 key functions has the same desired response, and the single nonlinear processor was trained accordingly. Now during execution, the input signal also has approximately 333 key functions associated with it, and of the 333 key functions, we known that there can only be one desired output. So, in addition to finding the desired response to each key function, for instance, the $Z_1$ of the above example, after the entire signal with its 333 key functions has been processed, the system examines the desired responses to each of the key functions and statistically selects the one which has been associated with the most key functions derived from the input signal. This is one reason why it is a valid untrained path or key function policy to ignore key functions for which no path has been defined in the cascaded processor.

The system of the invention has now been generally described. One embodiment of the system illustrated in FIG. 21 is comprised of specialized digital circuitry to provide the hardware thereof. In such embodiment a time pulse distributor subsystem comprised of logic gates 34 resettable counters 25–33 provide the control circuitry for the system. The memory array comprising each nonlinear processor is provided by a plurality of randomly accessed read-write memory registers 44, which are addressed by proper quantization of the key components to correspond with built-in selection means utilized in conjunction with the logic of the accessing portion of the memory. Additional temporary storage registers 45 and logic circuits divided into nine subsystems (MAIN 35, TREE 42, COMPRS 37, REDUC 36, COMBN 40, MERGE1 38, COMBN2 41, MERGE2 39 and SEARCH 43) are also provided.

It has been recognized, however, that a general-purpose digital computer may be regarded as a storeroom of electrical parts and when properly programmed, becomes a special-purpose digital computer or specific electrical circuit. Therefore, other embodiments of the invention will employ a properly programmed general-purpose digital computer to replace some or all of the above specific digital circuitry. The method of operating both a general-purpose computer embodiment of the invention and such specialized digital circuitry embodiment will henceforth be described in detail.

The flow diagrams of FIGS. **22*a–i*, 23*a* and *b*, 24*a* and *b*, 25, 26*a–c*, 27*a–d*, 28*a–d*, 29*a–f*, and 30*a–c* apply to operations performed by a general purpose digital computer embodiment of the invention as well as operation of the special purpose digital system illustrated in FIG. 21**. The special purpose digital computer will carry out the kind of operations represented in the flow diagrams automatically. A FORTRAN IV program comprising TABLES II*a–i* will allow the operations of the flow diagram to be carried out on any general purpose digital computer having a corresponding FORTRAN IV compiler.

In the special purpose digital circuitry embodiment of the system, illustrated in FIG. 21, one or more operations may occur simultaneously if different non-interfering portions of the circuitry are utilized. These sets of operations are denoted in the flow diagram of FIG. 22 by statements enclosed in numbered boxes, each box or block representing one set of operations. As mentioned above, the special purpose circuitry is controlled by a time pulse distributor subsystem which transmits an electrical signal from one of nine decimal counters; M or MAIN counter 25, T or TREE counter 26, S or SEARCH counter 27, R or REDUC counter 28, CP or COMPRS counter 29, CB or COMBN counter 31, CN or COMBN2 counter 30, MR or MERGE1 counter 32, and MG or MERGE2 counter 33 to other sub-portions of the system during each clock pulse. The encircled number associated with each block of FIGS. **22*a–i*, 23*a* and *b*, 24*a* and *b*, 25, 26*a–c*, 27*a–d*, 28*a–d*, 29*a–f*, and 30*a–c* are representative of the generation of a signal from time pulse distributor logic circuitry 34 to logic circuitry 35 which controls logic circuitry 42, 43, 37, 40, 41, 38, 39 or logic circuitry 37 which controls logic circuitry 36** when such number has been reached by the proper counter. Such number is called the "Control State" of the system for the operations listed in the block.

There are a total of 512 control states: 130 provided by counter 25, 37 provided by counter 26, 49 provided by counter 27, 9 provided by counter 28, 35 provided by counter 29, 51 provided by counter 30, 49 provided by counter 31, 67 provided by counter 32, and 85 provided by counter 33. The actual sequence of control states does not necessarily follow in numerical order. Switch 34 controls which one of counters 25–33 provides the contemporary control state, and is operated by a signal from either MAIN logic circuits 35, or COMPRS logic circuits 37. Normally, a clock pulse transmitted from clock 35 via switch 34 to one of counters 25–33 will advance it to the next consecutive decimal number. Sometimes, however, it is necessary to reset the counter to a particular desired control state on the next clock pulse to that counter rather that continue in its consecutive sequence. Most often, the resetting of the counter providing the next control state will occur when, at a particular control state, certain conditions which will hereinafter be discussed in detail with reference to the description of the operation of the system during each control state. Other times, one of the counters is reset at the end of a sequence of control states in order to begin an entirely new set of operations and hence a new corresponding sequence of control states.

The entire operation of the time pulse distributor is shown in TABLE I. All counters are initially set at zero. The first clock pulse will set counter 25 of the time pulse distributor at control state 1. The following states are normally the next consecutive control state in the numerical sequence unless, at a certain control state, a condition occurs which resets counter 25 to a selected control state or switch 33 is operated to select a control state provided by counters 26–33. The present state, reset conditions and next state are shown on the table for each of control states 1–128, T1–T37, CP1–CP31, R1–RCB1–CB48, MR1–MR65, CN1–CN50, MG1–MGand S1–S45.

Time pulse distributor 34 then operates the remainder of the system as follows:

Control State 1: As illustrated in FIG. **22*a***, operation of the system begins with the M counter positioned at the first control state.

Control State 2: A logical storage register of memory 45, designated FTO3A, is utilized as a switch to control the input of the system. In the present embodiment the input signals used for training were recorded on tape along with the desired responses to the input signals. The input signals were recorded on two tapes and the FTO3A switch indicates to the system which of the two tapes is being used. When the FTO3A switch is set to the TRUE position, a tape arranged according to the class of the signal is used, that is, all $Z_1$'s are grouped together, then all $Z_2$'s are grouped together, and then all $Z_3$'s are grouped together and so forth. When the FTO3A switch is set in the FALSE position, the input signals are arranged so that there is one signal from class $Z_1$, then one signal from class $Z_2$ and then one signal from class $Z_3$ and so forth. For the present embodiment, there are a total of ten classes $Z_1$–$Z_{10}$ for which the leaf level has ten statistical registers $N_1$–$N_{10}$. An IUTRN register of memory 45 which is utilized to store the number of times an untrained path has been encountered in the tree is initialized at 0 and an ITRN register of memory 45 which is utilized to store the number of times a trained path has been encountered is likewise initialized to 0. A register of memory 45, designated the SCALE register, is

TABLE I

| Control State | Condition | Next Control State |
|---|---|---|
| | MAIN | |
| 1 | | 2 |
| 2 | | 3 |
| 3 | | 4 |
| 4 | | 5 |
| 5 | | 6 |
| 6 | If I = 10 | 8 |
| | Otherwise | 7 |
| 7 | | 5 |
| 8 | | 9 |
| 9 | | 9a |
| 9a | | 10 |
| 10 | If FTO3A is true | 24 |
| | Otherwise | 11 |
| 11 | If TRAIN is true | 12 |
| | Otherwise | 13 |
| 12 | | 18 |
| 13 | If ICLASS = 1 | 24 |
| | Otherwise | 14 |
| 14 | | 15 |
| 15 | | 16 |
| 16 | If I = 40 | 24 |
| | Otherwise | 17 |
| 17 | | 15 |
| 18 | | 19 |
| 19 | | 20 |
| 20 | | 21 |
| 21 | If the end of data has been reached | 27 |
| | Otherwise | 22 |
| 22 | If I = N | 24 |
| | Otherwise | 23 |
| 23 | | 20 |
| 24 | | 25 |
| 25 | | 26 |
| 26 | | 28 |
| 28 | | 29 |
| 29 | If the end of data has been reached | 27 |
| | Otherwise | 30 |
| 30 | | 31 |
| 31 | | 32 |
| 32 | If IN(I) < 1927 | 33 |
| | Otherwise | 35 |
| 33 | If I = 3000 | 94 |
| | Otherwise | 34 |
| 34 | | 32 |
| 35 | | 36 |
| 36 | | 37 |
| 37 | If UABS > UMAX | 38 |
| | Otherwise | 39 |
| 38 | | 39 |

| Control State | Condition | Next Control State |
|---|---|---|
| 39 | If UABS > .1 | 47 |
| | Otherwise | 40 |
| 40 | If I < 6945 | 47 |
| | Otherwise | 41 |
| 41 | | 42 |
| 42 | | 43 |
| 43 | If HABS(IN(J)) < 1927 | 44 |
| | Otherwise | 47 |
| 44 | If J = K | 46 |
| | Otherwise | 45 |
| 45 | | 43 |
| 46 | | 49 |
| 47 | If I = 13888 | 46 |
| | Otherwise | 48 |
| 48 | | 36 |
| 49 | | 50 |
| 50 | | 51 |
| 51 | | 52 |
| 52 | If I = IMAX | 54 |
| | Otherwise | 53 |
| 53 | | 51 |
| 54 | | 55 |
| 55 | | 56 |
| 56 | | 57 |
| 57 | If I = 10 | 59 |
| | Otherwise | 58 |
| 58 | | 56 |
| 59 | | 60 |
| 60 | | 61 |
| 61 | | 62 |
| 62 | If U(IX) > 0 | 63 |
| | Otherwise | 64 |
| 63 | | 64 |
| 64 | | 65 |
| 65 | If IX > 1 | 65a |
| | Otherwise | 83 |
| 65a | | 66 |
| 66 | If U(IX-1) = 0 | 83 |
| | Otherwise | 67 |
| 67 | | 68 |
| 68 | If P < 0 | 69 |
| | Otherwise | 70 |
| 69 | | 70 |
| 70 | If ICROSS < IZERO | 83 |
| | Otherwise | 71 |
| 71 | | 72 |
| 72 | | 73 |
| 73 | | 74 |
| 74 | | 75 |
| 75 | If K = 3 | 76 |
| | Otherwise | 75a |
| 75a | | 74 |
| 76 | If TRAIN is true | 78 |
| | Otherwise | 77 |

| Control State | Condition | Next Control State |
|---|---|---|
| 77 | SUBROUTINE SEARCH | S1 |
| | RETURN TO | 80 |
| 78 | SUBROUTINE TREE | T1 |
| | RETURN TO | 79 |
| 79 | | 80 |
| 80 | | 81 |
| 81 | If IU > IVMAX | 85 |
| | Otherwise | 82 |
| 82 | | 59 |
| 83 | If IX = IMAX | 85 |
| | Otherwise | 84 |
| 84 | | 61 |
| 85 | If TRAIN = true | 93 |
| | Otherwise | 86 |
| 86 | | 87 |
| 87 | | 88 |
| 88 | If ISTAC(IX) > MX | 89 |
| | Otherwise | 90 |
| 89 | | 90 |
| 90 | If IX = 10 | 92 |
| | Otherwise | 91 |
| 91 | | 88 |
| 92 | | 93 |
| 93 | | 94 |
| 94 | If FT03A is true | 102 |
| | Otherwise | 95 |
| 95 | If IS = ISMX | 96 |
| | Otherwise | 97 |
| 96 | If ICNT = NGRPS | 102 |
| | Otherwise | 97 |
| 97 | | 98 |
| 98 | | 99 |
| 99 | If the end of data has been reached | 27 |
| | Otherwise | 100 |
| 100 | If I = 9 | 102 |
| | Otherwise | 101 |
| 101 | | 98 |
| 102 | If ICNT = NGRPS | 104 |
| | Otherwise | 103 |
| 103 | | 28 |
| 104 | If TRAIN is false | 108 |
| | Otherwise | 105 |
| 105 | | 106 |
| 106 | If LPTR > 0 | 107 |
| | Otherwise | 108 |
| 107 | SUBROUTINE COMPRS | CP1 |
| | RETURN TO | 106 |
| 108 | If IS = ISMX | 110 |
| | Otherwise | 109 |
| 109 | | 25 |
| 110 | If ICLASS = ICMX | 112 |
| | Otherwise | 111 |

| Control State | Condition | Next Control State |
|---|---|---|
| 111 | | 10 |
| 112 | If TRAIN is false | 112a |
| | Otherwise | 113 |
| 112a | STOP SYSTEM | |
| 113 | | 114 |
| 114 | | 115 |
| 115 | | 116 |
| 116 | If I = ICMX | 118 |
| | Otherwise | 117 |
| 117 | | 115 |
| 118 | | 119 |
| 119 | SUBROUTINE COMBN | CB1 |
| | RETURN TO | 120 |
| 120 | SUBROUTINE MERGE1 | MR1 |
| | RETURN TO | 121 |
| 121 | SUBROUTINE COMBN2 | CN1 |
| | RETURN TO | 122 |
| 122 | SUBROUTINE MERGE2 | MG1 |
| | RETURN TO | 123 |
| 123 | | 124 |
| 124 | If FT03A is true | 9 |
| | Otherwise | 125 |
| 125 | | 126 |
| 126 | | 127 |
| 127 | If I = 20 | 9 |
| | Otherwise | 128 |
| 128 | | 126 |

TREE

| Control State | Condition | Next Control State |
|---|---|---|
| T1 | | T2 |
| T2 | If ISW = 0 | T8 |
| | Otherwise | T3 |
| T3 | | T4 |
| T4 | If ID(IDUM) = IU(LVEL) | T9 |
| | Otherwise | T5 |
| T5 | If ID(IDUM + 1) < or = IDUM | T13 |
| | Otherwise | T6 |
| T6 | | T4 |
| T8 | | T20 |
| T9 | If LEVEL = 1 | T10 |
| | Otherwise | T11 |
| T10 | | T11 |
| T11 | | T12 |
| T12 | If LEVEL < or = 3 | T4 |
| | Otherwise | T28 |
| T13 | If ICT > M1-12 | T26 |
| | Otherwise | T14 |
| T14 | | T15 |
| T15 | | T16 |
| T16 | If LEVEL = 1 | T17 |
| | Otherwise | T18 |

| Control State | Condition | Next Control State |
|---|---|---|
| T17 | | T18 |
| T18 | | T19 |
| T19 | If LEVEL > 3 | T27 |
| | Otherwise | T20 |
| T20 | | T21 |
| T21 | | T22 |
| T22 | If I = 1 | T23 |
| | Otherwise | T24 |
| T23 | | T24 |
| T24 | If I = NM1 | T27 |
| | Otherwise | T25 |
| T25 | | T21 |
| T26 | Operation of TREE subsystem complete - Commence at state | 79 |
| T27 | | T28 |
| T28 | | T29 |
| T29 | If ICNT is even | T31 |
| | Otherwise | T30 |
| T30 | | T32 |
| T31 | | T32 |
| T32 | | T33 |
| T33 | If IFIRST = 1 | T34 |
| | Otherwise | T35 |
| T34 | | T35 |
| T35 | If ID(IDUM + 9) is not equal to 0 | T37 |
| | Otherwise | T36 |
| T36 | | T37 |
| T37 | Operation of TREE subsystem complete - Commence at state | 79 |

COMPRS

| Control State | Condition | Next Control State |
|---|---|---|
| CP1 | | CP2 |
| CP2 | | CP3 |
| CP3 | | CP4 |
| CP4 | | CP5 |
| CP5 | If I = 3 | CP6a |
| | Otherwise | CP6 |
| CP6 | | CP4 |
| CP6a | | CP6b |
| CP6b | | CP6c |
| CP6c | If I = 6 | CP7 |
| | Otherwise | CP6d |
| CP6d | | CP6b |
| CP7 | | CP8 |
| CP8 | | CP9 |
| CP9 | | CP10 |
| CP10 | If I = 6 | CP12 |
| | Otherwise | CP11 |
| CP11 | | CP9 |
| CP12 | | CP13 |

| Control State | Condition | Next Control State |
|---|---|---|
| CP13 | If AVEVAR > 1 | CP14 |
| | Otherwise | CP15 |
| CP14 | | CP15 |
| CP14 | | CP15 |
| CP15 | | CP16 |
| CP16 | | CP17 |
| CP17 | If ICLASS is even | CP21 |
| | Otherwise | CP18 |
| CP18 | If (ID(K)/181) + L > 180 | CP19 |
| | Otherwise | CP20 |
| CP19 | SUBROUTINE REDUC | R1 |
| | RETURN TO | CP20 |
| CP20 | | CP25 |
| CP21 | | CP22 |
| CP22 | If (ID(K)/181) + L > 180 | CP23 |
| | Otherwise | CP24 |
| CP23 | | CP24 |
| CP24 | | CP25 |
| CP25 | | CP26 |
| CP26 | | CP27 |
| CP27 | | CP28 |
| CP28 | If I = 4 | CP29 |
| | Otherwise | CP31 |
| CP29 | | CP30 |
| CP30 | Operation of COMPRS subsystem complete - commence at state | 106 |
| CP31 | | CP27 |

REDUC

| | | |
|---|---|---|
| R1 | | R2 |
| R2 | | R3 |
| R3 | | R4 |
| R4 | | R5 |
| R5 | | R6 |
| R6 | | R7 |
| R7 | If I = 5 | R9 |
| | Otherwise | R8 |
| R8 | | R4 |
| R9 | Operation of REDUC subsystem complete - commence at state | CP20 |

COMBN

| | | |
|---|---|---|
| CB1 | | CB2 |
| CB2 | | CB3 |
| CB3 | | CB4 |
| CB4 | | CB5 |
| CB5 | | CB6 |
| CB6 | If I = 10 | CB7 |
| | Otherwise | CB6a |

| Control State | Condition | Next Control State |
|---|---|---|
| CB6a | | CB5 |
| CB7 | | CB8 |
| CB8 | | CB9 |
| CB9 | | CB10 |
| CB10 | | CB11 |
| CB11 | | CB12 |
| CB12 | | CB13 |
| CB13 | If I = 5 | CB15 |
| | Otherwise | CB14 |
| CB14 | | CB9 |
| CB15 | | CB16 |
| CB16 | If IDUM > 0 | CB17 |
| | Otherwise | CB21 |
| CB17 | | CB18 |
| CB18 | | CB19 |
| CB19 | If J = 9 | CB21 |
| | Otherwise | CB20 |
| CB20 | | CB18 |
| CB21 | | CB22 |
| CB22 | | CB23 |
| CB23 | If J = 9 | CB25 |
| | Otherwise | CB24 |
| CB24 | | CB22 |
| CB25 | If ID(IPTR) > IPTR-1 | CB26 |
| | Otherwise | CB27 |
| CB26 | | CB8 |
| CB27 | | CB28 |
| CB28 | If ID(IPTR) > IPTR-1 | CB29 |
| | Otherwise | CB30 |
| CB29 | | CB8 |
| CB30 | | CB31 |
| CB31 | | CB32 |
| CB32 | | CB33 |
| CB33 | | CB34 |
| CB34 | If I = 9 | CB36 |
| | Otherwise | CB35 |
| CB35 | | CB32 |
| CB36 | | CB37 |
| CB37 | | CB38 |
| CB38 | | CB39 |
| CB39 | | CB40 |
| CB40 | | CB41 |
| CB41 | If J = 3 | CB43 |
| | Otherwise | CB42 |
| CB42 | | CB39 |
| CB43 | | CB44 |
| CB44 | If I = 3 | CB45a |
| | Otherwise | CB45 |
| CB45 | | CB37 |
| CB46 | If ID(LEV1 + 1) > LEV1 | CB47 |
| | Otherwise | CB48 |
| CB47 | | CB3 |
| CB48 | Operations of COMBN subsystem complete - commence at state | 120 |

| Control State | Condition | Next Control State |
| --- | --- | --- |
| | MERGE1 | |
| MR1 | | MR2 |
| MR2 | | MR3 |
| MR3 | If ID(IPTR + 2) = 0 | MR7 |
| | Otherwise | MR4 |
| MR4 | If ID(IPTR + 1) > 1 | MR5 |
| | Otherwise | MR6 |
| MR5 | | MR3 |
| MR6 | Operation of MERGE1 subsystem complete - commence at state | 121 |
| MR7 | | MR8 |
| MR8 | | MR9 |
| MR9 | If IDUM > 1 | MR10 |
| | Otherwise | MR4 |
| MR10 | | MR11 |
| MR11 | If ID(IDUM + 13) = ID(IPTR + 13) | MR12 |
| | Otherwise | MR8 |
| MR12 | If ID(IDUM + 14) = ID(IPTR + 14) | MR13 |
| | Otherwise | MR8 |
| MR13 | If ID(IDUM + 15) = ID(IPTR + 15) | MR14 |
| | Otherwise | MR8 |
| MR14 | | MR15 |
| MR15 | | MR16 |
| MR16 | If IS > IQ | MR17 |
| | Otherwise | MR18 |
| MR17 | | MR15 |
| MR18 | | MR18a |
| MR18a | | MR19 |
| MR19 | If ISS > IR | MR20 |
| | Otherwise | MR21 |
| MR20 | | MR18a |
| MR21 | | MR22 |
| MR22 | | MR23 |
| MR23 | | MR24 |
| MR24 | If ID(IQ) = IK | MR28 |
| | Otherwise | MR25 |
| MR25 | | MR26 |
| MR26 | If IQ + 1 = ISAV1 | MR28a |
| | Otherwise | MR27 |
| MR27 | | MR24 |
| MR28 | | MR32 |
| MR28a | | MR29 |
| MR29 | If IR + 1 = ISAV2 | MR8 |
| | Otherwise | MR30 |
| MR30 | | MR23 |
| MR32 | | MR33 |
| MR33 | If ITT > IT | MR34 |
| | Otherwise | MR35 |
| MR34 | | MR32 |
| MR35 | | MR36 |
| MR36 | | MR37 |
| MR37 | If IVV = IV | MR38 |
| | Otherwise | MR39 |

| Control State | Condition | Next Control State |
|---|---|---|
| MR38 | | MR36 |
| MR39 | | MR40 |
| MR40 | | MR41 |
| MR41 | | MR42 |
| MR42 | If ID(IQQ) = IKK | MR49 |
| | Otherwise | MR43 |
| MR43 | | MR44 |
| MR44 | If IQQ + 1 = ISAV11 | MR46 |
| | Otherwise | MR45 |
| MR45 | | MR42 |
| MR46 | | MR47 |
| MR47 | If ISS = IQ + 2 | MR28 |
| | Otherwise | MR48 |
| MR48 | | MR41 |
| MR49 | | MR50 |
| MR50 | | MR51 |
| MR51 | | MR52 |
| MR52 | | MR53 |
| MR53 | If II(I) > 180 | MR55 |
| | Otherwise | MR56 |
| MR55 | | MR56 |
| MR56 | | MR57 |
| MR57 | If IJ(I) > 180 | MR58 |
| | Otherwise | MR59 |
| MR58 | | MR59 |
| MR59 | If I = 5 | MR61 |
| | Otherwise | MR60 |
| MR60 | | MR51 |
| MR61 | | MR62 |
| MR62 | | MR63 |
| MR63 | If I = 5 | MR65 |
| | Otherwise | MR64 |
| MR64 | | MR62 |
| MR65 | | MR44 |

COMBN2

| | | |
|---|---|---|
| CN1 | | CN2 |
| CN2 | | CN3 |
| CN3 | | CN4 |
| CN4 | | CN5 |
| CN5 | | CN6 |
| CN6 | If I = 10 | CN8 |
| | Otherwise | CN7 |
| CN7 | | CN5 |
| CN8 | | CN9 |
| CN9 | | CN10 |
| CN10 | | CN11 |
| CN11 | | CN12 |
| CN12 | If I = 5 | CN14 |
| | Otherwise | CN13 |
| CN13 | | CN10 |

| Control State | Condition | Next Control State |
|---|---|---|
| CN14 | | CN15 |
| CN15 | If IDUM > 0 | CN16 |
| | Otherwise | CN20 |
| CN16 | | CN17 |
| CN17 | | CN18 |
| CN18 | If J = 9 | CN20 |
| | Otherwise | CN19 |
| CN19 | | CN17 |
| CN20 | | CN21 |
| CN21 | | CN22 |
| CN22 | If J = 9 | CN24 |
| | Otherwise | CN23 |
| CN23 | | CN21 |
| CN24 | If ID(IPTR = LEV2 + 2) | CN27 |
| | Otherwise | CN25 |
| CN25 | | CN26 |
| CN26 | If ID(IPTR - 1) = 0 | CN24 |
| | Otherwise | CN9 |
| CN28 | | CN29 |
| CN29 | | CN30 |
| CN30 | | CN31 |
| CN31 | If I = 9 | CN33 |
| | Otherwise | CN32 |
| CN32 | | CN29 |
| CN33 | | CN34 |
| CN34 | | CN35 |
| CN35 | | CN36 |
| CN36 | | CN37 |
| CN37 | | CN38 |
| CN38 | If J = 3 | CN40 |
| | Otherwise | CN39 |
| CN39 | | CN36 |
| CN40 | | CN41 |
| CN41 | If I = 3 | CN43 |
| | Otherwise | CN42 |
| CN42 | | CN34 |
| CN43 | If ID(LEV2 + 1) = LEV1 + 3) | CN47 |
| | Otherwise | CN44 |
| CN44 | If ID(LEV1 + 1) > LEV1 | CN45 |
| | Otherwise | CN44a |
| CN44a | Operation of COMBN2 subsystem complete - commence at state | 122 |
| CN45 | | CN46 |
| CN46 | If ID(LEV1 + 2) = LEV1 | CN3 |
| | Otherwise | CN44 |
| CN47 | | CN48 |
| CN48 | If ID(LEV2) = 0 | CN43 |
| | Otherwise | CN49 |
| CN49 | | CN50 |
| CN50 | | CN4 |

| Control State | Condition | Next Control State |
|---|---|---|
| MG1 | | MG2 |
| MG2 | | MG3 |
| MG3 | | MG4 |
| MG4 | If ID(JU + 13) = 0 | MG18 |
| | Otherwise | MG5 |
| MG5 | If JU = JUI | MG6 |
| | Otherwise | MG7 |
| MG6 | If ID(JUI + 1) = JUI | MG30 |
| | Otherwise | MG7 |
| MG7 | If ID(JU + 1) = JUI | MG9 |
| | Otherwise | MG8 |
| MG8 | | MG9 |
| MG9 | If ID(IU + 1) = 1 | MG15 |
| | Otherwise | MG10 |
| MG10 | | MG11 |
| MG11 | If ID(IU + 2) = IU + 3 | MG12 |
| | Otherwise | MG14 |
| MG12 | | MG13 |
| MG13 | | MG4 |
| MG14 | If ID(IU + 1) = 1 | MG15 |
| | Otherwise | MG9 |
| MG15 | If ID(JL + 13) = 0 | MG16 |
| | Otherwise | MG17 |
| MG16 | | MG17 |
| MG17 | Operation of MERGE2 subsystem complete - commence at state | 123 |
| MG18 | | MG19 |
| MG19 | If JU = JUI | MG20 |
| | Otherwise | MG21 |
| MG20 | If ID(JU + 1) = JUI | MG30 |
| | Otherwise | MG21 |
| MG21 | | MG22 |
| MG22 | | MG23 |
| MG23 | If ID(JL) = 0 | MG28 |
| | Otherwise | MG24 |
| MG24 | If ID(JL + 13) = 0 | MG25 |
| | Otherwise | MG28 |
| MG25 | If ID(JL + 10) = ID(JU + 10) | MG26 |
| | Otherwise | MG28 |
| MG26 | If ID(JL + 11) = ID(JU + 11) | MG27 |
| | Otherwise | MG28 |
| MG27 | If ID(JL + 12) = ID(JU + 12) | MG45 |
| | Otherwise | MG28 |
| MG28 | | MG29 |
| MG29 | If ID(JL + 1) = JLI | MG30 |
| | Otherwise | MG22 |
| MG30 | If ID(IL + 1) = 1 | MG36 |
| | Otherwise | MG31 |
| MG31 | | MG32 |
| MG32 | If ID(IL + 2) = IL + 3 | MG34 |
| | Otherwise | MG33 |

| Control State | Condition | Next Control State |
|---|---|---|
| MG33 | If ID(IL + 1) = 1 | MG36 |
| | Otherwise | MG31 |
| MG34 | | MG35 |
| MG35 | | MG23 |
| MG36 | If ID(JU + 1) = JUI | MG9 |
| | Otherwise | MG37 |
| MG37 | | MG38 |
| MG38 | If ID(JU) = 0 | MG36 |
| | Otherwise | MG39 |
| MG39 | If ID(JU + 13) = 0 | MG40 |
| | Otherwise | MG41 |
| MG40 | | MG41 |
| MG41 | | MG42 |
| MG42 | If ID(JU + 1) = JUI | MG44 |
| | Otherwise | MG43 |
| MG43 | | MG23 |
| MG44 | If ID(IU + 1) = 1 | MG15 |
| | Otherwise | MG31 |
| MG45 | | MG46 |
| MG46 | | MG47 |
| MG47 | | MG47a |
| MG47a | | MG48 |
| MG48 | If IS = KKU | MG50 |
| | Otherwise | MG49 |
| MG49 | | MG47a |
| MG50 | | MG51 |
| MG51 | | MG52 |
| MG52 | If ISS = KKL | MG54 |
| | Otherwise | MG53 |
| MG53 | | MG50 |
| MG54 | | MG55 |
| MG55 | | MG56 |
| MG56 | | MG57 |
| MG57 | If ID(KL) = 0 | MG58 |
| | Otherwise | MG28 |
| MG58 | | MG59 |
| MG59 | If KL = ISAV2 - 1 | MG61 |
| | Otherwise | MG60 |
| MG60 | | MG56 |
| MG61 | If KU = KL | MG66 |
| | Otherwise | MG62 |
| MG62 | If ID(KU) = ID(KL) | MG69 |
| | Otherwise | MG63 |
| MG63 | | MG64 |
| MG64 | If K = KKL | MG66 |
| | Otherwise | MG65 |
| MG65 | | MG61 |
| MG66 | | MG67 |
| MG67 | If KL = ISAV2 - 1 | MG28 |
| | Otherwise | MG68 |
| MG68 | | MG56 |
| MG69 | | MG70 |
| MG70 | | MG71 |
| MG71 | | MG72 |
| MG72 | | MG73 |

| Control State | Condition | Next Control State |
|---|---|---|
| MG73 | If II(I) > 180 | MG74 |
| | Otherwise | MG75 |
| MG74 | | MG75 |
| MG75 | | MG76 |
| MG76 | If IJ(I) > 180 | MG77 |
| | Otherwise | MG78 |
| MG77 | | MG78 |
| MG78 | If I = 5 | MG80 |
| | Otherwise | MG79 |
| MG79 | | MG71 |
| MG80 | | MG81 |
| MG81 | | MG82 |
| MG82 | If I = 5 | MG84 |
| | Otherwise | MG83 |
| MG83 | | MG81 |
| MG84 | | MG66 |

SEARCH

| Control State | Condition | Next Control State |
|---|---|---|
| S1 | | S1a |
| S1a | | S2 |
| S2 | If ID(I) = K1 | S5 |
| | Otherwise | S3 |
| S3 | | S4 |
| S4 | If I = 1 | S10 |
| | Otherwise | S2 |
| S5 | | S6 |
| S6 | | S7 |
| S7 | If ID(J) = K2 | S12 |
| | Otherwise | S8 |
| S8 | | S9 |
| S9 | If J = JI | S10 |
| | Otherwise | S7 |
| S10 | | S11 |
| S11 | Operation of SEARCH subsystem complete - commence at state | 80 |
| S12 | | S13 |
| S13 | | S14 |
| S14 | If ID(K) = K3 | S17 |
| | Otherwise | S15 |
| S15 | | S16 |
| S16 | If K = KI | S10 |
| | Otherwise | S14 |
| S17 | | S18 |
| S18 | If ID(K + 7) > 0 | S20 |
| | Otherwise | S28 |
| S19 | | S20 |
| S20 | | S21 |
| S21 | | S22 |
| S22 | | S23 |
| S23 | | S24 |
| S24 | | S25 |

| Control State | Condition | Next Control State |
|---|---|---|
| S25 | If I = 5 | S27 |
| | Otherwise | S26 |
| S26 | | S22 |
| S27 | | S32 |
| S28 | | S29 |
| S29 | | S30 |
| S30 | If IX = 9 | S36 |
| | Otherwise | S31 |
| S31 | | S29 |
| S32 | | S33 |
| S33 | | S34 |
| S34 | If IX = 5 | S36 |
| | Otherwise | S35 |
| S35 | | S32 |
| S36 | | S36a |
| S36a | | S36b |
| S36b | If IX = 9 | S36d |
| | Otherwise | S36c |
| S36c | | S36a |
| S36d | | S37 |
| S37 | | S38 |
| S38 | If I = 10 | S40 |
| | Otherwise | S39 |
| S39 | | S37 |
| S40 | | S41 |
| S41 | | S42 |
| S42 | If I = 9 | S44 |
| | Otherwise | S43 |
| S43 | | S41 |
| S44 | | S45 |
| S45 | Operation of SEARCH subsystem complete - commence at state | 80 |

set to a constant for scaling of the data. In this particular embodiment, the scaling factor is set equal to 1.7/32768.

Control State 3: A logical storage register of memory 45, designated TRAIN, is utilized as a switch to control the system in either a training mode of operation or an execution mode of operation. When the TRAIN register is equal to a logical TRUE, the system is in a training mode. When the TRAIN register is equal to a logical FALSE, on the other hand, the system is to operate in an execution mode. During this control state, the TRAIN register is initially set equal to a logical TRUE, indicating that the system is first to operate in a training mode.

Control States 4–7: The I designated register of memory 45 is utilized as an indexing or counting register. During these control states the I register counts from 1 to 10, thereby setting each of 10 NSAMP registers equal to 0. The NSAMP registers are utilized to count the number of samples in each class.

Control States 8 and 9: A register of memory 45 is designated as the MINSAM register and contains the minimum number of data points trained over for any given spoken word. During this control state, the MINSAM register is initialized to contain a very large number, for example, 999,999. Another register of memory array 45, designated the NR register, counts the number of spoken words or distinct input signals read into the preprocessor. Since no signals have yet been set into the preprocessor, the NR register is initialized at 0.

Control State 9*a*: A register of memory array 45 which has been designated the ICLASS register is set equal to 1, indicating that the training will start with the first class, that is, with class $Z_1$.

Control States 10–30 (FIGS. 22*a* and 22*b*): During these control states the tape on which the input signals have been recorded in digital form are positioned and read so that the input signal is transmitted to the preprocessor in accordance with the way that the input signals are arranged on the tape as indicated by the position of the FTO3A switch. At Control State 25 a register of memory array 45, designated the IFIRST register, is set equal to 1, indicating that the word being read is the first of a group of six, and during Control State 26 a register of memory array 45, designated the ICNT register is set equal to 1, indicating that the present word of the six words in the group is the first word. The IFIRST register is set equal to 1 only for the first word of the group of six while the ICNT register is a counting register which counts from one to six, indicating the word presently being read.

Control States 30–34: In the present embodiment, 13,888 data points are read at a time and are stored in a series of IN registers. During these control states, up to 3,000 of the data points are examined, one at a time, beginning with the first data point $U_{t_1}$ to determine whether the data point is merely the result of noise or whether it contains some useful information. This is accomplished by comparing the data point with a threshold value such as 1927. If the value is less than 1927, then the signal is considered merely noise and ignored. If, however, the data point which has an amplitude value is greater than 1927, the data point is considered to contain information and the data points following that first significant data point will form the input signal actually considered by the system.

Figure 22A:
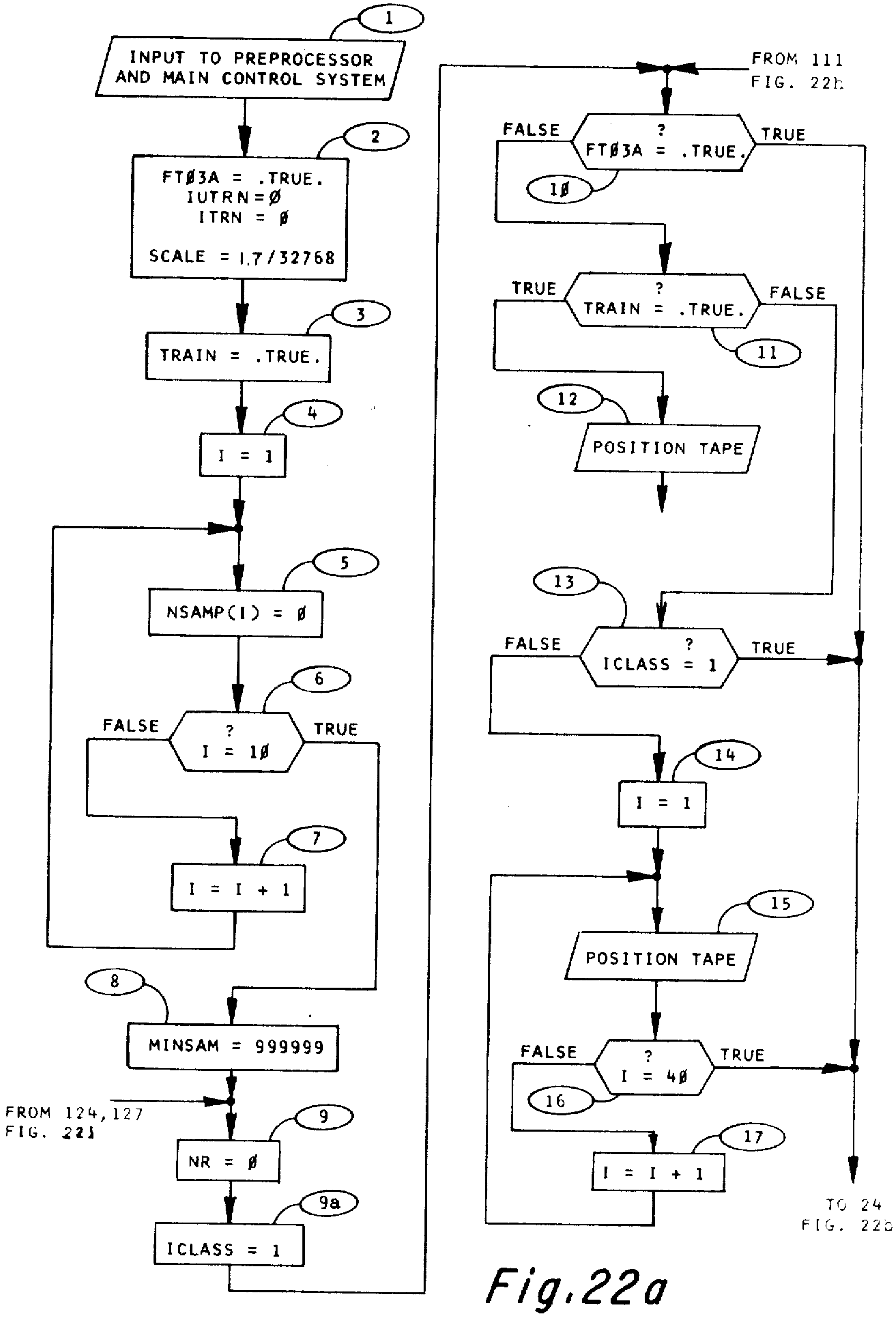
Figure 22B:
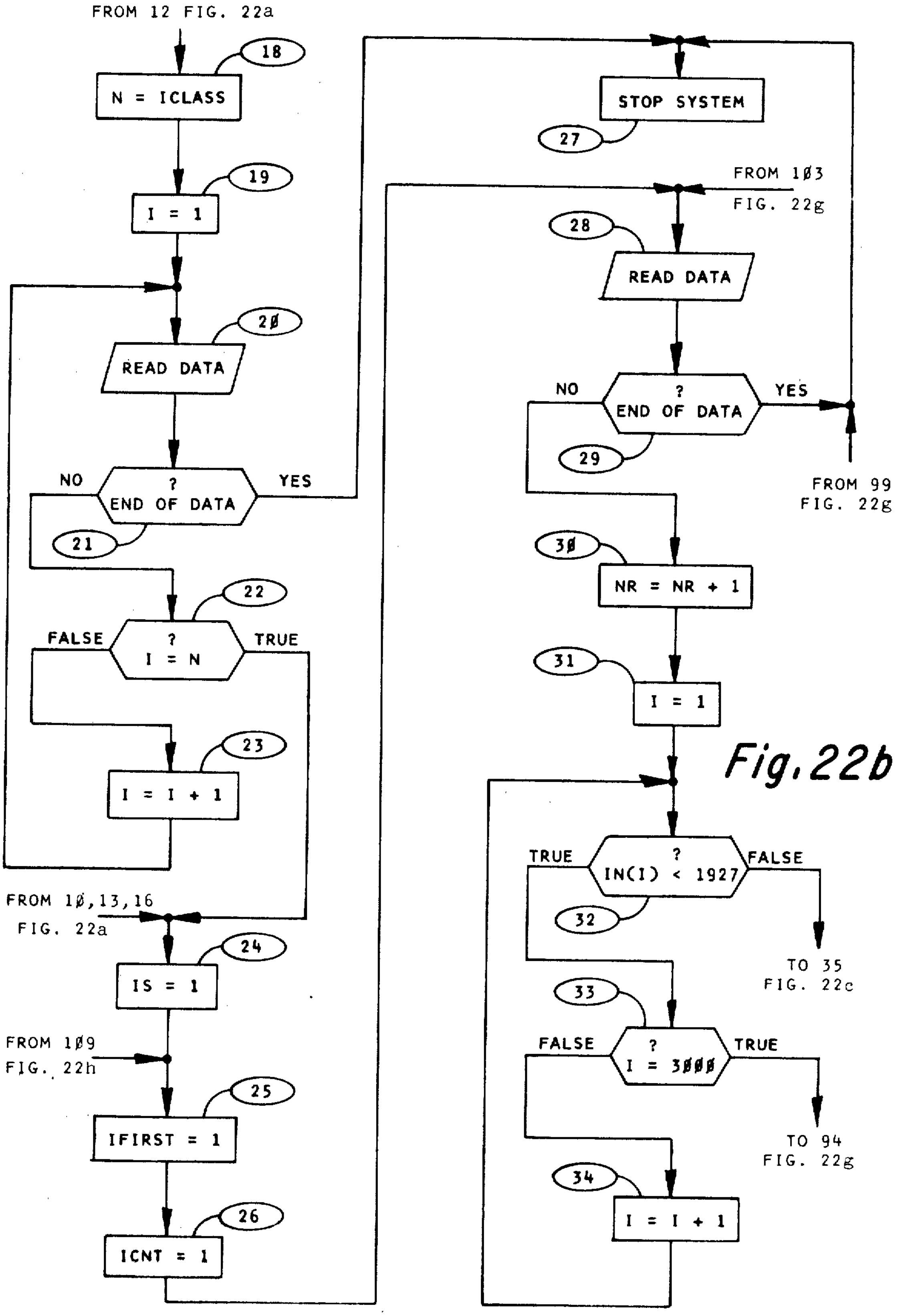
Figure 22C:
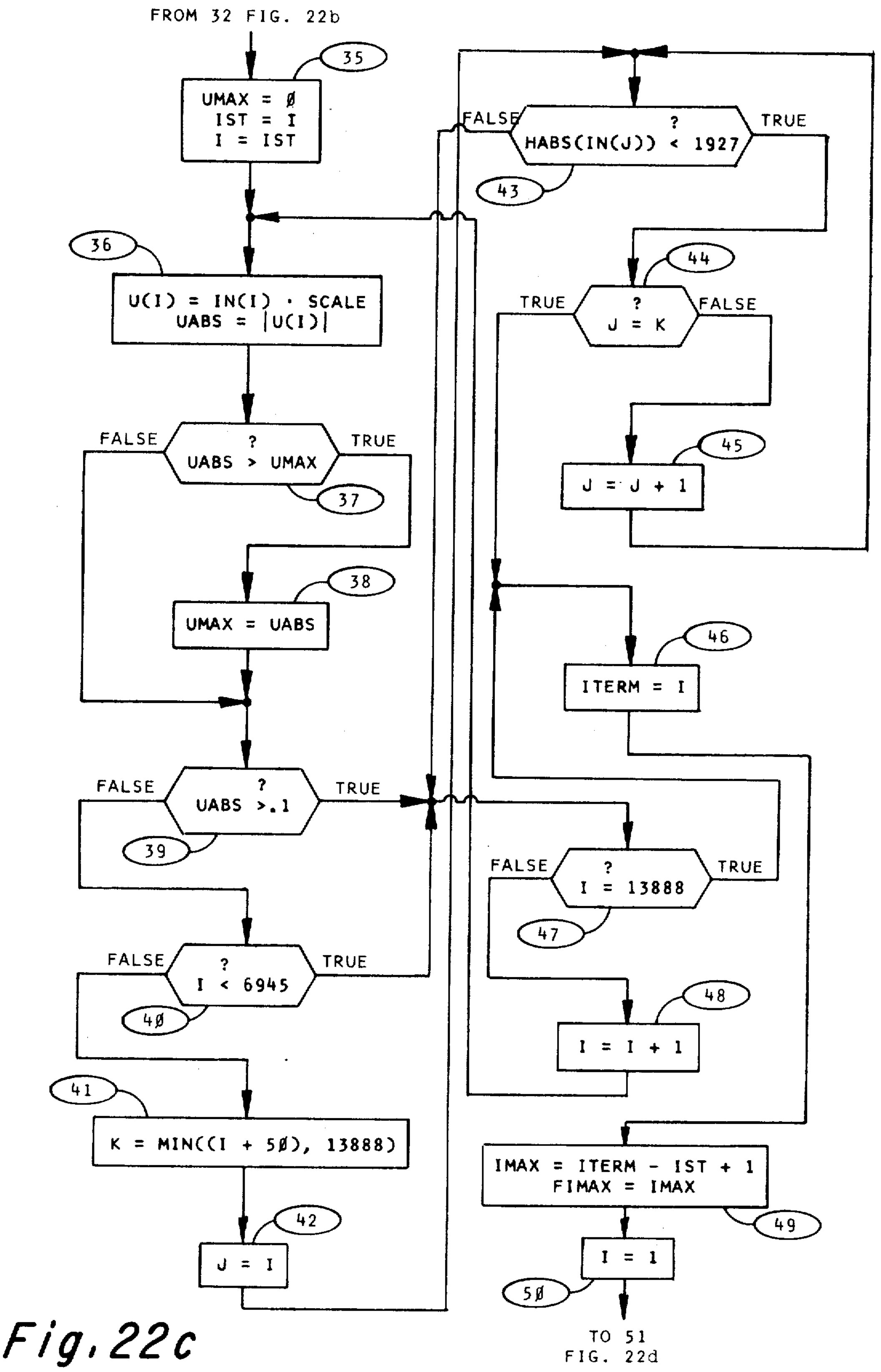
Figure 22D:
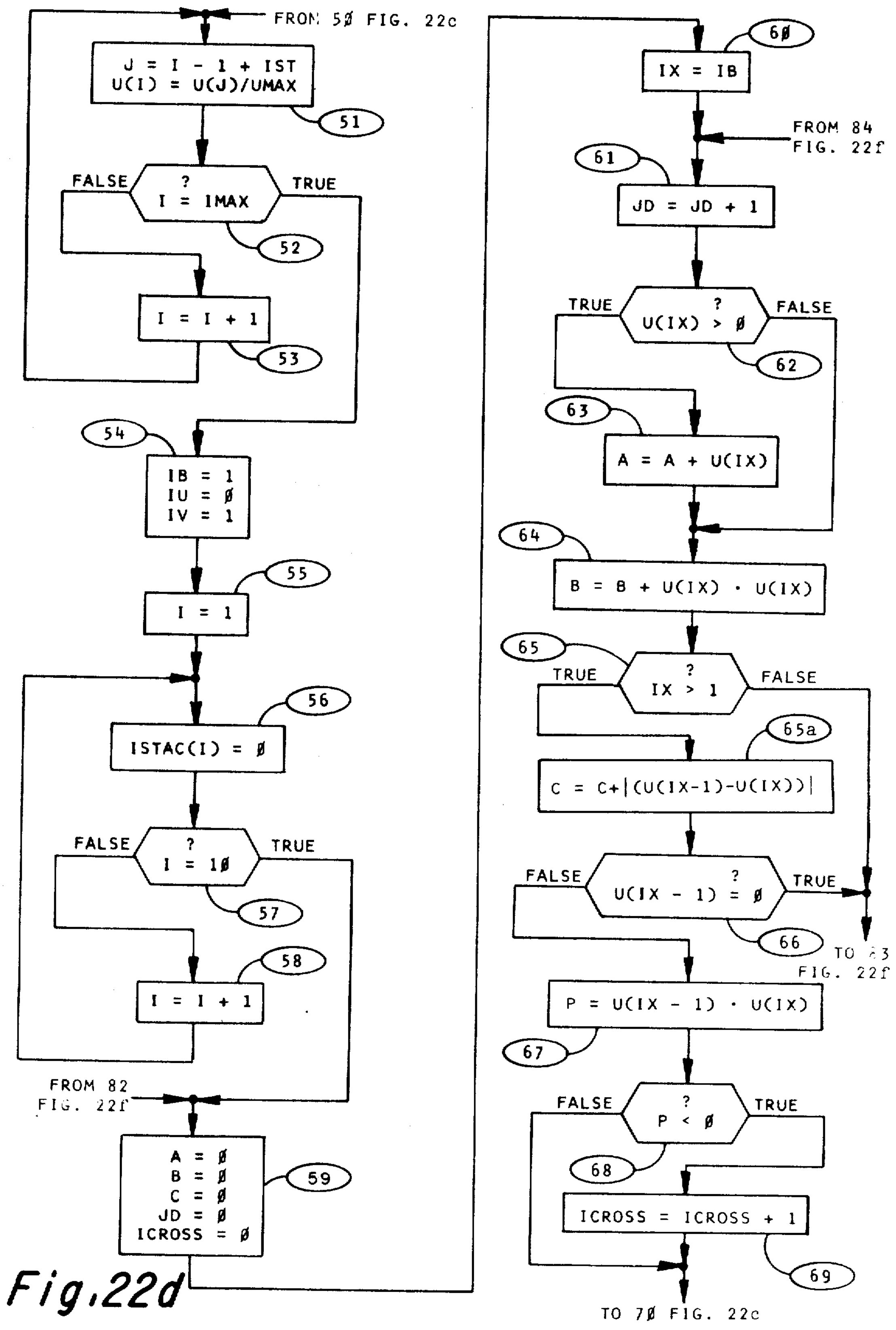
Figure 22E:
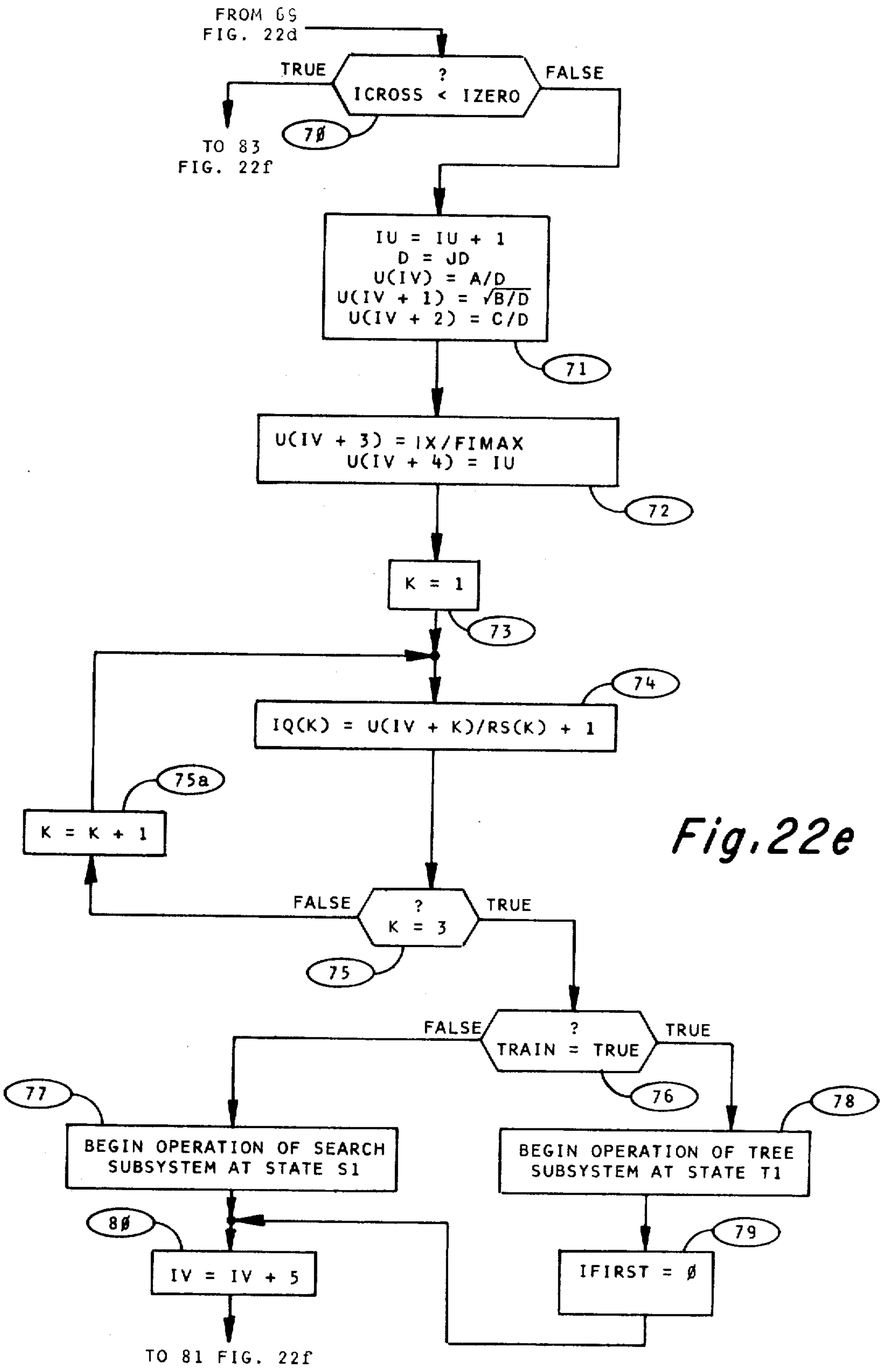

Control State 35: As illustrated in FIG. 22*c*, a UMAX register of memory 45 which will be used to store the maximum data point, that is, the data point having the greatest amplitude, is initialized to 0. At the same time an IST register is set equal to the present value of the I indexing register. From Control State 32, I has counted and stopped at an IN register containing data. Now, the IST register is going to save the relative position of the IN register having that first data point greater than the threshold value of 1927.

Control States 36–48: During Control state 36, the data points stored in the IN registers, beginning with the ISTth IN register, is scaled by the scaling factor stored in SCALE register of memory array 45 and then stored in one of a plurality of U REGISTERS. The process is repeated for each data point, one at a time, until all data points have been exhausted, as determined during Control States 43–48. The absolute value of the scaled data point stored in the Ith U register is taken and stored in a UABS register of memory array 45. As the data points are being scaled and placed in their respective U registers then, the absolute value UABS is compared to the maximum absolute value stored in the UMAX register of memory array 45. When during Control State 37 the absolute value of the present data point is greater than the maximum absolute value, the UMAX register is given the absolute value of the new data point during Control State 38. Also, during Control States 39–48, the present data point is examined to see whether it meets the threshold condition, and if it does not, it becomes the last data point of interest if all of the next 50 data points are also less than the threshold value. When either the last data point of interest has been found or all data points have been examined, the next control state becomes Control State 49.

Control State 49: During this control state, an IMAX register and a FIMAX (0MAX) register of memory array 45 are set equal to the total number of good data points as determined by adding one to the contents of the IST register containing the first good data point and subtracting the sum from the contents of the ITERM register which contains the last point of interest.

Control States 50–53 (FIGS. 22*c* and 22*d*): During this control state, the good data points, the number of which is determined by the contents of the FIMAX register are shifted in the U registers so that the first good data point is in the first U register (U(1)) and so forth. At the same time, the data is quantized to range from a maximum value of +1 to a minimum value of −1.

Control State 54: An IB register of memory array 45 is utilized to store the first point in a zero crossing interval, that is, the number of U register containing the first piece of information in an interval having a specific amount of zero crossings. An IU register of memory array 45 is utilized to store the number of zero crossing intervals for the entire set of good data points. During Control State 54, the IB register is initialized to 1 since we are starting with the first data point and the IU register is initialized to 0 since we are about to begin counting the number of zero crossing intervals. An IV or indexing register of memory 45 for the U array is initialized at 1.

Control States 55–58: Ten registers of memory 45 are designated as ISTAC registers and during these control states are, one at a time, all initialized at 0.

Control State 59: An A register of memory array 45 is utilized to accumulate the sum of the amplitudes stored in U registers. A B register of memory array 45 is utilized to store the sum of the squares of the amplitudes stored in U registers, and a C register of memory array 45 is utilized to store the sum of the absolute differences between each amplitude value and the preceding amplitude value. During this control state, the A, B and C registers are initialized to 0. Another register of memory array 45, designated the JD register, is utilized to accumulate the number of data points in each zero crossing interval, that is, in each interval having a given number of zero crossings and an INCROSS register counts the number of zero crossings. During this control state, the JD AND ICROSS registers are also initialized to 0.

Control State 60: An IX register of memory array 45 is set equal to the first point in the present zero crossing interval as determined by the contents of the ID register.

Control states 61–72 (FIGS. **22*d* and 22*e***): During these control states, five possible key components are formulated for the system by the preprocessor. These key components are then stored in the U memory array in groups of five, beginning with the IVth U register, where IV represents the contents of the IV register.

During Control States 62 and 63, the positive data points are accumulated in the A register. The sum of the squares is accumulated in the B register during Control State 64 and the sum of the differences is accumulated in the C register during Control State 65*a*. During Control States 66–71, the number of data points in a zero crossing interval having a number of zero crossings equal to the contents of the IZERO register of memory array 45 are accumulated in the IU register. The total number of data points in a zero crossing interval is accumulated in a D register of memory array 45. The five possible key components for this embodiment are then stored in the appropriated U registers.

Thus, in the IVth U register is stored the average amplitude value for the zero crossing interval having IZERO zero crossings. In the (IV + 1)th U register is stored the mean squared average for the ZERO crossing interval having IZERO zero crossings. The (IV + 2)th U register is set equal to the absolute value of the difference between the amplitude value of the last point in the zero crossing interval less the amplitude value of the first point in the zero crossing interval which is equal to the contents of the C register divided by the contents of the D register.

The fourth possible key component stored in the (IV + 3)th U register is set equal to the contents of the IX register divided by the contents of the FIMAX register. Lastly, the (IV + 4)th U register containing the fifth possible key component is set equal to the contents of the IU register which contains the number of ZERO crossing intervals, during Control State 72.

Control States 73–75: During these control states, three of the five key components are selected (in this case the first, second and third U registers of each five register set), quantized to suitable values for introduction into the tree and at the same time stored in three IQ registers.

Control State 76: During this control state, the contents of the TRAIN logical register is examined to determine whether the system is in a training mode of operation or an execution mode of operation. If the TRAIN register is in a logical TRUE position, the next control state will be 78, and the data stored in the three IQ registers will be introduced into the tree for training. Otherwise, the system is in an execution mode of operation, and the contents of the three IQ registers forming the key function $\{i,j,k\}$ will be introduced into the system of cascaded processors during Control State 77.

Control State 77: This control state is reached when the system is in an execution mode of operation. During this control state, a signal is generated to time-pulse distributor logic circuitry 34 which, in turn, repositions switch 23 to the S position. The pulses from clock 24 are thereby transferred to S counter 27. Signals from S counter 27 are then fed back through time-pulse distributor logic circuitry 34 and MAIN logic circuitry 35 for operation of SEARCH logic circuitry 43.

Control State 78: This control state is reached when the system is in a training mode of operation. During this control state, a signal is generated to time-pulse distributor logic circuitry 34, changing switch 23 to the T position and thereby transferring the pulses from clock 24 to T counter 26 for operation of tree logic circuitry 42.

Control State 79: Before the first key function is introduced into TREE subsystem 42 for formation of the single tree-structured nonlinear processor during Control State 78, the IFIRST register was set equal to 1. Now, after exiting TREE logic circuitry 42, the IFIRST register is set equal to 0, indicating that the system has operated through the tree for the first word of a group of six words or input signals in a class.

Control State 80: During this control state, the IV indexing register of memory array 45 is increased by 5, thereby skipping over the five U registers just utilized to store the last five possible key components and the system is now ready to examine the next zero crossing interval and store the next five possible key components in the next five U registers.

Figure 22F:
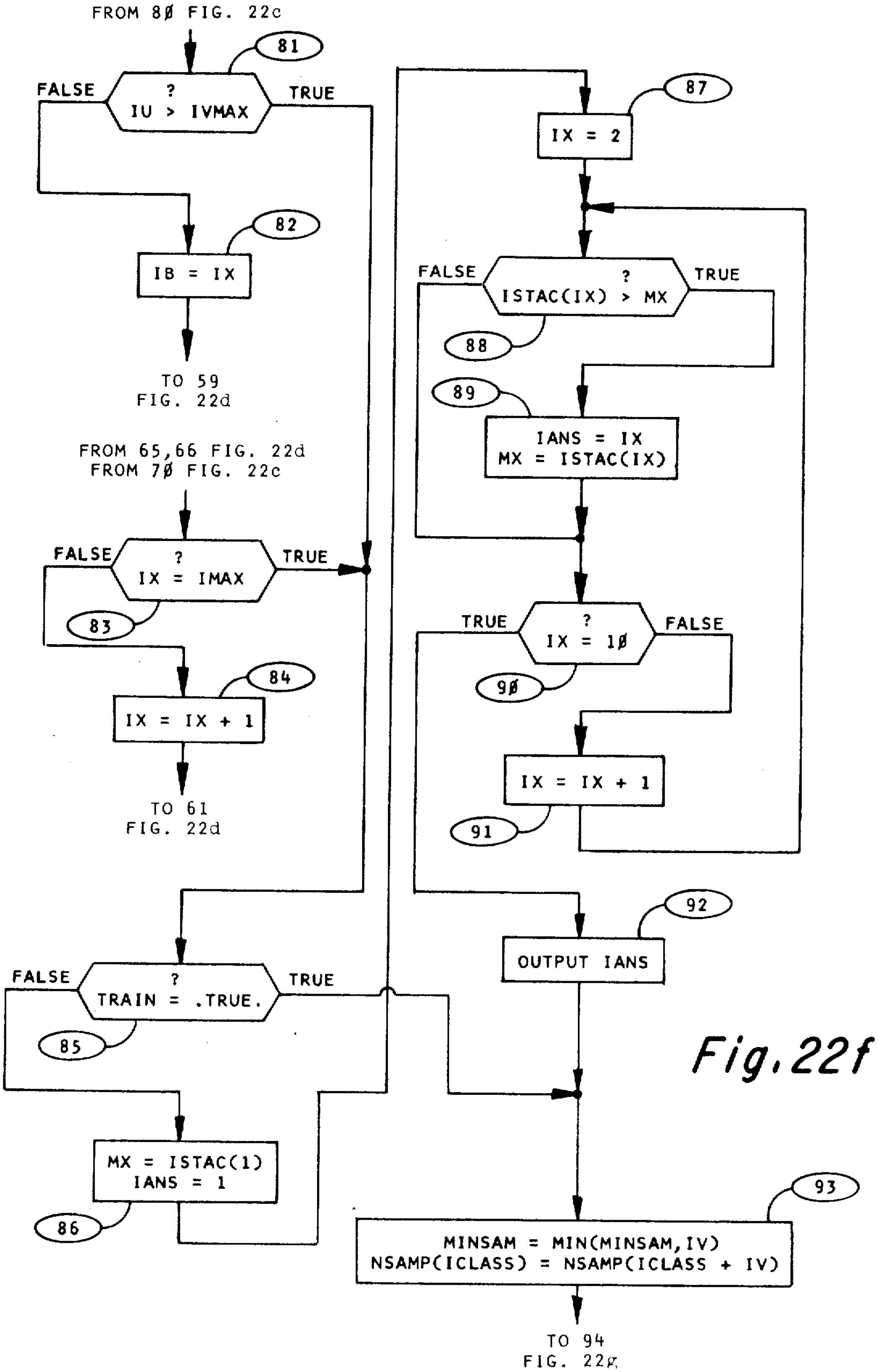

Control States 81 and 82: Referring now to FIG. 22f, during these control states the contents of the IVMAX register is examined to determine whether the maximum number of zero crossing intervals to be considered has been reached. For example, if at most 50 zero crossing intervals are to be considered for each input signal, the IVMAX register is set equal to 50 and during Control State 81 the contents of the IU register which contains the actual number of zero crossing intervals thus far encountered is compared to the contents of the IVMAX register. If the maximum number of zero crossing intervals has been reached, time-pulse distributor logic circuitry 34 resets M counter 25 to Control State 85. Otherwise, at Control State 86 the lower limit of the past zero crossing interval, register IB, is reset to the last value of the past zero crossing interval IX, and time-pulse distributor logic circuitry 34 is reset to Control state 59 for computation of the next five key components and the formation of the key function $\{i,j,k\}$.

Control States 83 and 84: Within a zero crossing interval, the contents of the IX register is compared to the contents of the IMAX register to determine whether the total number of total points comprising the input signal have been examined. If they have, then time-pulse distributor logic circuitry 34 resets M counter 25 to Control State 85. Otherwise, time-pulse distributor logic circuitry 34 resets M counter 25 to Control State 61 so that the next data point can be examined.

Control State 85: During this control state, the TRAIN logical register of memory 45 is again examined to determine whether the system is in a training mode of operation or in an execution mode of operation. If the TRAIN register is positioned to a logical TRUE, time-pulse distributor logic circuitry 34 resets M counter 25 so that the next control state will be 95. If the TRAIN logical register is in the FALSE position, however, the system must output an answer during Control States 86–92.

Control States 86–92: During Control States 86, an MX register which is to contain the maximum sum of probabilities is set equal to the contents of the first ISTAC register. In addition, an IANS register which is to contain the actual output of the system is initialized to a value of 1. The IANS register is then set, during Control State 89, to a number between 1 and 10, depending upon which word class $Z_1$–$Z_{10}$ has the highest probability.

When all 10 registers have been examined, the system outputs the contents of the IANS register which is the system's estimate of a correct desired response for the input signal. This occurs during Control State 92.

Control State 93: During this control state, the total number of data points processed by the system for each word class is individually accumulated and stored in the ICLASSth NSAMP register, where the contents of the ICLASS register indicates the word class of the present word.

Figure 22G:
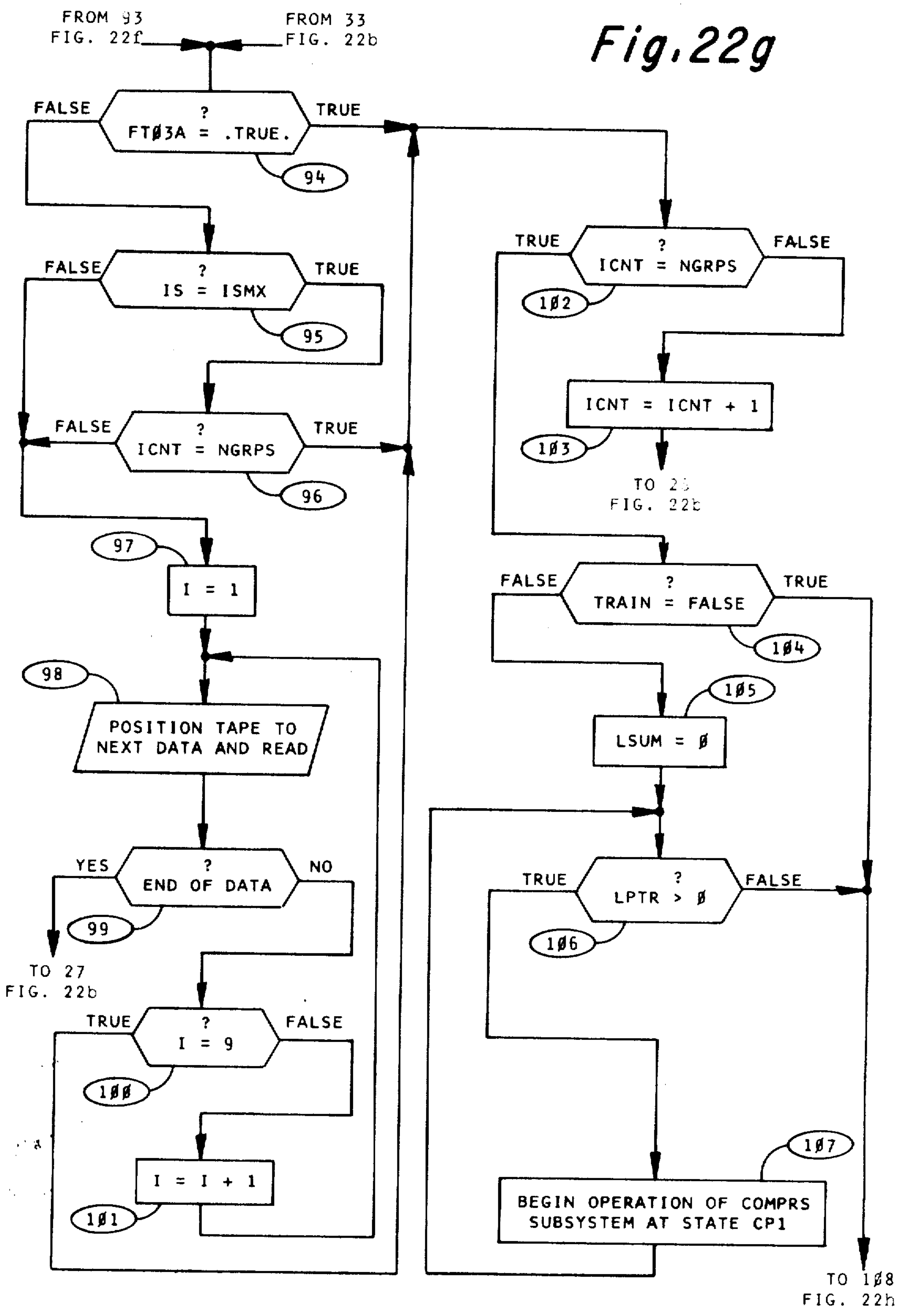
Figure 22H:
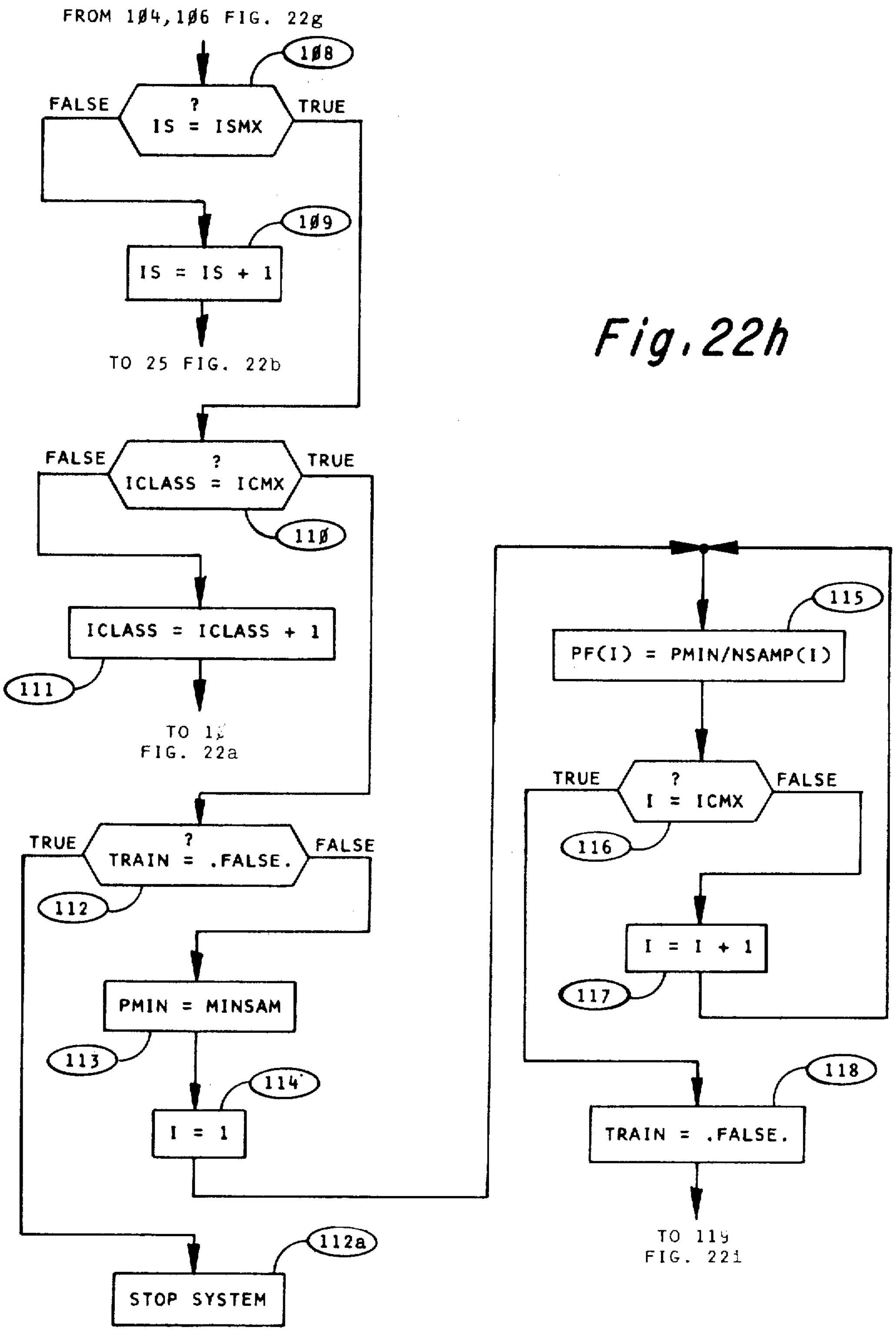
Figure 22I:
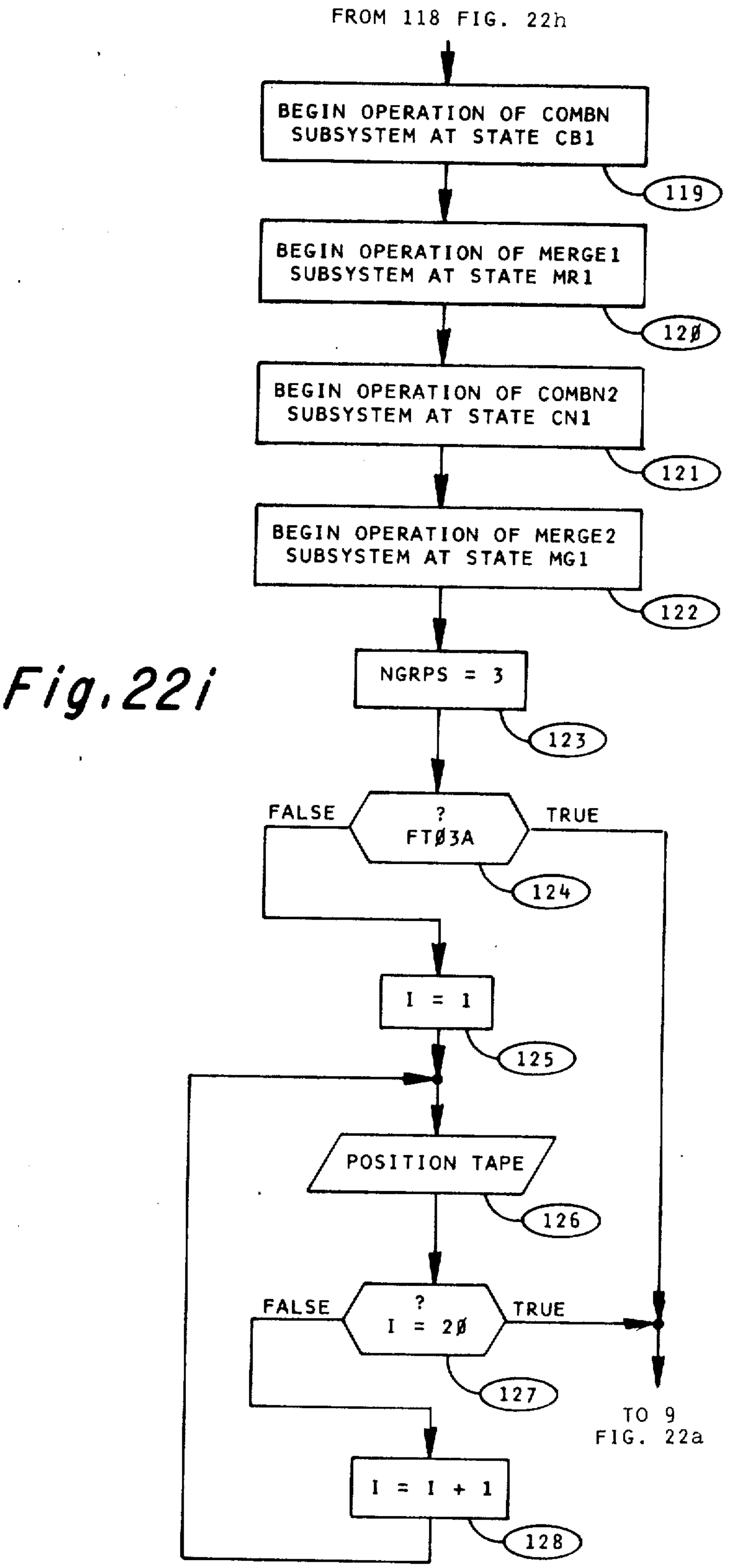

Control States 94–101: As illustrated in FIG. 22*g*, during Control State 94 the contents of the FTO3A logical register of memory 45 is examined to determine whether the tape from which the input signals are being read into the preprocessor is in the correct position. If not, the tape is repositioned accordingly.

Control States 102 and 103: As mentioned previously, the input signals are read into the preprocessor in groups of six. The present number of the group of six is stored in the ICNT register and the total number of words to be examined in each group (in this embodiment, 6) is stored in the NGRPS register. The contents of the ICNT and NGRPS registers are therefore examined during Control State 102 to determine whether all six words in the group have been preprocessed. If they have, time-pulse distributor logic circuitry 34 resets M counter 25 to Control State 104. Otherwise, the contents of the ICNT register is increased by 1, indicating that the next word of the six-word group is to be examined, and time-pulse distributor logic circuitry 34 resets M counter to Control State 28 where the next word of the six-word group is read into the preprocessor.

Control States 104–107: Control State 104 is reached when all six words of a six-word group have been preprocessed and the tree grown accordingly. The TRAIN logic register of memory 45 is examined during this control state, and if the system is operating in an execution mode of operation, time-pulse distributor logic circuitry 34 resets M counter 25 to Control State 108. Otherwise, if the system is in a training mode, an LSUM register is initialized to 0 and during Control State 107, time-pulse distributor logic circuitry 34 signals switch 23 to reset to position CP. Clock 24 then operates CP counter 29 which transmits control signals from time-pulse distributor logic circuitry 34 via MAIN logic circuitry 35 to COMPRS logic circuitry 37.

Control States 108 and 109: During this control state, the number of groups of six words or input signals in each class which is stored in the ISMX register is compared to the present number of words examined in the present word class IS as shown in the flow chart of FIG. 22*h*. If the contents of the IS register is less than the proposed number stored in the ISMX register, the processor has not examined all groups of six words or input signals in the present class, and time-pulse distributor logic circuitry 34 resets M counter to Control State 25 so that the next six-word group of the same class is examined.

Control States 110 and 111: During this control state, the present class which identification is stored in the ICLASS register is compared to the maximum number of classes which number is stored in the ICMX register (in this embodiment 10, $Z_1$–$Z_{10}$) to determine whether all classes have been examined. If all classes have not been examined, time-pulse distributor logic circuitry 34 resets M counter to Control State 10 so that the operation of the system is recycled for the next class.

Control States 112–118: Control State 112 is reached when all words and all groups of six words for all classes have been examined. If the system has operated in an execution mode, time-pulse distributor logic circuitry 34 resets M counter to Control State 112*a* and the system is turned-off. Otherwise, some registers of memory array 45 are set to initial values, for example, the PMIN register is set equal to the minimum number of samples stored in the MINSAM register; ten PF registers are set equal to the total number of samples per word class. Finally, at Control State 118 the TRAIN logic register is set in the FALSE position, thereby transferring the system from a training mode of operation to the process of synthetically converting of the system to cascaded processors for execution.

Control States 119–122: At Control State 119, illustrated in FIG. 22*i*, the process to convert the single tree-structured nonlinear processor into a system of cascaded processors commences. A signal is transmitted from MAIN logic circuitry 35 to time-pulse distributor logic circuitry 34 which in turn positions switch 23, transferring operation of clock 24 to CB counter 31. CB counter 31 then operates COMBN logic circuitry 40 via time-pulse distributor logic circuitry 34 and MAIN logic circuitry 35. CB counter 31 beings at Control State CB1 and continues until a logical condition occurs in COMBN logic circuitry 40 which causes time-pulse distributor logic circuitry 34 to transfer control of clock 24 to M counter 25, making the next M Control State 120. At Control State 120, then, a signal is transmitted by MAIN logic circuitry 35 to time-pulse distributor logic circuitry 34 which in turn positions switch 23, transferring operation of clock 24 to MR counter 32 and thereby beginning operation of MERGE1 logic circuitry 38 at Control State MR1. When a certain condition occurs in logic circuitry 38, MAIN logic circuitry 35 transmits another signal to time-pulse distributor logic circuitry 34 repositioning switch 23 and again transferring operation of clock 24 to M counter 25. The next M control state is then 121. During Control State 121, a signal is transmitted from MAIN logic circuitry 35 to time-pulse distributor logic circuitry 34 thereby positioning switch 23. This time operation of clock 24 is transferred to ON counter 30 for operation of COMBN2 logic circuitry 41. When a certain logical condition occurs in the COMBN2 logic circuitry, control of clock 24 is transferred back to M counter 25 and the next control state is 122. At Control State 122, a signal is transmitted from MAIN logic circuitry 35 to time-pulse distributor logic circuitry 34, which in turn repositions switch 24 to the MG position. The next control state is then MG1 provided by MG counter 33 for operation of MERGE2 logic circuitry 39. When the operation of MERGE2 logic circuitry 39 is complete, a signal is transmitted via MAIN logic circuitry 35 to time-pulse distributor 34 to reposition switch 23 to the M position. The next M control state is 123.

Control States 123 and 124: It is sometimes desirable to test the effectiveness of the completed synthetic cascaded processor system. For this purpose, additional training signals for which desired responses are known, are introduced into the system while the system is in an execution mode of operation. The system will generate an actual output signal (stored in the IANS register during Control State 89 and generated during Control State 92). This actual output may then be compared to the desired response which is known because the input signal is a training signal rather than an execution signal. If the two are equal, then the system is operating properly; if the two are unequal, most likely additional training signals are required in that word class to grow a larger tree-structured matrix. During these control states then, the training tape is repositioned if necessary and several additional training signals are run through the system in the execution mode. For this purpose, the TRAIN register has already been set for execution during Control State 118, and counter 25 is now reset to Control State 9.

Figure 23A:
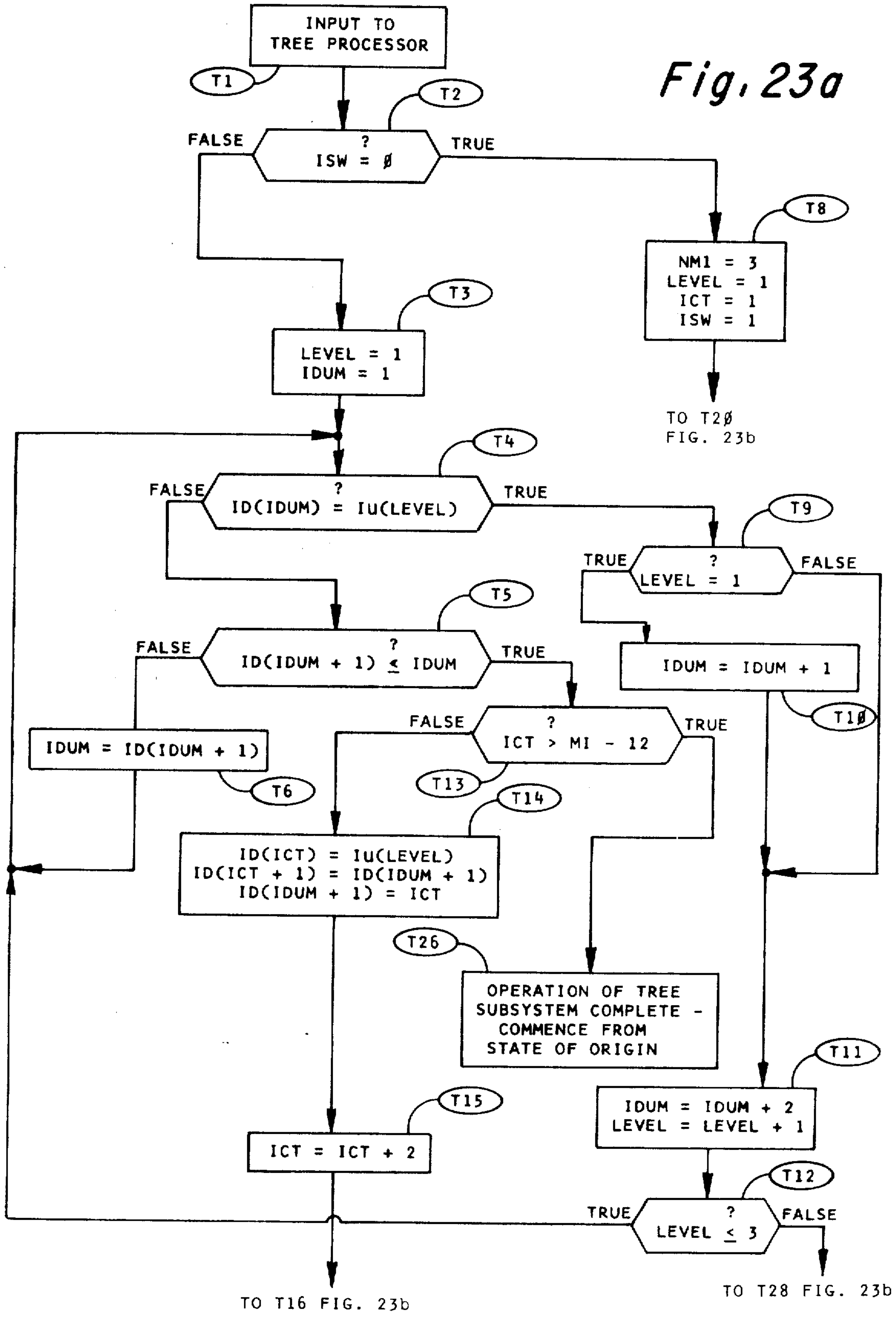
Figure 23B:
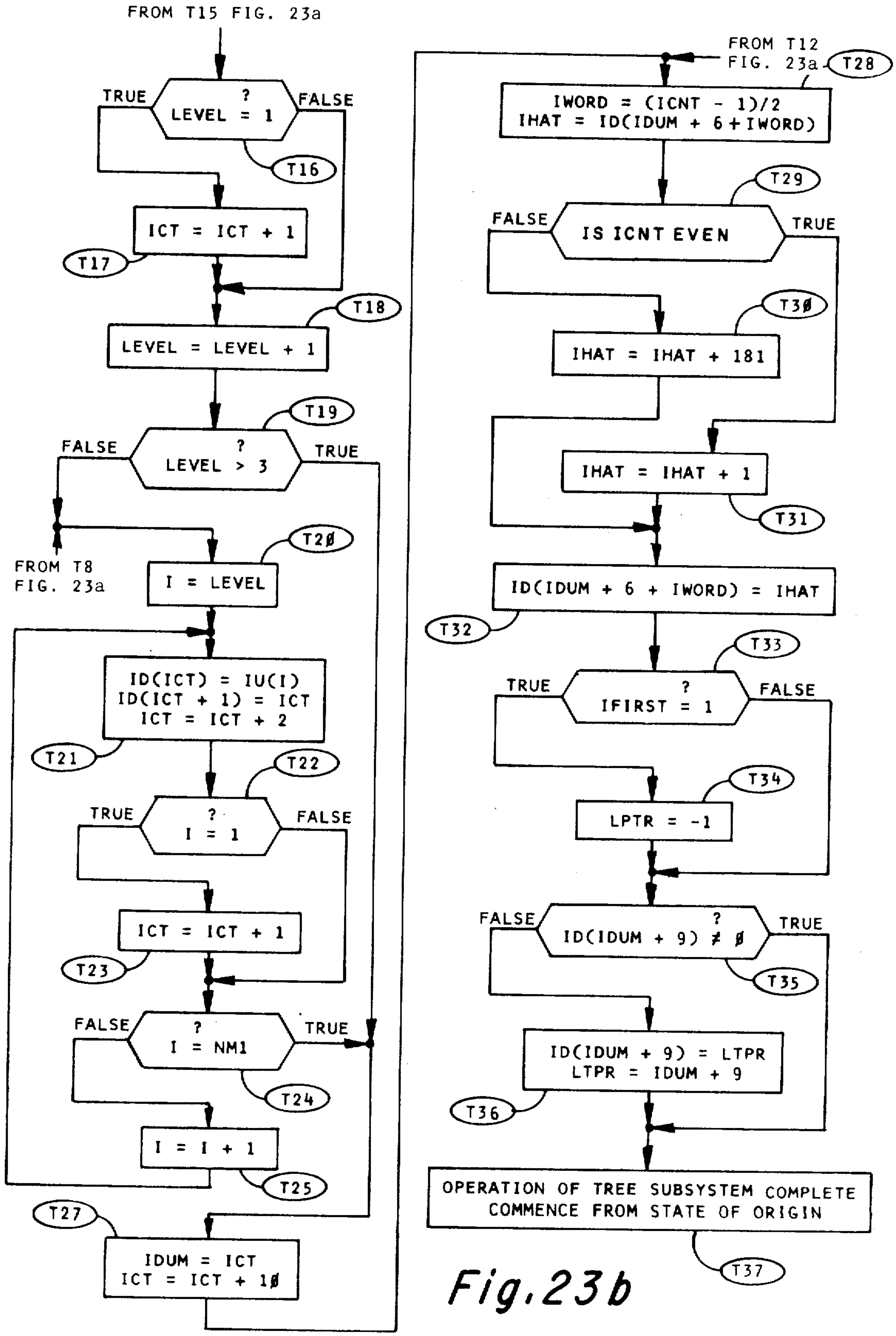

Control State T1: Referring to FIG. 23*a*, this control state is reached when, during Control State 78, switch 23 is set in the T position; thereby transferring operation of clock 24 to T counter 26. Operation of TREE logic circuitry 42 then controls the operation of the system.

Control State T2: The ISW designated register of memory array 45 is utilized to indicate whether the TREE subsystem is being utilized for the first time. The ISW register is set equal to 0 during operation of MAIN logic circuitry 35 prior to the first time that TREE logic circuitry 42 is operated. Thereafter, the ISW register is set equal to a value other than 0, indicating that the tree structure has begun formation. During this control state then, the ISW register is examined to determine whether it contains a 0. If it does contain a 0, T counter 26 is set to Control State T8. Otherwise, the next control state provided by T counter 26 is Control State T3.

Control State T3: The LEVEL register keeps track of the current level of the tree being operated upon and is initially set equal to 1 for the first level of the tree during this control state. An IDUM designated register of memory array 45 keeps track of a location in ID memory array 44. The ID memory array registers are utilized for the formation of the tree-structured matrix and the IDUM register is initially set equal to 1, indicating that the first location in the ID array is register 0001. The IDUM register will henceforth contain a location in the ID array which is a node number and also a VAL register.

Control State T4 : During this control state, the contents of the IDUMth ID register, which is a VAL register, is compared to the LEVELth IU register containing the current key component ($i$, $j$ or $k$) LEVEL being equal to a number from 1 to 3. If the contents of the VAL register is equal to the current key component, T counter 26 is set to Control State T9 so that the next key component can be compared to the contents of a VAL register in the next respective level. If the contents of the VAL register is not equal to the current key component, T counter 26 continues to the next Control State T5.

Control States T5 and T6: Since the IDUMth ID register is a VAL register, the next of (IDUM + 1)th ID register is an $ADP_i$ register. During this control state, such $ADP_i$ register is examined to see if there are other nodes in the same filial set. Thus, if the $ADP_i$ register contains a number which is equal to the contents of the IDUM register, this means that the node points back to itself, and there are no other nodes in that filial set; T counter 26 is accordingly set to Control State T13. If it is determined that there are other nodes in the filial set, the contents of the $ADP_i$ register is the address of the next node in the filial set, and hence is placed into the IDUM register during Control State T6 and T counter 26 is reset to Control State T4 so that the contents of the VAL register of such next node in the filial set can be compared to the current key component.

Control State T8: This control state is reached when, during Control State T2, there is an indication that TREE logic circuitry 42 is being used for the first time and hence all registers of ID memory array 44 are equal to 0. Accordingly, several registers of memory array 45 are initialized during this control state. An NM1 register which contains the total number of levels in the tree is set. In this embodiment, the tree has three levels (*i*, *j* and *k*), and therefore the NM1 register is set equal to 3. The LEVEL register is set equal to 1, indicating that it is to begin at the first or $i^{th}$ level of the tree. An ICT register is set equal to the address of the next unused register in the ID memory array and since the ID memory array is completely blank (equal to o's), the ICT register is set equal to 1, indicating that the first available register in memory array 44 is register 0001. In addition, the ISW register is now set equal to 1, indicating that TREE logic circuitry 42 has been used, so that the initialization which occurs during this control state will not reoccur in future entries to the TREE subsystem. When the initialization has been completed, T counter 26 is automatically set to Control State T20.

Control States T9–T12: Control State T9 is reached when the contents of the VAL register matches a current key component. During Control State T9, the contents of the LEVEL register is examined to determine whether the match occurred at the first level. This determination must be made because, contrary to the embodiment illustrated in FIGS. 6–20, the $ADP_o$ register for the second level is positioned at the end of the leaf level rather than at the end of the second level. Although such repositioning has no consequence in the system's operation, the position of this $ADP_o$ must be kept track of in discussing this embodiment. In other words, in this embodiment the first level of the tree has three registers — a VAL register, an $ADP_i$ register, and an $ADP_o$ register. The second level of the tree essentially also has three registers although only two registers are accounted for — the second level VAL register and the second level $ADP_i$ register. The third level will then have thirteen registers — its VAL register, its $ADP_i$ register, 10 N or statistical registers, and the 13th register will be the $ADP_o$ register of the second level node from which such third level entry node extends. Thus, if we are in the first level, the contents of the IDUM register is set equal to the register address of the $ADP_i$ register of such first level node during Control State T10. But, on the other hand, if a match occurred in the second level, the IDUM register holds the address of the first level VAL register. Then during Control State T11 the contents of the IDUM register is increased by 2, thereby placing the address of the extending node in the next level into the IDUM register whether the level at which the match occurred was the first level or the second level. A 1 is added to the contents of the LEVEL register, indicating that we have advanced to the next level, but if the last level was the third level, T counter 26 is set to Control State T28 for the storage of statistics in the N registers. If the last level was the first or second level, T counter 26 is reset to Control State T4 so that the contents of the VAL register of such next level can be compared with a next corresponding key component of the key function.

Control States T13 and T26: Control State T13 is reached when there has been no match of a VAL register and a corresponding key component and the $ADP_i$ of the node in question points back to itself, indicating that there are no further nodes in the filial set. During Control State T13 then, the contents of the ICT register which indicates the next available node in ID memory array 44 to see if there are still enough registers in the ID memory array to grow a new set of nodes. If there are not enough, operation of the TREE subsystem ends at Control State T26 and control of the system is returned to MAIN logic circuitry 35 by setting switch 23 to the M position. If, on the other hand, it is determined that there are still enough registers in the ID array to grow a new level on the tree, T counter 26 is not reset, and the next control state is then T14.

Control State T14: During this control state, a new node is constructed in the tree. The address of the next available register in ID memory array 44 is contained in the ICT register. Therefore, the ICTth ID register becomes a VAL register and the corresponding key component stored in the LEVELth IU register is inserted into that VAL register. The (ICT + 1)th ID register is an $ADP_i$ register and given the value of the entry node of the filial set stored in the (IDUM + 1)th ID register. Since this new node is the last node of the filial set, the previous node in the filial set (which pointed to the entry node) must now point to the new node. The (IDUM + 1)th ID register which is the $ADP_i$ register of the previous node is therefore set equal to the contents of the ICT register which is the address of the new node.

Control States T15–T17 (FIGS. 23*a* and 23*b*): Once the new node has been grown, it is necessary to continue out to the third level growing nodes therefrom corresponding to each of the key components. This is accomplished by increasing the ICT register contents by 2. Then during Control State T16 the LEVEL register is examined to see if the new node is grown in the first level. If that is the case, an extra register must be reserved as an $ADP_o$ register for the first level; therefore, during Control State T17, an additional 1 is added to the contents of the ICT register.

Control States T18 and T19: During Control State T18, a 1 is added to the LEVEL register contents, indicating that a node has been grown in the present level and now the next key component must be operated upon in the next level. However, if during Control State T19 it is determined that the levels have been exhausted, T counter 26 must be reset to Control State T27 so that the desired response corresponding to the key function which defined the path to that third level node may be utilized to update the statistical registers.

Control States T20–T25: During these control states, a new node is grown extending from a new node grown in the previous level. This is accomplished during Control State T21 when the contents of the $i^{th}$ IU register containing the present key component is inserted into the ICTth ID register which is the next available register in ID memory array 44 and becomes the VAL register for the new node. The next available register or the (ICT + 1)th ID register is an $ADP_f$ register for the new node and is given the address of the node stored in the ICT register since it is thus far the only node of its filial set and must point back to itself. The ICT register is then increased by 2 or if the new node has been added to the first level, an extra 1 is added to the ICT register during Control State T23, reserving a register for the first level $ADP_0$. During Control State T24, a check is made to see if the last level has been filled. If it has not been filled, the next level is advanced to during Control State T25 and the process begins again from Control State T21. If the last level has been reached, however, T counter 26 is reset to Control State T27 so that the leaf level's statistics can be updated according to the desired response for the path defined in accordance with the key function leading to such leaf node.

Control State T27: This control state is reached when a leaf level node has just been created. The IDUM register is set to indicate the address of the first N or statistical register of the leaf level node and the ICT register skips 10 additional register addresses, nine for additional N or statistical registers (a total of 10 altogether, $N_1$–$N_{10}$) and one register for the second level $ADP_0$ register.

Control States T28–T37: Control State T28 is reached any time a path has been followed or defined in accordance with a key function out of the leaf level. During these control states, the leaf level node's statistical registers are updated according to the desired response associated with such key function. In this embodiment, initially, the leaf level statistics are stored only in the seventh, eighth, and ninth statistical registers for each six-word or input signal group of the same class ($Z_1$, $Z_2$ etc.). This is accomplished by storing the statistics for two of the six words in the same register. In order to do this, an N register will accumulate statistics from 0 to 180, for example, corresponding to an odd word of the six word group (first, third and fifth) and accumulate statistics beginning with 181 = 1 for an even word of the six word group (second, fourth, and sixth). No interference occurs because all six words belong to the same class. When the statistical register corresponding to the desired output for the present key function has been updated, Control State T37 is reached and a signal transmitted via MAIN logic circuitry 35 to time-pulse distributor logic circuitry 34. Time-pulse distributor logic circuitry 34 then sets switch 23 to the M position so that clock 24 will operate M counter 25 and return operation of the system back to the MAIN logic circuitry at Control State 79.

Control State CP1 (FIG. 24*a*): This control state is reached when during Control State 107 of the operation of MAIN logic circuitry 35, time-pulse distributor logic circuitry 34 sets switch 23 in the CP position, transferring control of this system to COMPRS logic circuitry 37.

Control States CP2–CP30 (FIGS. 24*a* and 24*b*): The necessity for COMPRS logic circuitry 37 arises because in this embodiment the statistical data for each six-word group is initially stored in the seventh, eighth and ninth statistical registers. During these control states, COMPRS logic circuitry 37 is utilized after the tree-structured memory matrix has been grown in accordance with all six of the words or input signals in the group of six. It is now necessary to transfer this information to the first five statistical registers in a register sharing fashion similar to the method of storage of statistics in the seventh, eighth and ninth statistical registers. The decoding of registers 7, 8 and 9 takes place during Control State CP4 by dividing the contents of the registers by 181, the quotient being the statistics belonging to the even group and the remainder of the division being the statistics belonging to the odd group. After these registers have been decoded, the average variance is calculated at Control States CP8–CP15. The statistics are then recoded into registers $N_1$–$N_5$. Since there are 10 possible desired outputs, the statistics associated with each of two desired outputs must be stored in a single register. Therefore, if the classification is odd ($Z_1$, $Z_3$, $Z_5$, $Z_7$ or $Z_9$), a 1 is added to the corresponding N register. On the other hand, if the classification is even ($Z_2$, $Z_4$, $Z_6$, $Z_8$ or $Z_{10}$), 181 is added to the contents of the appropriate N register. The division of numbers from 0–180 and 181 and up is arbitrary, and any dividing line can be used. The significance of the 180 in this embodiment corresponds to the relative size of the register in which the statistical data is being stored, that is, the number of binary bits per register. In the event that a path to a leaf level node has been reached more than 180 times for any particular word class, the statistics associated with the other class stored in the same register would be commingled and thereby confused. In order to avoid this situation, REDUC logic circuitry 36 is employed. During Control States CP19 and CP23, a signal is transmitted from COMPRS logic circuitry 37 to time-pulse distributor logic circuitry 34 so that switch 23 may be set in the R position for operation of R counter 28. R counter 28 therefore transfers operation of the system to REDUC logic circuitry 36 for reduction of the statistics stored in statistical registers $N_1$–$N_5$. When the statistics for the six-word group have all been transferred from statistical registers $N_7$–$N_9$ to statistical registers $N_1$–$N_5$, operation of the system is transferred back to MAIN logic circuitry 35 during Control State CP 30. This is accomplished by the transmission of a signal from MAIN logic circuitry 35 to switch 23 which is accordingly set to the M position. M counter 25 then recommences operation at the MAIN logic circuitry at Control State 106.

Control States R1–R9: Referring to FIG. 25, Control State R1 comes into existence when during Control State CP19 or Control State CP23 a signal is transmitted from COMPRS logic circuitry 37 to time-pulse distributor logic circuitry 34, setting switch 23 to the R position. Clock 24 then operates R counter 28, commencing with Control State R1. This induces operation of REDUC logic circuitry 36 which has the purpose of reducing the statistics stored in the first five N registers when such statistics reach the midpoint 180. This is accomplished by decoding the contents of the first five N registers and dividing the 10 statistical accumulations by 2. Therefore, the statistical accumulation which reached 180 is now reduced to 90, and the remaining nine statistical accumulations are reduced accordingly. Once the reduction has taken place, the reduced statistics are inserted back into the first five statistical registers. The sixth N register of the leaf is used to accumulate the number of times that the reduction has taken place in that leaf by adding 10,000 to it so that the statistics may be restored to their original values simply by multiplying the reduced values by $2^p$ where $p$ is equal to the number of times that the reduction has taken place. Control State R9 is reached when the reduction is complete and the statistics restored in registers $N_1$–$N_5$. At Control State R9, a signal is given to time-pulse distributor logic circuitry 34 from COMPRS logic circuitry 37 so that operation of the system may be transferred back to COMPRS logic circuitry 37. This is accomplished when time-pulse distributor logic circuitry 34 transmits a signal setting switch 23 to the CP position; operation of CP counter 29 commences with Control State CP20 if the last CP control state was 19 or CP24 if the last CP control state was 23.

Control State CB 1: As illustrated in FIG. **26*a*, Control State CB1 commences operation of COMBN logic circuitry 40. This control state occurs when, during Control State 119 a signal is given to time-pulse distributor logic circuitry 34 by MAIN logic circuitry 35. Time-pulse distributor logic circuitry 34, in turn, sets switch 23 to the CB position so that clock 24 may operate CB counter 31 and thereby transfer operation of the system to COMBN logic circuitry 40**. It should be noticed that the COMBN logic circuitry is called into operation only once during the operation of the system immediately after the single tree-structured memory matrix has been formed, or in other words, after the system has completed training over all words or input signals in the training set. The purpose of the COMBN subsystem is to combine the data stored in the leaf level of the tree to derive therefrom the first level probability vectors.

Control State CB2: A LEV1 register of memory array 45 is utilized to store the address of a first level node. During this control state, the LEV1 register is set equal to the address of the first level entry node 0001.

Control State CB3: During this control state, the next six registers of the ID array are skipped, and the address of the seventh register from the first level node address (LEV1) is stored in a register of memory array 45, designated the IPTR or pointer register. In other words, contained in the IPTR register is the address of the $ADP_t$ register of a third level node extending in a path from the first level node whose address is stored in the LEV1 register.

Control States CB4–CB6*a*: Ten registers of memory 45 are designated as IAC or accumulator registers. During these control states, all 10 of the IAC registers are initialized to 0.

Control State CB7: An ITEF designated register of memory array 45 is utilized to store the total number of effective bits of the total combined leaf level statistical registers and is initialized to 0 during this control state.

Control States CB8–CB14: Ten registers of memory array 45 are designated as IK registers. During these control states, the first five N registers containing the leaf level statistics for the leaf are decoded into their 10 respective classes and stored in a corresponding 1 of the IK registers.

Control State CB15: The total number of times that a leaf has been hit was stored in the sixth statistical register $N_6$ during the training process. An accumulation of this total for all of the nodes in a filial set is stored in the ITEF register during this control state. In addition, the number of times that the REDUC subsystem was called into operation for the present node is also stored in the sixth statistical register $N_6$ (a 10,000 was added each time a reduction took place). This number is decoded out of the sixth register so that the statistics may be restored to their original values, had such reduction never taken place.

Control States CB16–CB20: During these control states, the leaf level statistics are restored back to their original value if they had been divided by 2 at any time in accordance with the REDUC subsystem. This is accomplished by multiplying the respective statistics by $2^{IDUM}$ where IDUM is equal to the number of times the statistics were reduced.

Control States CB21–CB24 (FIGS. **26*a* and 26*b***): There are ten IAC registers, each one corresponding to one of the desired responses $Z_1$–$Z_{10}$. These registers are utilized to accumulate the statistics corresponding to each Z for all nodes in the filial set. In other words, the first IK register containing the statistics for 1 node in a filial set corresponding to the desired output $Z_1$ is added to all the other $Z_1$ statistics of the rest of the nodes in the filial set and this total is stored in the first IAC register. The same accumulation is performed for the remaining statistics corresponding to desired outputs $Z_2$–$Z_{10}$ and the accumulations stored in the second through 10th IAC registers, respectively.

Control States CB25–CB27: Control State CB25 is reached after the IK registers have been filled up with the statistics of a leaf level node and the IAC registers updated accordingly. Now during Control State CB25 the $ADP_i$ register of the third or leaf level is examined to see whether there are any other nodes in that third level filial set. If there are other nodes (indicated by the $ADP_i$ pointing to another node rather than back to itself), the IPTR register is set equal to the contents of the particular $ADP_i$ register (which is the address of the next node in the filial set) during Control State CB26.

Control States CB28 and CB29: During Control State CB28, the contents of the $ADP_i$ register of the second level node is checked to see whether its contents points back to itself, that is, whether the contents of the IPTRth ID register contains the address of the node (IPTR − 1). If the node does point back to itself, there are no other nodes in the filial set and CB counter 31 is advanced to Control State CB30. When there are other nodes in the filial set, the IPTR register is set to point to the address of the $ADP_i$ register of the first node of the next filial set in the third level extending from the next node in the second level filial set whose address is contained in the IPTRth ID register.

Control State CB30: During this control state, the total number of times that the nodes of a filial set have been selected, stored in the ITEF register, is transferred to a TEF register of memory array 45.

Control States CB31–CB35: During these control states, nine probabilities are found from the statistics accumulated in the first nine registers. The 10th probability is inherent since the sum of the probabilities is equal to 1. The respective probabilities are then quantized during Control State CB33 and stored in IAC registers replacing the respective accumulations.

Figure 26C:
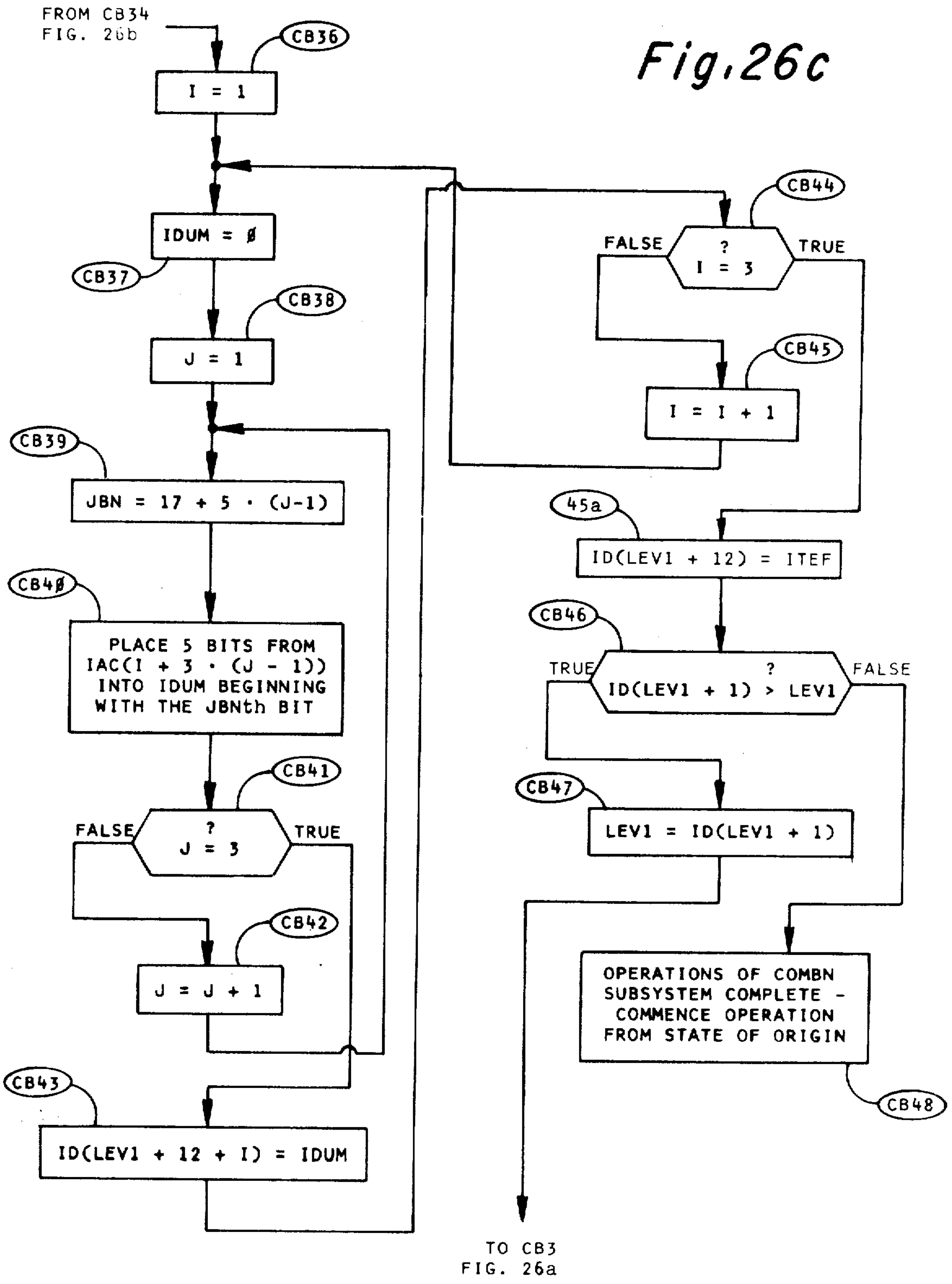

Control States CB36–CB45: Referring to FIG. 26*c*, the nine probabilities stored in the first nine IAC registers are now encoded in a manner similar to the COMPRS operation so that three probabilities may be stored in a single register. During Control States CB39–CB42, the nine probabilities which form the second level probability vector are stored in the seventh, eighth and ninth statistical register ($N_7$–$N_9$) of the entry node of the third level filial set presently being operated on. Henceforth, the probability vectors can be located by searching for the ID registers whose addresses are 13, 14 and 15 greater than a first level node address.

Control State CB45*a*: During this control state, the total accumulated number of leaf node selections presently stored in the ITEF register is also transferred to the leaf level node extending directly from the first level node for which the probability vector has just been calculated. The sixth statistical register $N_6$ of that leaf level node is used for this purpose.

Control States CB46–CB48: A check is made at Control State CB46 to determine from the contents of the $ADP_i$ register of the first level node for which the probability vector has just been calculated, whether there are additional nodes in the first level filial set for which additional probability vectors must be calculated. If there are no additional nodes in the first level filial set, CB counter 31 advances to Control State CB48 for return of the system's control to MAIN logic circuitry 35 at Control State 120. If there are other nodes in the first level filial set, however, a LEV1 designated register of memory array 45 is set to the address of the next node in the first level filial set, such node address being stored in the previous first level node's $ADP_i$ register which is the (LEV1 + 1)th ID register.

Figure 27A:
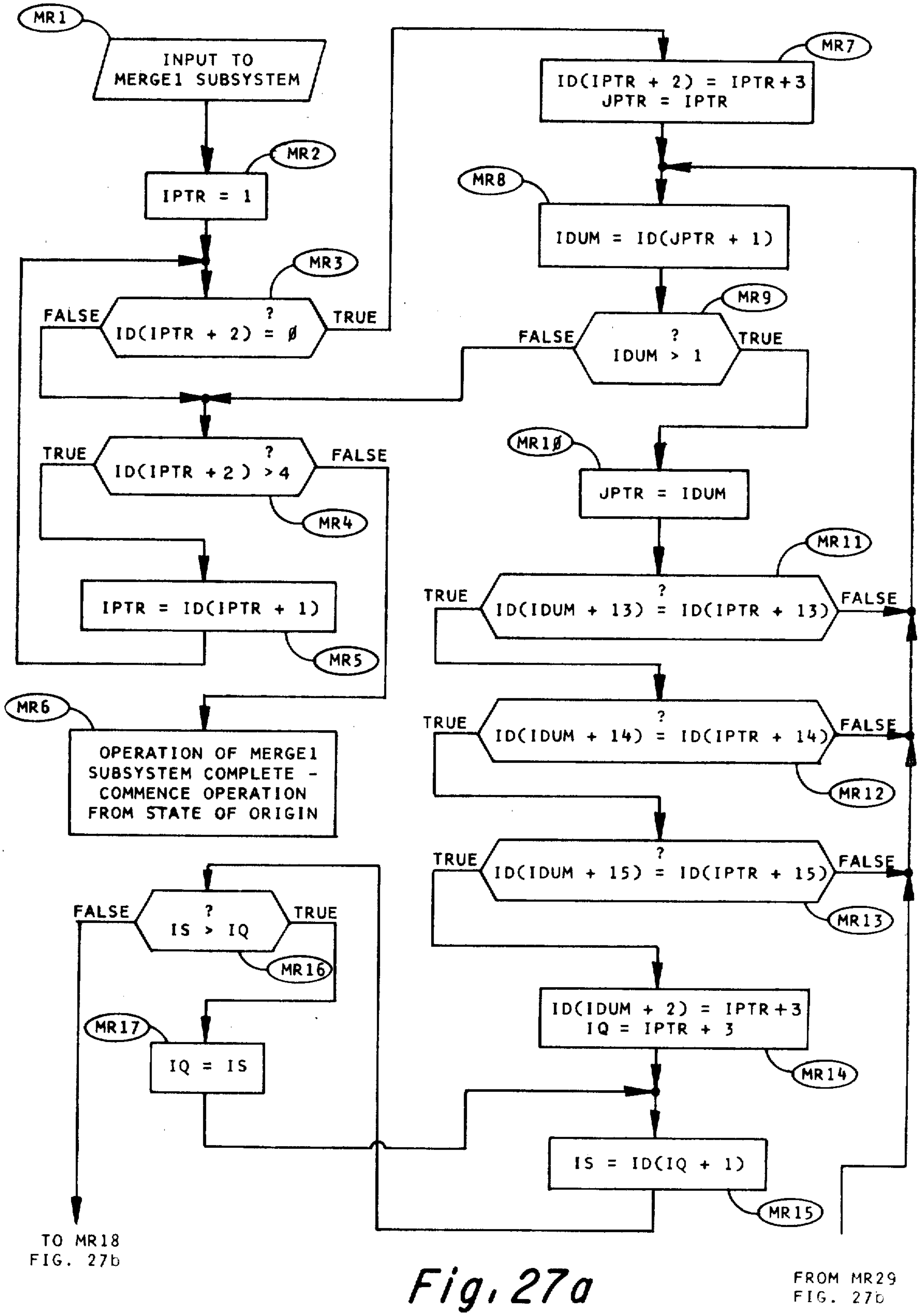
Figure 27B:
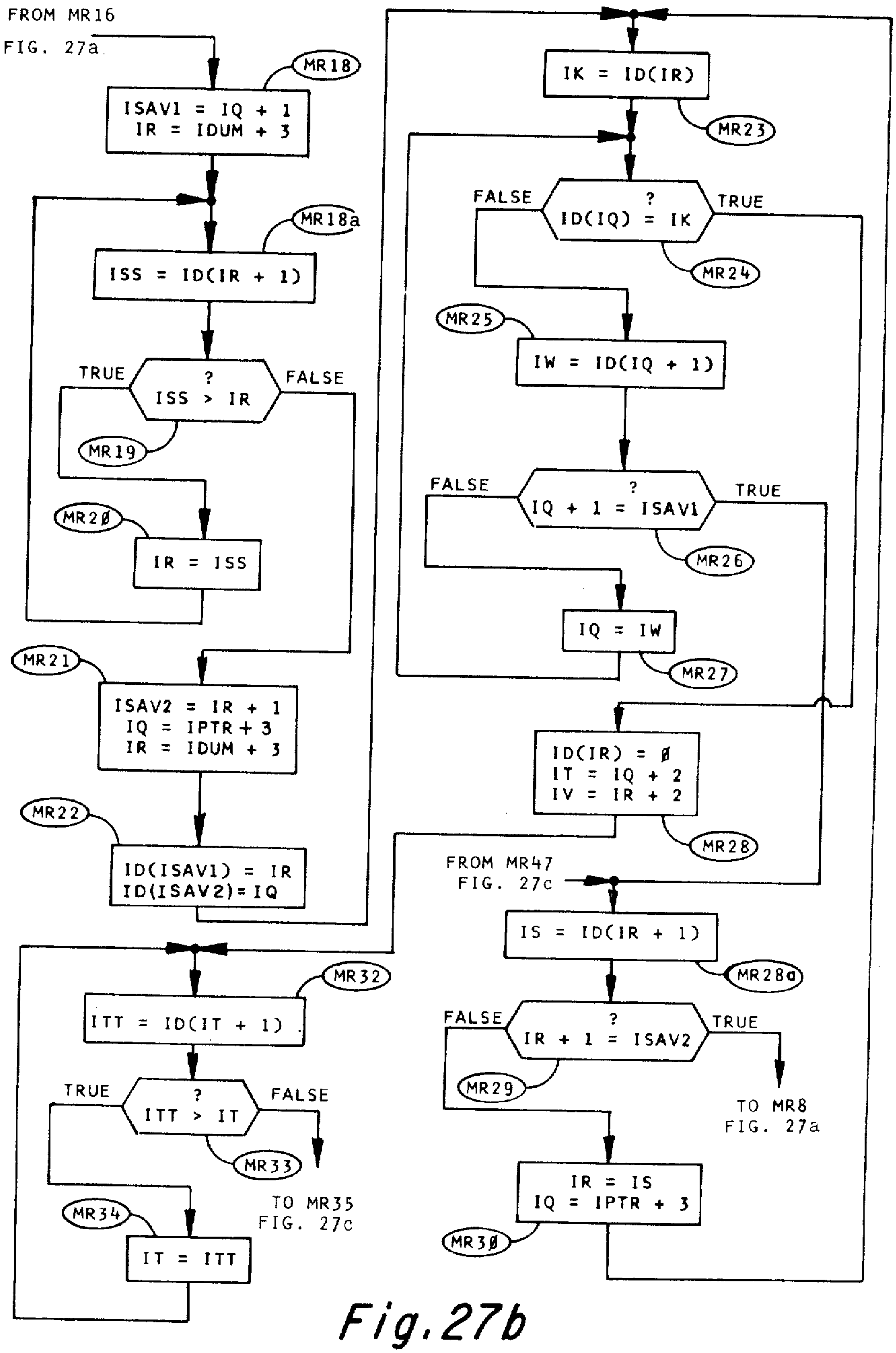
Figure 27C:
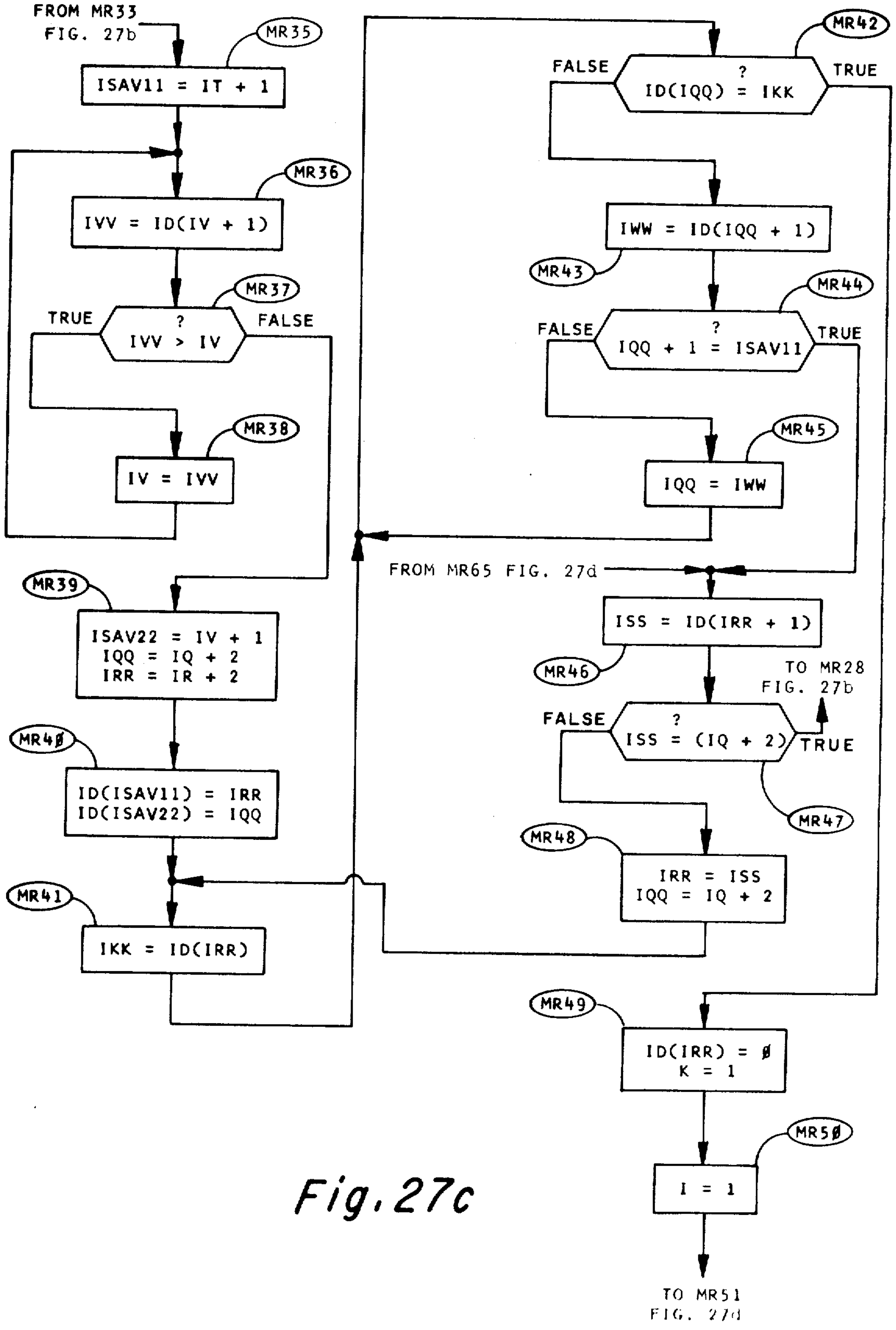
Figure 27D:
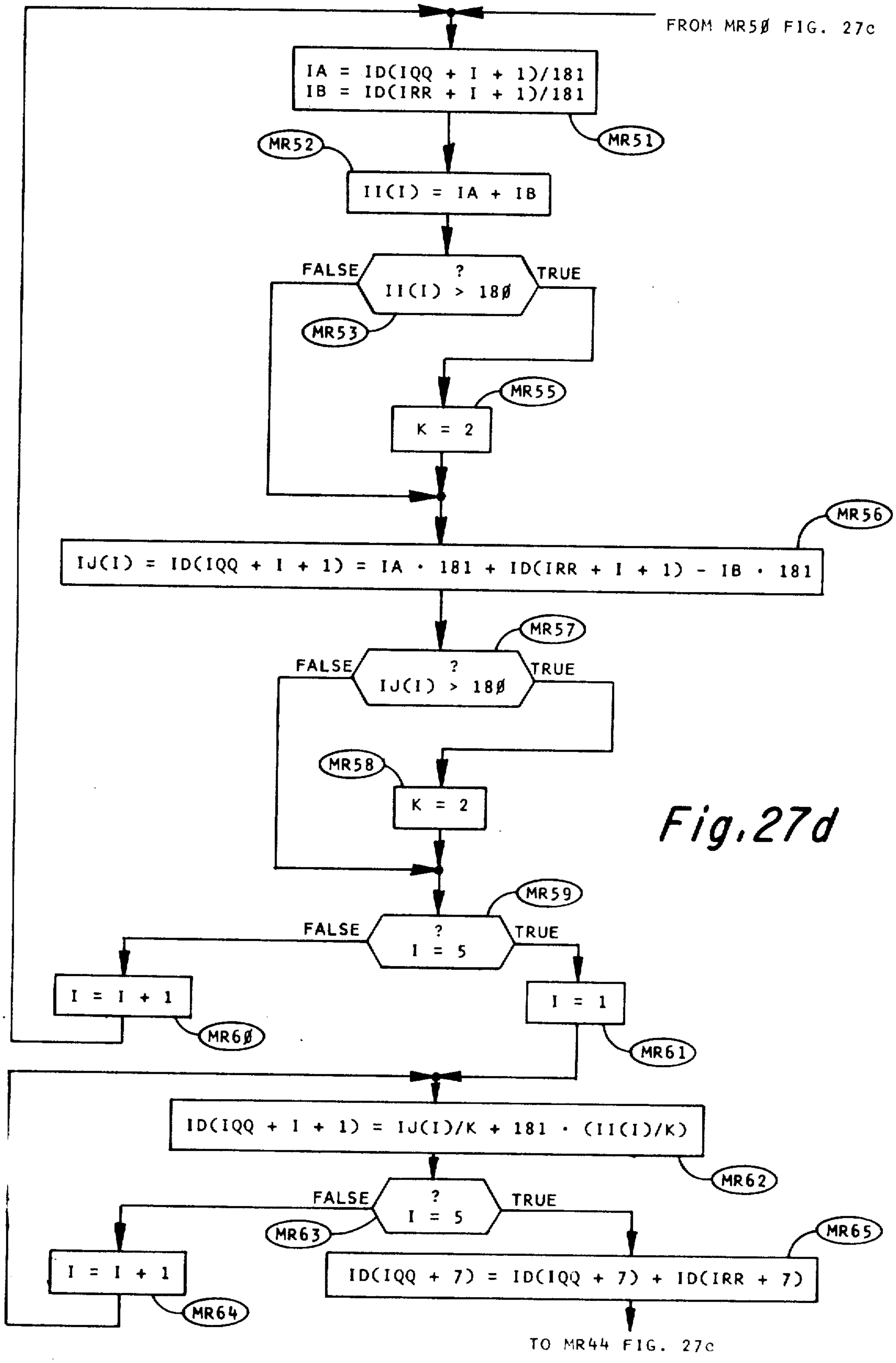

Control State MR1: As illustrated in FIG. 27*a*, the next system to be utilized in the conversion of the single tree-structured processor is MERGE1 logic circuitry 38. The MERGE1 subsystem, like the COMPRS subsystem, is utilized only once during the operation (in comparison, the TREE subsystem is utilized over and over again until the single tree-structured matrix has been completed over the entire training set). Control State MR1 is reached when, during Control State 120, a signal is generated by MAIN logic circuitry 35 for time-pulse distributor logic circuitry 34. Time-pulse distributor logic circuitry 34 accordingly sets switch 23 to the MR position so that MR counter 32 may transfer control of the system to MERGE1 logic circuitry 38. The purpose of the MERGE1 subsystem is to merge together all nodes extending from first level nodes having equal first level probability vectors.

Control States MR2–MR6: During Control State MR2, the IPTR pointer register is set equal to the address of the entry node to the tree, 0001. The (IPTR + 2)th ID register is the $ADP_o$ register of a first level node, such node having an address equal to the contents of the IPTR register. During Control State MR3, this $ADP_o$ register is checked to ascertain whether it has already been set to the value of a second level node. If it has already been set, then the $ADP_o$ register of that first level node is inspected during Control State MR4 to determine whether it contains the address 0004 indicating that all first level nodes have been given $ADP_o$ addresses. If the first level nodes have all been set, all $ADP_o$ registers of the control of the operation of the system are returned to MAIN logic circuitry 35 at Control State 121, during Control State MR6. If there are other nodes in the first level filial set whose $ADP_o$ has not been set, the IPTR pointer register of memory 45 is set equal to the address of the next node and the first level filial set, such address being stored in the $ADP_i$ register of the present first level node, that is, the (IPTR + 1)th ID register).

Control State MR7: This control state is reached when, during Control State MR3, it is determined that the $ADP_o$ register of a first level node has not yet been set. The (IPTR + 2)th ID register, which is the relevant $ADP_o$ register, is set to the address of the second level node extending therefrom (IPTR + 3). In addition, the first level node address is saved in a JPTR pointer register of memory 45.

Control States MR8–MR10: The JPTR register points to a node in the first level. The address contained in the $ADP_f$ register of the JPTR node, stored in the (JPTR + 1)th ID register, is that of the next node in the first level filial set. The IDUM register is set to this next node address during Control State MR8. If the IDUM register contains the address 0001 which is the entry node, MR32 is set to Control State MR4 so that a determination may be made as to whether all of the $ADP_o$ registers of first level nodes have been set. If it is determined during Control State MR9 that there are other nodes in the filial set which may have a same first level probability vector and therefore must be merged with the IPTR node, the address of the next node examined will be the same as the address stored in the IDUM register.

Control States MR11–MR13: The first level probability vectors are stored in the seventh, eighth and ninth statistical registers of a leaf level node extending directly from a first level node. As mentioned previously, the first level probability vectors can be found by addressing the ID registers which are 13, 14 and 15 register addresses beyond the address of the first level node in question. During this control state, the first level probability vectors for the IPTR node and the IDUM node are compared to determine whether such first level probability vectors are equal. If the probability vectors are not equal, MR counter 32 is reset to Control State MR8 so that a new IDUM node may be selected in the first level for comparison with the IPTR node. If the probability vectors are equal, however, the second and third level nodes extending from the associated first level nodes must be merged together and MR counter 32 continues to Control State MR14.

Control States MR 14–MR17 (FIGS. 27a and 27b): The $ADP_o$ register of the node which is going to be merged into a previous node (the IDUM node is merged into the IPTR node) is set equal to the address of the second level entry node (IPTR + 3) extending directly from the node being merged into (the IPTR node). An IQ designated register of memory array 45 is also set equal to the address of the second level node. During Control State MR16, an IS designated register of memory array 45 is set equal to the contents of the $ADP_f$ register of the second level node which is then checked to determine whether or not such second level node points back to the entry node, indicating that it is the last member of its filial set. If it is not the last member of its filial set, the next node in the filial set is examined to determine whether it is the last member of the filial set and so forth. When the last member of the second level filial set, extending from the IPTR first level node is found, MR counter 32 continues to Control State MR18.

Control States MR18–MR20: The address of the $ADP_f$ register of the last node in the second level filial set extending from the IPTR first level node is saved in an ISAV1 register of memory array 45. The second level filial set extending from the IDUM first level node (which is the node which is being merged into the IPTR node) is examined to find the last node in that second level filial set.

Control States MR21 and MR22: During Control State MR21, an ISAV2 designated register of memory array 45 is given the address of the $ADP_f$ register of the last node in the filial set extending from the IDUM first level node. Both second level filial sets are then linked together during Control State MR22 by inserting the address of the first node in the filial set extending from the IPTR node into the $ADP_f$ register of the last node in the second level filial set extending from the IDUM node, and inserting the address of the first node in the second filial set extending from the IDUM register into the $ADP_f$ register of the last node in the filial set extending from the IPTR first level node.

Control States MR23–MR31: Now that a merge has taken place because two first level nodes had equal first level probability vectors and their second level filial sets linked together accordingly, the VAL registers of all nodes in the newly combined second level filial set must be examined to ascertain whether it contains any duplicate values. This takes place during Control State MR24. When a duplicate value has been found, the first node is saved and the second node abandoned by setting its VAL register equal to 0 during Control State MR28. The system then proceeds to operate on the third level nodes to link them together into one filial set extending from the remaining node.

When it is determined during Control State MR30 that all duplicate nodes in the second level have been examined and merged, MR counter 32 is reset to Control State MR8, thereby taking the MERGE1 subsystem back to the first level so that a new IDUM first-level node can be selected.

Control States MR32–MR40: Control State MR32 is reached when two duplicate nodes of a combined second-level filial set have been found and the second duplicate node value set equal to 0. It is now necessary to merge the third-level nodes extending from the duplicate nodes. That is, the duplicate node whose value has been set equal to 0 loses its third-level filial set and that lost third-level filial set is combined with the third-level filial set of the remaining duplicate node. During Control States MR32–MR35, the address of the $ADP_f$ register of the last node in the filial set extending from the remaining duplicate node is found and stored in an ISAV11 register of memory array 45. During Control states MR36–MR39, the address of the $ADP_f$ register of the last node in the filial set extending from the abandoned duplicate node is found and stored in an ISAV22 register of memory array 45. Then, during Control State MR40 the two third-level filial sets are linked together by placing the address of the entry node of the second third-level filial set into the $ADP_f$ register of the last node of the first third-level filial set (as determined by the contents of the ISAV11 register). The $ADP_f$ register of the second third-level filial set (as determined by the contents of the ISAV22 register) is set equal to the address of the entry node of the first third-level filial set, thereby completing the linkage between these two filial sets.

Control States MR41–MR48: The third-level filial sets have been combined for nodes having duplicate values in the second level. Now, it is necessary to examine the combined third-level filial sets to determine whether there are any nodes in that combined filial set which have duplicate third-level values during these control states. The VAL registers (IRRth and IQQth ID registers) of the combined third-level filial sets are examined during these control states. When a duplicate pair of nodes in the combined third-level filial set have been located, the next control state is MR49.

Control States MR49–MR65: During Control State MR49 the VAL register of the second duplicate node is set equal to 0. Then, during Control States MR51–Mr 65 the statistics in then registers of the two duplicate nodes which are being merged together are taken out, combined, and restored in the first of the duplicate nodes whose VAL register has not been set equal to 0. Once the statistics of the two duplicate nodes have been combined, thereby merging the two nodes, MR counter 32 is reset to Control State MR44 by time-pulse distributor logic circuitry 34 so that the examination of the combined third-level filial set can continue and other duplicate nodes sought out. Eventually, as previously mentioned, when all second and third-level nodes extending from all of the first-level nodes have been merged in accordance with the first level probability vectors, the system returns to Control State MR6 so that control of the system is transferred back to MAIN logic circuitry 35 at Control State 121.

Figure 28A:
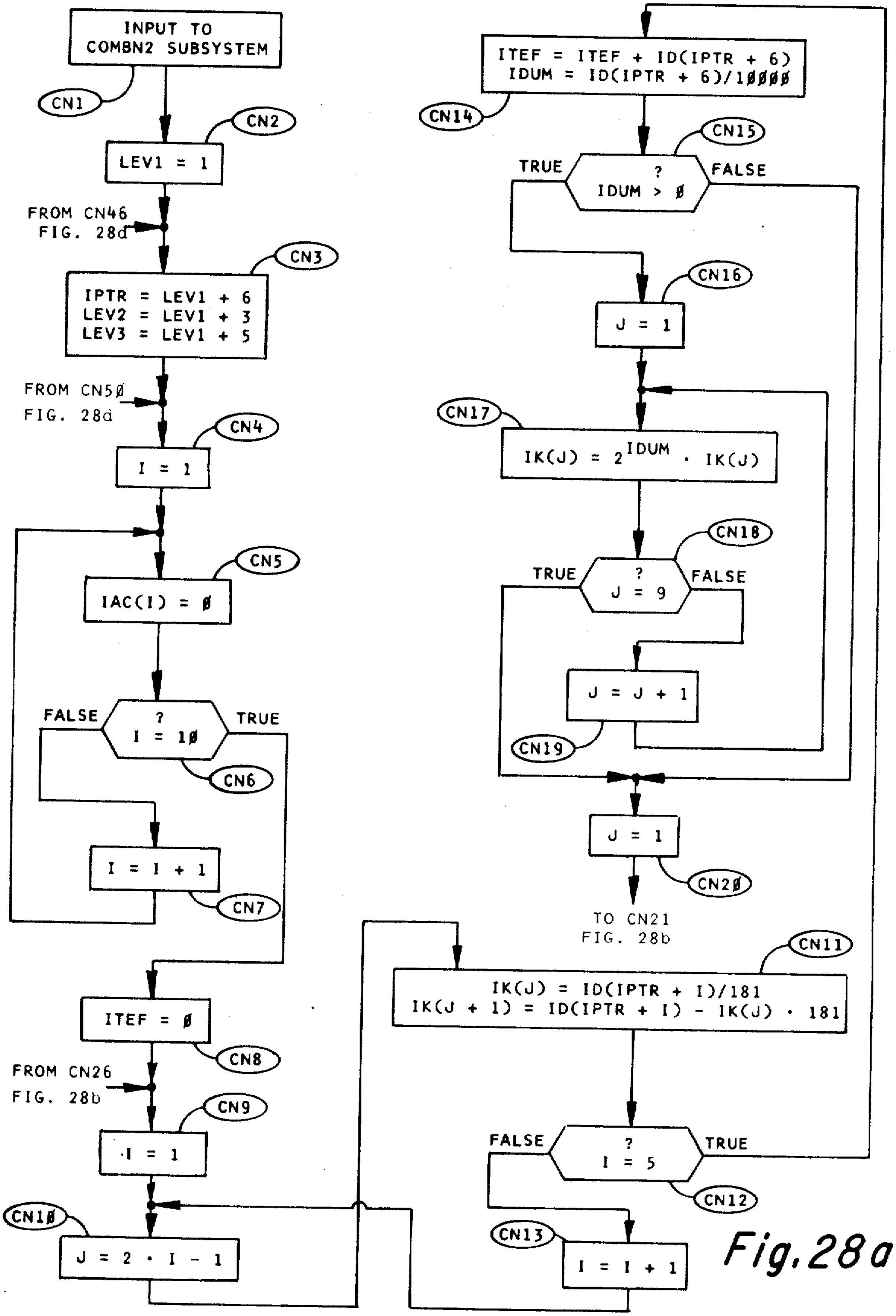
Figure 28B:
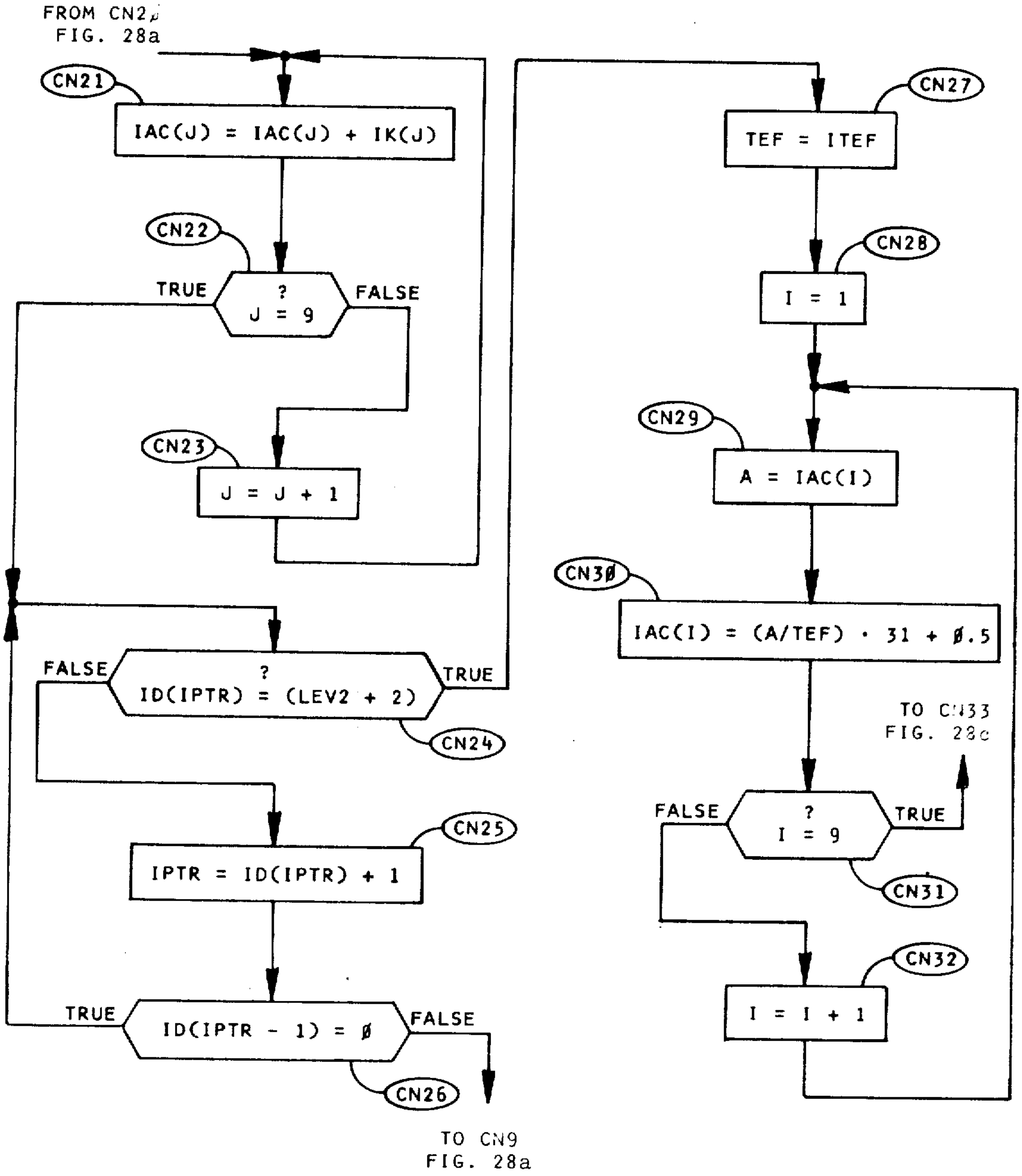

Control State CN1: As illustrated in FIG. 28*a*, when this control state is reached, operation of COMBN2 logic circuitry 41 commences. The purpose of the COMBN2 subsystem is to find the second level probability vectors and is therefore utilized only once during the operation of the system. Control State CN1 is reached when, during Control State 121, MAIN logic circuitry 35 transmits a signal to time-pulse distributor logic circuitry 34; time-pulse distributor logic circuitry 34 then sets switch 23 to the CN position for operation of CN counter 30.

Control State CN2: The LEV1 register is initialized to the address of the first node in the first level, 0001.

Control State CN3: A LEV2 register of memory array 45 is set equal to the address of the second-level node extending from node LEV1 (LEV1 + 3). The address of the third-level node extending from node LEV1 (LEV1 + 5) is stored in a LEV3 register of memory array 45. The IPTR pointer register is set equal to the address of the $ADP_t$ register of the LEV3 node.

Control States CN4–CN7: The 10 IAC accumulating registers are again initialized to 0 during these control states.

Control State CN8: The ITEF register which calculates the total number of occasions that any path has led to a particular third-level filial set is initialized to 0 during this control state.

Control States CN9–CN13: The IPTR pointer register now contains the address of an $ADP_t$ register of a node in a leaf level filial set. During this control state, the statistics of that leaf level node are decoded and stored in 10 IK registers.

Control States CN15–CN20: A determination is made as to the number of times that the REDUC subsystem was called into operation. For each time that the REDUC subsystem has been utilized, the data stored in the statistical registers were halved. In order to restore the data to its actual value, had such data not been halved, the number of times that the REDUC subsystem was called into operation is transferred from the $N_6$ statistical register to the IDUM register during Control State CN14. Then during Control State CN17 the statistics for each class ($N_1$, $N_2$, etc.) are taken one at a time and multiplied by $2^{IDUM}$. From this operation, the actual statistics are derived and are then restored in the 10 IK registers.

Control States CN21–CN23: During these control states, the individual statistics for all nodes in a filial set are separately added together and the respective sums stored in IAC registers. The addition takes place by adding the contents of an IK register to the already accumulated contents of a respective IAC register for each of the first nine desired outputs $Z_1$–$Z_9$.

Control State CN24: During this control state, the contents of the third-level $ADP_t$ register whose address is equal to the address stored in the IPTR pointer register is examined to determine whether it points back to the entry node of the filial set. If it does point back to the entry node, then it is determined to be the last node of the filial set and CN counter 30 is set to Control State CN27 for computation of the second-level probability vector. If there are still further nodes in that third-level filial set, however, the $ADP_t$ register points to the next node in the filial set to be examined. Then during Control State 26 the VAL register of such next node is examined to determine whether it is equal to 0; for if it is equal to 0, the statistics associated with this node have already been merged with the statistics of another node during the operation of MERGE1 subsystem 38 and the next node in the chain will have to be examined at Control State CN24. If the contents of the VAL register is not equal to 0, CN counter 30 is reset to Control State C9.

Control States CN27–CN32: Control State CN27 is reached when during Control State CN24 it is determined that all nodes of a third-level filial set have been examined and their statistics accumulated in the first nine IAC registers. During these control states, then, the contents of the IAC registers are utilized to form the second-level probability vector by calculating the probability associated with each desired response $Z_1$–$Z_{10}$. The probability is calculated during Control State CN30 for one of the desired outputs and then recycled until all nine probabilities are found (the 10th probability being determinable from the first nine). The probabilities are also quantized during Control State CN30.

Figure 28C:
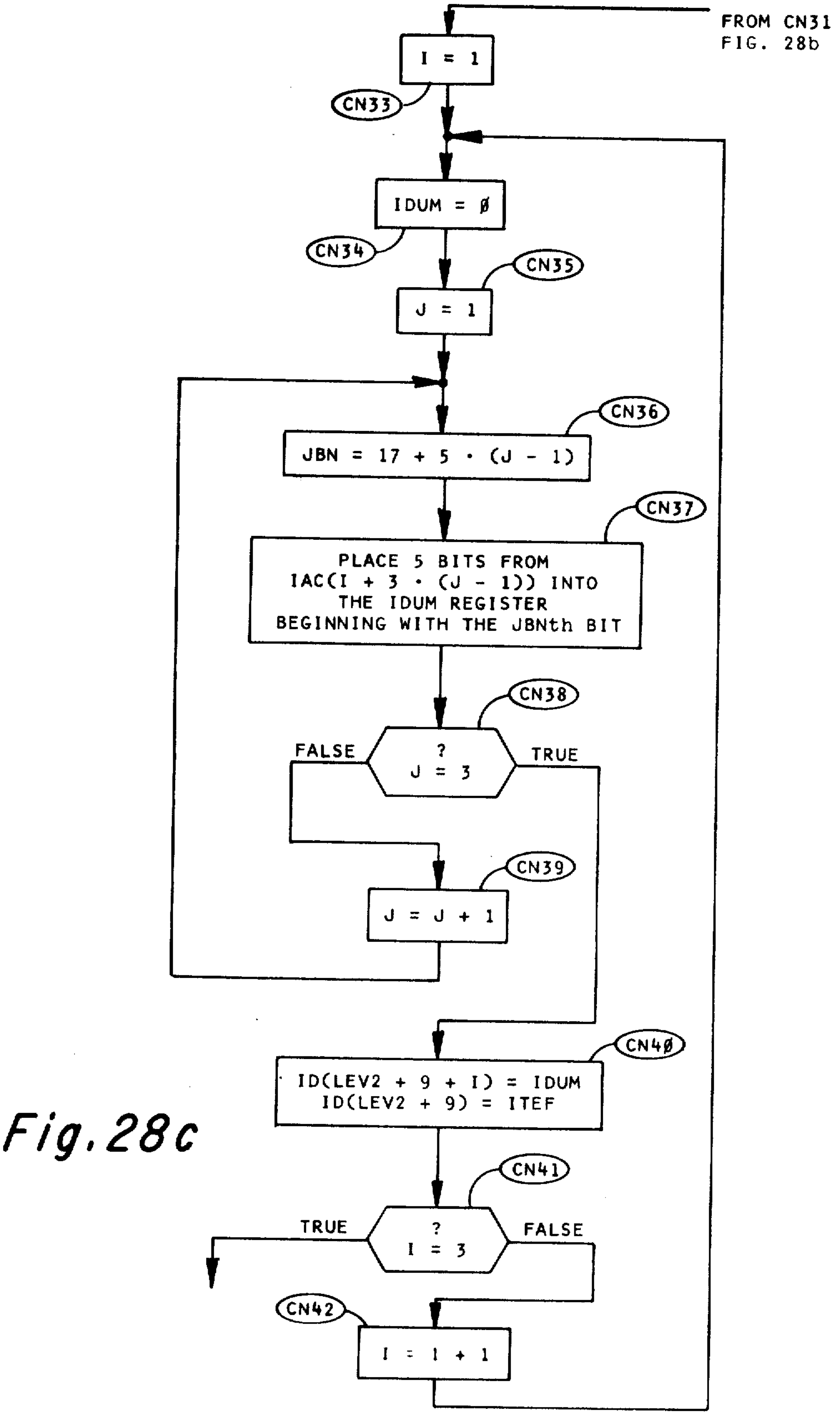
Figure 28D:
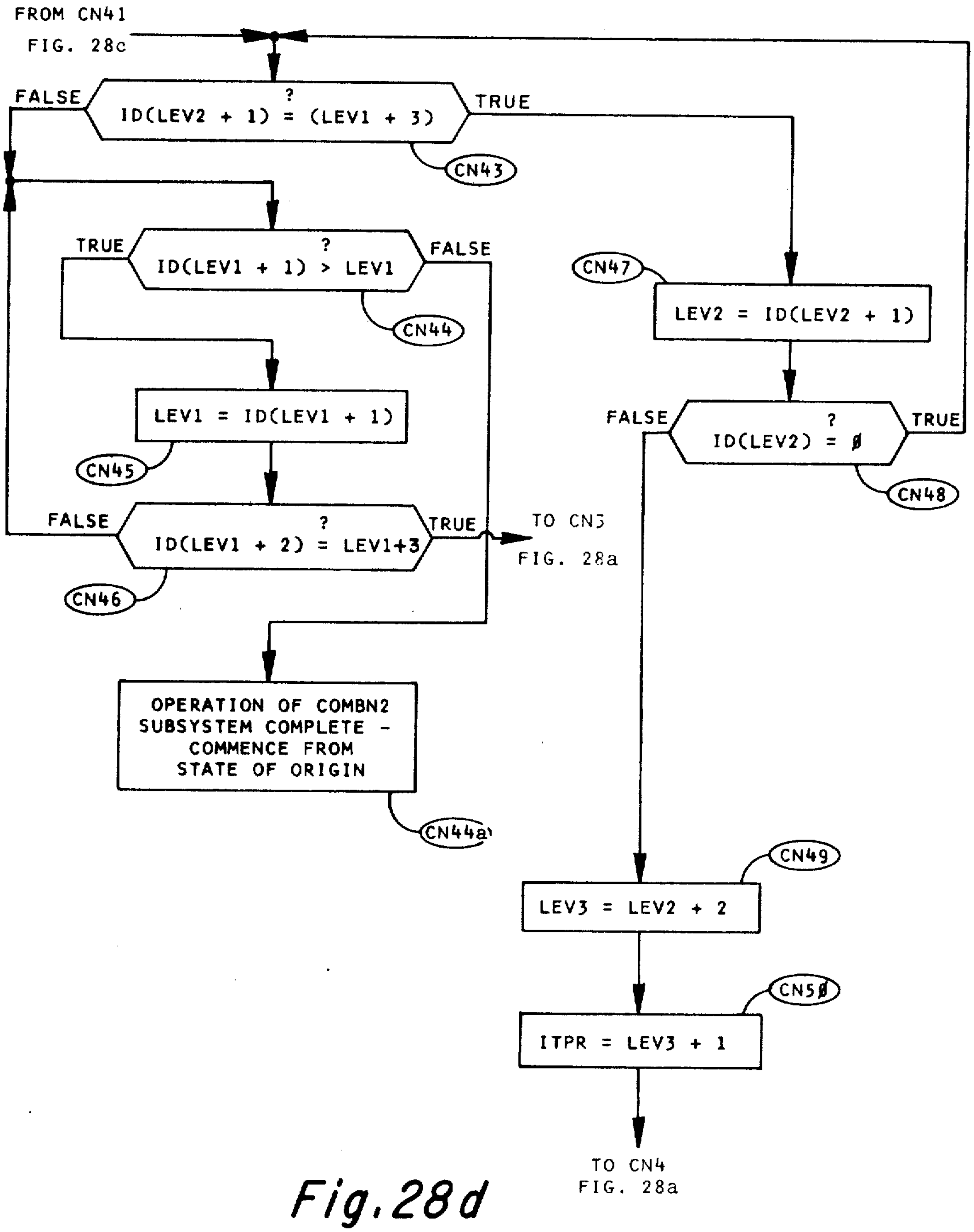
Figure 29A:
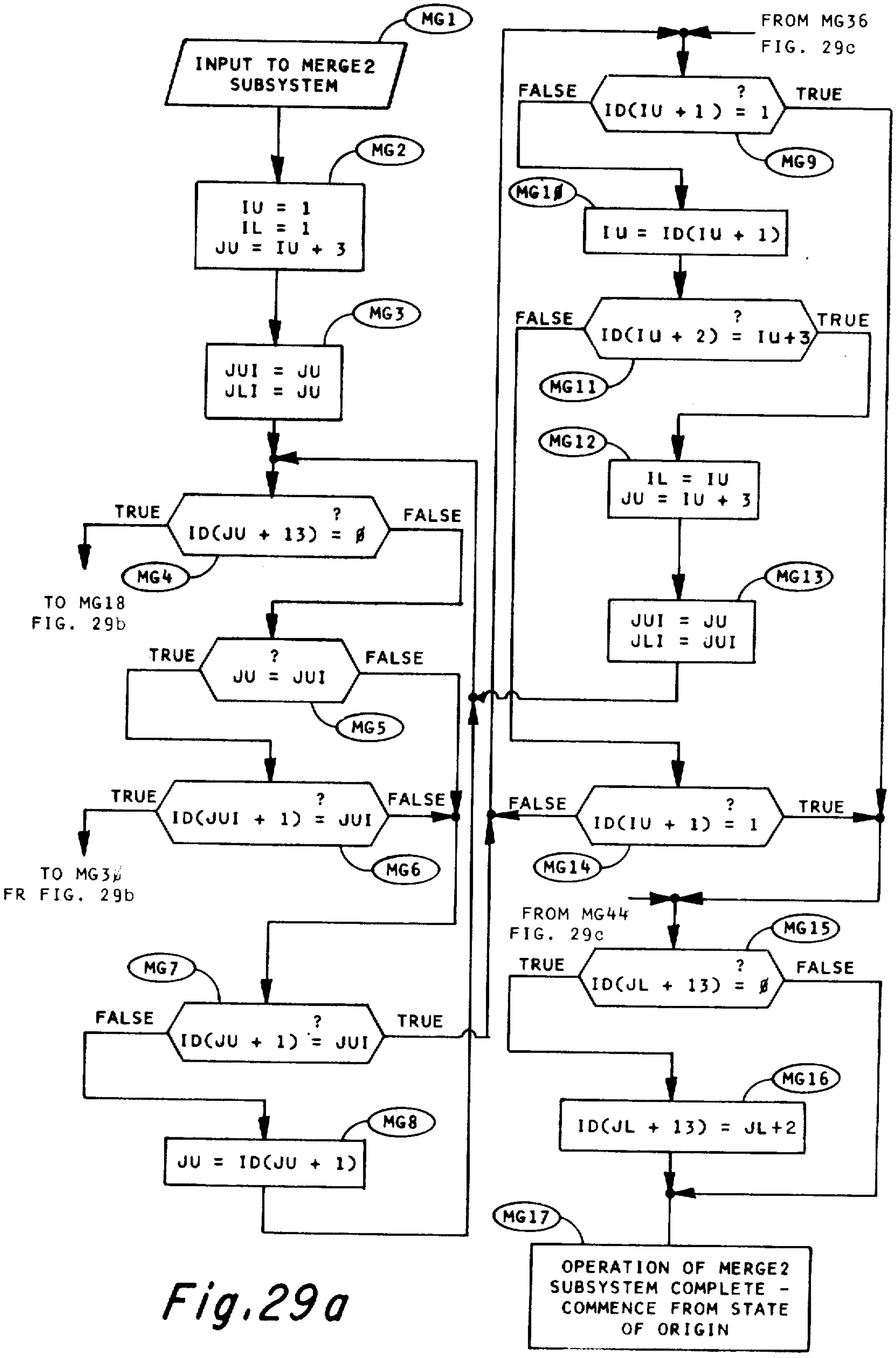
Figure 29B:
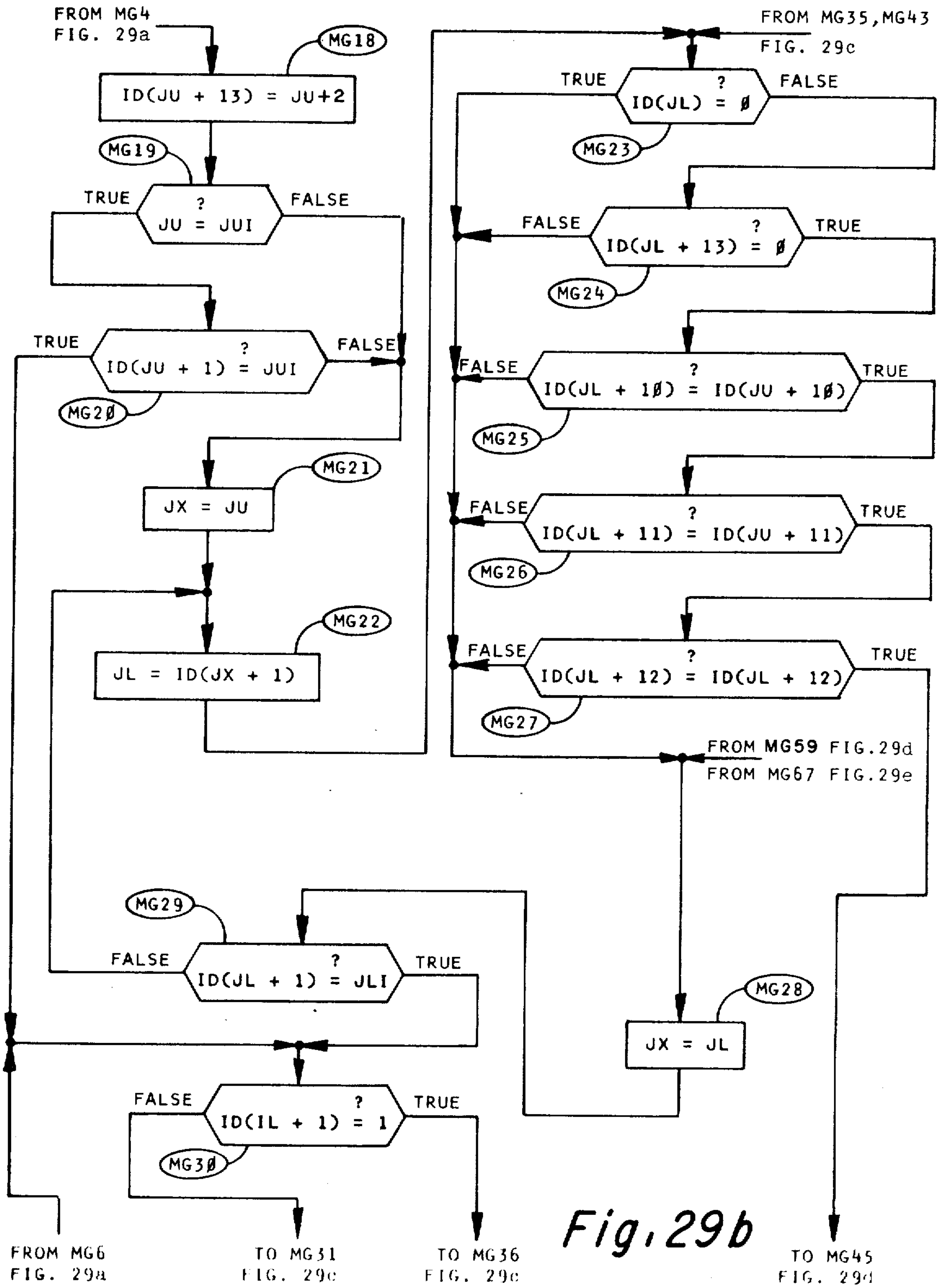
Figure 29C:
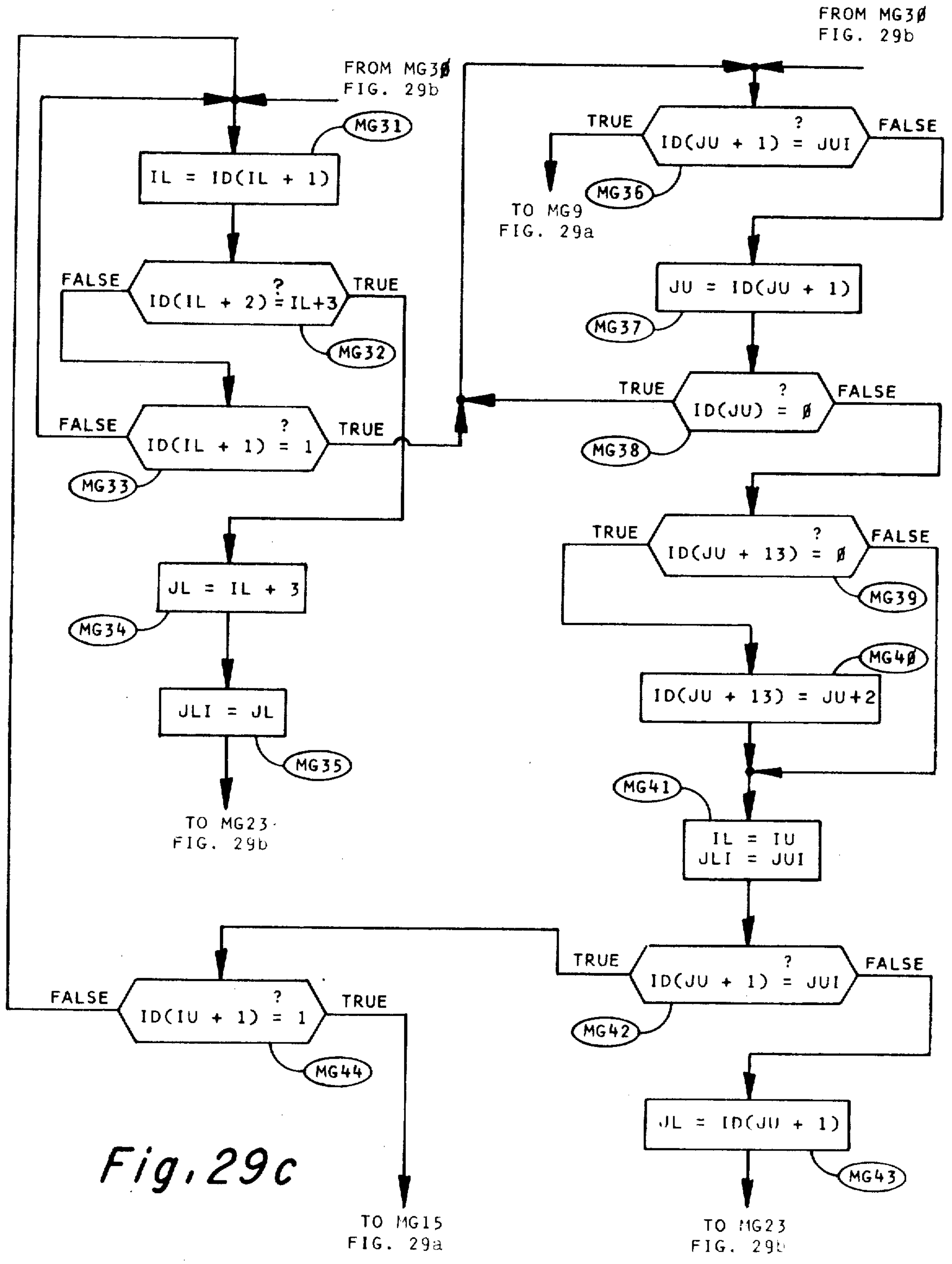
Figure 29D:
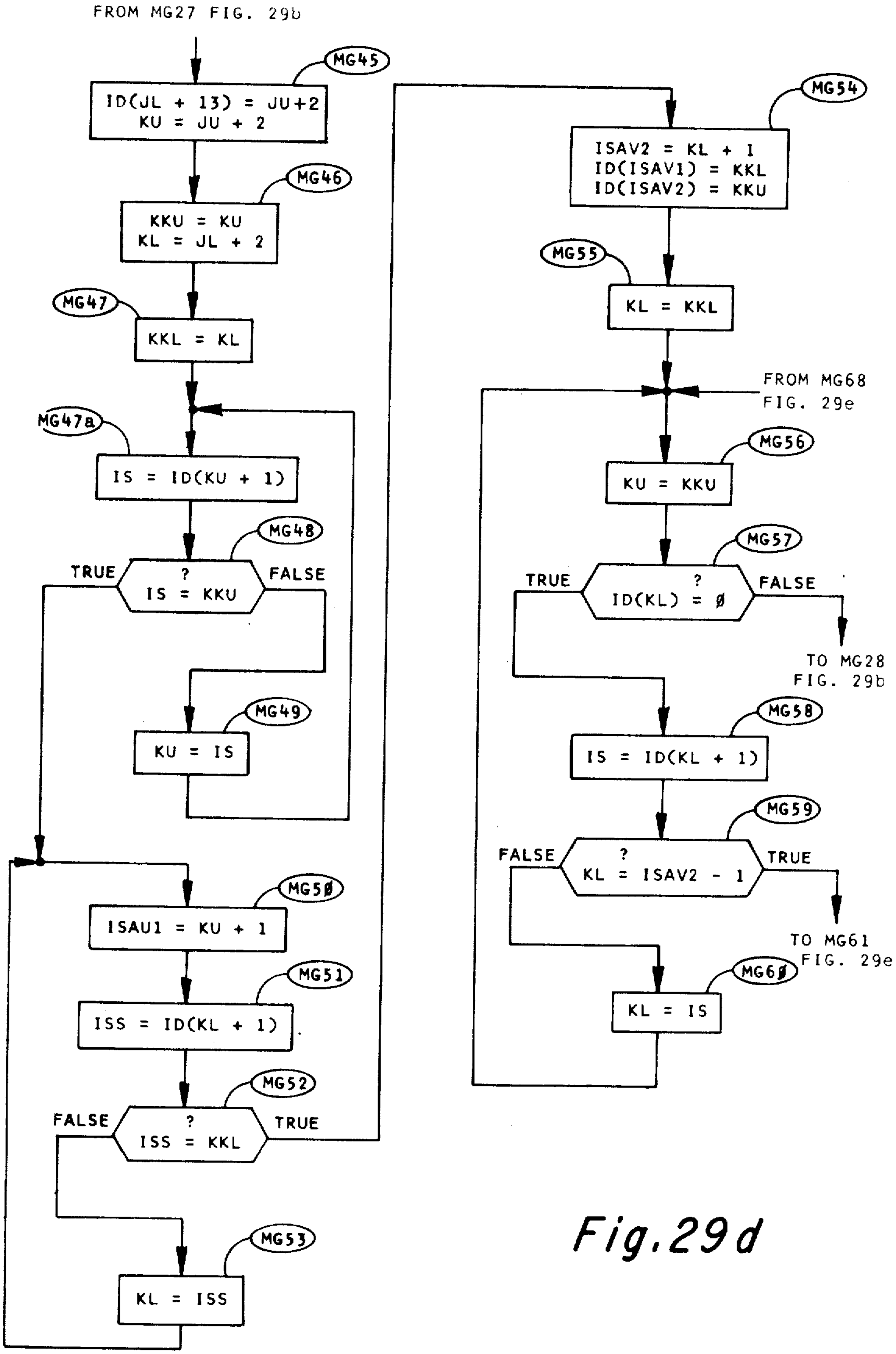
Figure 29E:
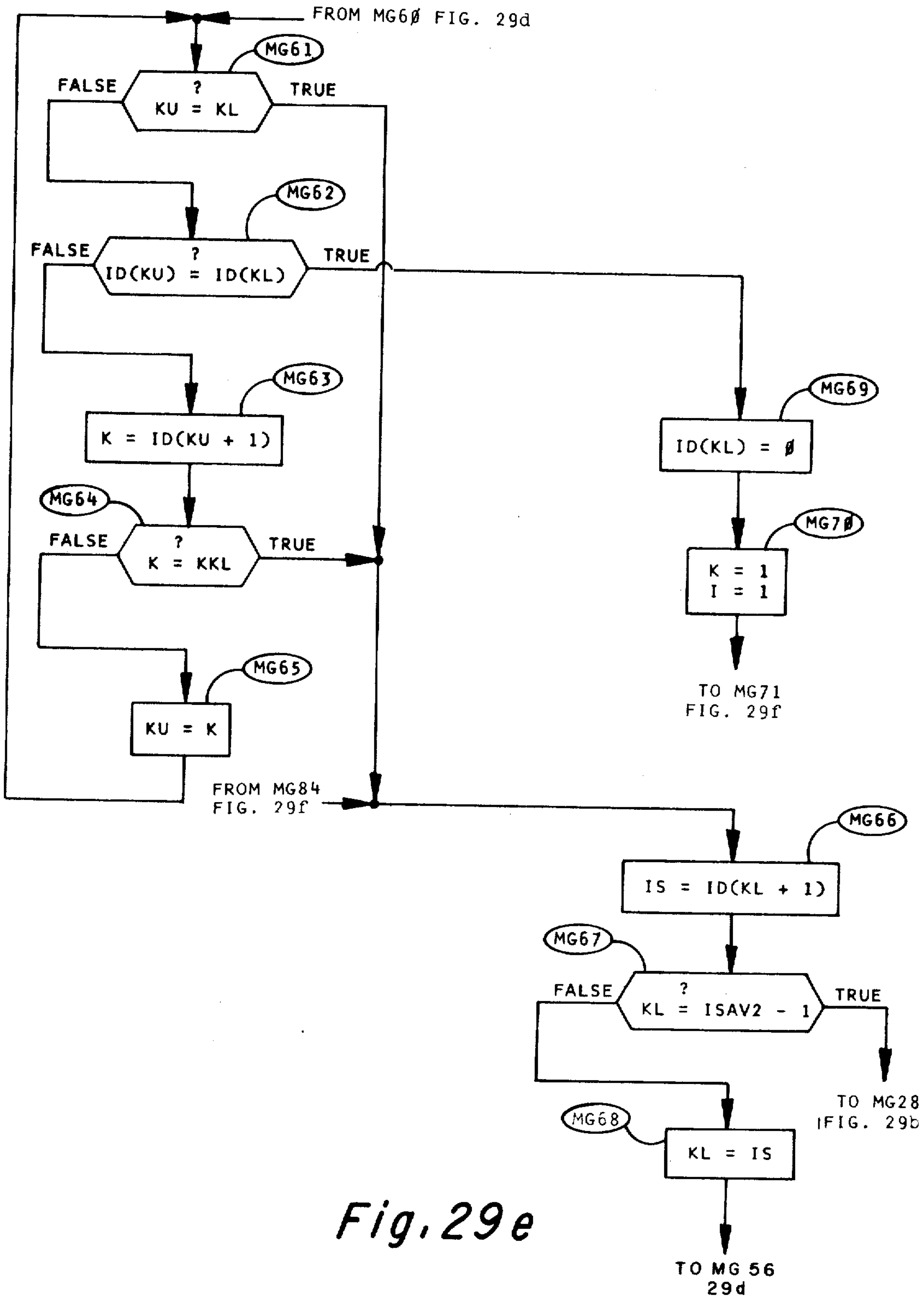
Figure 29F:
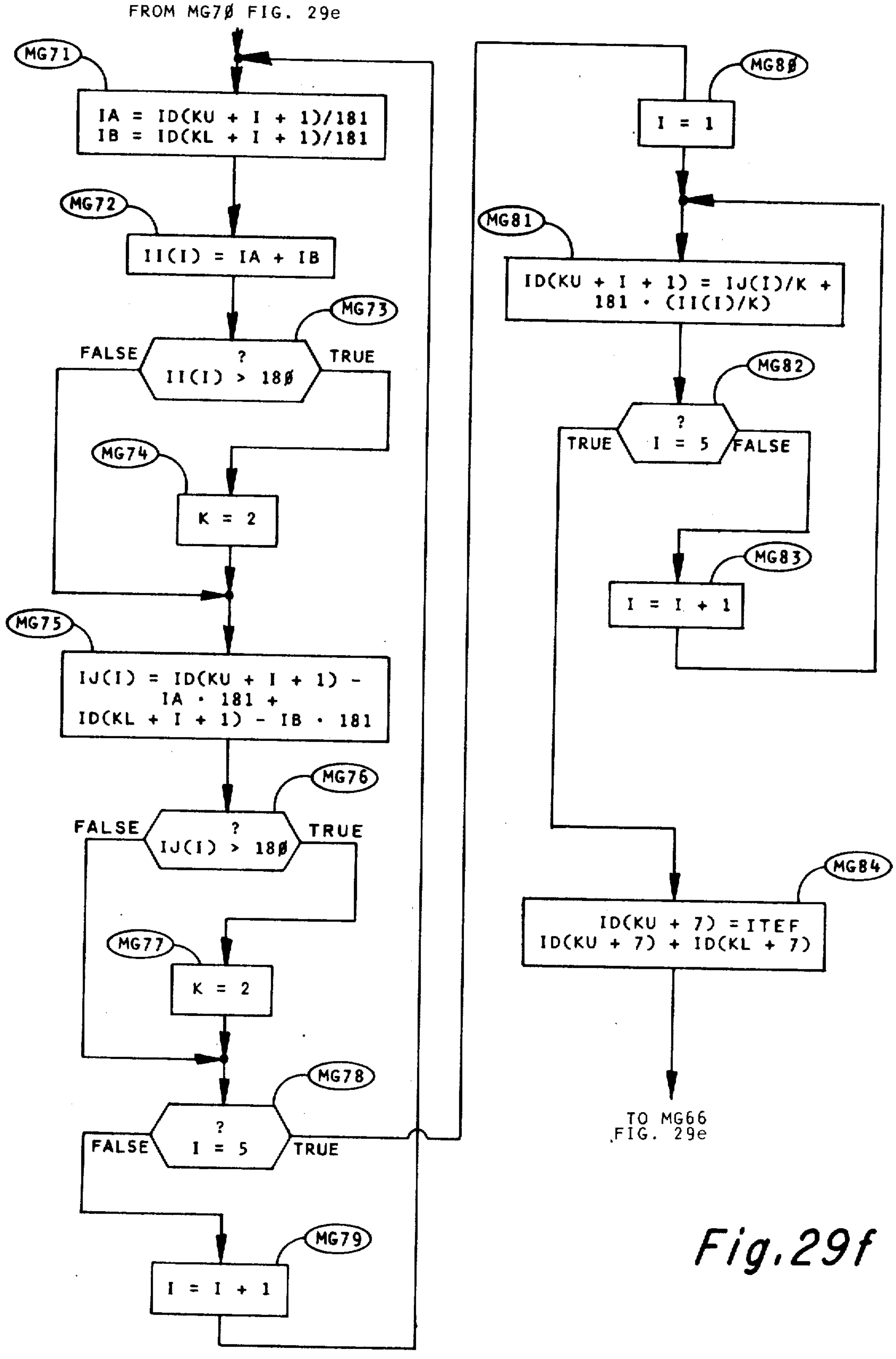

Control States CN33–CN42: The second-level probability vectors for a third-level filial set extending from a node in the second level has been calculated during Control States CN27–CN32. Now, the probability vector is stored in the seventh, eighth, and ninth statistical registers of the entry node in that third-level filial set, as illustrated in FIG. 28c.

Control States CN43–CN46: During Control State CN43, the contents of the second level $ADP_f$ register whose ID address is (LEV2 + 1) is examined to determine whether it is a register of a last node in a second level filial set. If it is not a last node, N counter 30 advances to Control State CN47. Otherwise, during Control state CN44 the contents of the first level $ADP_f$ register having the ID address (LEV1 + 1) is examined during Control State CN44 to determine whether there are any further nodes in the first level filial set. If there are no further nodes, operation of COMBN2 subsystem 41 terminates during Control State CN44, when MAIN logic circuitry 35 transmits a signal to time pulse distributor logic circuitry 34, thereby resetting switch 23 to the M position. Control of the system returns to MAIN logic circuitry 35 at Control State 122. On the other hand, if there are still remaining nodes in the first level filial set, the LEV1 register is set equal to the next first level node address during Control State CN45. Then during Control State CN46 the contents of the $ADP_o$ register of that next node in the filial set is examined to determine whether it has been set. If it has already been set, CN counter 30 is reset to Control State CN44 for the examination of the next node in the first level filial set. If the $ADP_o$ register has not been set, however, CN counter 30 is reset to Control State CN3 so that the $ADP_o$ register may be set as indicated above.

Control State CN47: This control state is reached when, during Control State CN43, it is determined that there are still further nodes in a second level filial set for which probability vectors must be formed. Now, the LEV2 register is set equal to the next node address as contained in the $ADP_f$ register of the previous node in the filial set.

Control state CN48: During this control state, the next node in the second level filial set which is identified during Control State CN47 is examined to determine whether the contents of its VAL register is equal to 0. If it is, it is ignored and CN counter 30 is reset to Control State CN43 to determine whether there are further nodes in that second level filial set to be tested. If the contents of the VAL register of such next second level node is not equal to 0, CN counter 30 continues to Control State CN49.

Control State CN49: When this control state is reached, it has been determined that there is a second level node for which a probability vector must be determined. The probability vector is calculated when the statistics in the third level filial sets extending from a second level node have been accumulated. Thus, during this control state the LEV3 register is set equal to the address of the entry node of the third level filial set extending from such second level node.

Control State CN50: During this control state, the IPTR pointer register is updated to point to the $ADP_f$ register of the third level filial set entry node. CN counter 30 is then reset so that the next control state is CN4.

Control State MG1: This control state is reached when, during the operation of MAIN logic circuitry 35, Control State 122 is reached. Like the COMBN, MERGE1, and COMBN2 subsystems, the MERGE2 subsystem is called into operation only once during the entire operation of the system for conversion. The purpose of the MERGE2 subsystem is to merge the third level nodes in accordance with the second level probability vectors calculated and stored during operation of the COMBN2 subsystem.

Control States MG2 and MG3: An IU register of memory array 45 is utilized as a pointer register. Stored in the IU register is the address of a first level node which will be referred to as the upper first level node. During this control state, the IU register is set equal to the address of the first level entry node 0001. An IL register of memory array 45 is also used as a pointer register; stored therein is the address of a first level node which will be referred to as the lower first level node. During Control State MG2, the IL register is also set equal to the address of the first level entry node 0001. Similarly, a JU register is utilized to point to a node in the second level extending from the IU node in the first level. Therefore, during Control State MG2 the JU register is set equal to the address of the entry node of the second level filial set extending from the IU node, the address of which is IU + 3. A JUI register becomes the upper second level node register and a JLI register becomes the lower second level register. Both of these registers are initialized by setting them equal to the address of the second level filial set entry node extending from the first level node whose address is stored in the IU register.

Control State MG4: During this control state, the second level $ADP_o$ register of the node whose address is stored in the JU register is examined to determine whether it has already been set. In memory array 44 this is the (JU + 13)th ID register. If the $ADP_o$ register is equal to 0, this indicates that it has not as yet been set and MG counter 33 is set to Control State MG18 so that such $ADP_o$ register can be set. If it has already been set, MG counter 33 continues to Control State MG5.

Control States MG5 and MG6: During these control states, the $ADP_f$ register of the upper second level node is checked to see if there are other nodes in the same second level filial set. Such $ADP_f$ register is the (JUT + 1)th ID register of memory array 44. If it is the last node of the second level filial set, then MG counter 33 is set to Control State MG30 so that a determination can be made as to whether such second level filial set is extending from the last node in the first level filial set. If there are further nodes in the second level filial set, however, MG counter 33 continues to Control State MG7.

Control States MG7 and MgG8: During Control State MG7, the $ADP_f$ register of the node whose address is stored in the JU upper second level pointing register (the JU + 1)th ID register) is checked to see whether it contains the same address as is stored in the JUI upper second level pointing register. If they are not equal, then the JU pointing register is set equal to the address of the next node in the second level filial set during Control State MG8. If they are equal, however, then MG counter 33 is reset to control State MG4 to determine whether the $ADP_o$ register of that node has been set.

Control States MG9–MG13: During Control State MG9, the $ADP_f$ register of the node whose address is stored in the IU upper first level pointer register is examined to determine whether that first level node is the last node of the first level filial set. If it is determined that it is the last node in the first level filial set, MG counter 33 is set to Control State MG15. Otherwise, MG counter 33 continues to Control State MG10 and the IU register is set equal to the address contained in such $ADP_f$ register. Then during Control State MG11, the contents of the first level $ADP_o$ register (the (IU + 2)th ID register) is examined to determine whether it contains the address of the second level node extending directly from the first level node whose address is contained in the IU register. If it does not contain such address, this indicates that its filial set has already been linked to the filial set of another first level node and accordingly MG counter 33 is set to Control State MG14. If, on the other hand, the $ADP_o$ register contains the address of the first node of its second level filial set, MG counter 33 proceeds to Control State MG12 where the IL lower first level pointing register is set equal to the address contained in the IU upper first level pointing register. The second level JU pointing register is set equal to the second level node address extending from the first level node whose address is contained in the IU register. The JUI upper second level pointer register is set to the same address as is contained in the JU register and the JLI lower second level pointer register is set equal to the contents of the JUI register during Control State MG13. MG counter 33 is then set to Control State MG4.

Control State MG14: During this control state, the $ADP_f$ register of the first level node whose address is contained in the IU register is examined to determine whether it points back to the first level entry node address 0001. If it does not, operation is commenced at Control State MG9 by resetting MG counter 33. Otherwise, MG counter 33 continues to Control State MG15.

Control States MG15–MG17: During Control State MG15, the contents of the $ADP_o$ register of the lower second level filial set node (determined by the contents of the JL register) is examined to determine whether or not it has already been set. If it has not been set, it is set during Control State MG16 to the node address of the register in the third level extending from the node pointed to by the JL register. If it has already been set, MG counter 33 is set to Control State MG17. Operation of the MERGE2 subsystem is completed during Control State MG17 and control of the system is returned to MAIN logic circuitry 35 by resetting switch 23 to the M position.

Control States MG18–MG22: Control State MG18 is reached when, during Control State MG4, it is determined that the $ADP_o$ register of the second level node whose address is fixed by the contents of the JU upper second level pointer register has not yet been set. Thus, during Control State MG18 such $ADP_o$ register is set equal to the contents of the entry node in the third level extending from such second level node pointed to by the JU register. Then, the $ADP_f$ register of the second level filial set, of which the node pointed to by the JU register is a member, is examined to determined whether the end of the filial set has been reached. If it has been reached, MG counter 33 is set to Control State MG30; otherwise, to Control State MG21 where the contents of the JU register is saved in a JX register of memory 45. The lower second level pointer register JL is set to the address of the next register in the second level filial chain during Control State MG22.

Control States MG23–MG27: During this control state, the VAL register of the JL addressed node (stored in the JLth ID register) is examined to determined whether such VAL register has been set equal to 0 and the third level filial set attached thereto already merged into another third level filial set. If the node has already been merged, MG counter 33 is set to Control State MG28. Otherwise during Control State MG24, the $ADP_o$ register for the second level is examined to determine whether it has or has not been set. If it has already been set, again, MG counter 33 is set to Control State MG28. Otherwise, during Control States MG25, 26 and 27 the contents of the third level statistical registers extending from the upper second level node (determined by the contents of the JU register) and lower second level register (determined by the contents of the JL register) are compared to determine whether the statistical contents are equal. If they are equal, then they are candidates for a merger, and MG counter 33 is set to Control State MG45. If the upper and lower statistical registers are not the same, that is, they do not have the same second level probability vectors, MG counter 33 continues to Control State MG28.

Control States MG28–MG34: During Control States MG28 and MG29, the $ADP_f$ register of the lower second level filial set node (determined by the contents of the JL register) is examined to see whether it is the last nody in the second level filial set. If it is not the last node, MG counter 33 is reset to Control State MG22 for further examination of nodes in the filial set to determine whether or not there are any further lower nodes with a VAL which might match the VAL of the present upper filial set node (as addressed by the JU register). If it is the last node in the filial set, during Control State MG30 the lower first level node (as determined by the contents of the IL register) is examined to determine whether it is the last node in the first level filial set. If it is the last node, then MG counter 33 is next set to Control State MG36. Otherwise, during Control State MG31 the IL register is set equal to the address of the next node in the first level filial set. At such next first level filial set node, the $ADP_o$ register is examined to determine whether it points to the filial set extending directly therefrom. If it does not, this means that the filial set extending directly therefrom has already been merged with another second level filial set and the $ADP_f$ register of the node is then examined during Control State MG33 to see whether it is the last node of the first level filial set. However, if the $ADP_o$ register has been set to the address of the node in the second level extending directly therefrom, MG counter 33 is set to Control State MG34 where the JL register is set to point to the address stored in such $ADP_o$ register. The JLI register is initialized to the address stored in the JL register during Control State MG35 and then MG counter 33 is reset to Control State MG23 for rechecking of the third level probability vectors extending therefrom.

Control States MG36–MG40: During Control State MG36, a comparison is made to see whether the end of an upper second level filial set has been reached. If it has, then MG counter 33 is reset to Control State MG9 so that a determination can be made as to whether the upper first level node is at the end of the first level filial set. Otherwise, during the Control State MG37 the JU register is set to point to the next node in the chain. Then during Control State MG38 the VAL register of such next JU node is examined to determine whether it is equal to 0 and hence whether its filial set has already been merged. If it is equal to 0, MG counter 33 is reset to control state MG30 so that the next node in the filial set can be examined. Otherwise, if the VAL register is not equal to 0, there is a filial set extending from the upper node as pointed to by the JU register. The $ADP_o$ register of such second level node is then examined to determine whether it has already been set. If it has already been set, MG counter 33 is set to Control State MG41; but if it has not already been set, the setting is done during Control State MG40.

Control States MG41–MG44: The lower first level pointer register IL is now set to the same node address as is contained in the upper first level pointer register IU and the second level pointer register JLI is set equal to the address stored in the upper second level pointer register JUI register. The $ADP_f$ register of the second level filial set (as determined by the contents of the JU register) is examined during Control State MG42 to determine whether it points back to the entry node of the filial set. If it does point back to the entry node, MG counter 33 is set to Control State MG44 where a determination is made as to whether the bottom of the first level filial set has been reached. Otherwise, further nodes remain in the upper second level filial set chain and during Control State MG43 the JL register is set equal to the address of the next node in the filial set. When Control State MG43 has been reached, the next control state is MG23.

Control States MG45–MG60: Control State MG45 is reached, when during Control State MG27 it is determined that an upper and lower pair of nodes in the second level are merge candidates as determined by their second level probability vectors. During Control State MG45 then, the $ADP_o$ register of the lower second level node is set equal to the address of the entry node of the third level filial set extending from the upper second level node. The two filial sets are combined by setting the $ADP_f$ register of the last node in the upper second level filial set to the address of the entry node of the lower second level filial set and setting the $ADP_f$ register of the last node in the lower second level filial set to the address of the entry node of the upper second level filial set. Thus, the lower third level filial set has been merged into the upper third level filial set, and the lower second level node from which the lower third level filial set extended is now linked to the entry node of the merged third level filial set via its $ADP_o$.

Control States MG61–MG69: Now that two third-level filial sets have been merged into a single filial set, the VAL registers of each node in the new filial set must be examined to determine whether there are among them any duplicate nodes. This is accomplished during Control State MG62. A KU register is utilized to point to an upper node in the new filial set while a KL register is used to point to a lower node in the new filial set. The VAL registers of the upper and lower third level nodes are then compared during Control State MG62. If they are found to be equal, MG counter 33 is set to Control State MG69 so that the VAL register of the lower third level node in the filial set can be set equal to 0. The position of this VAL register in ID memory array 44 is the KLth ID register.

If the upper and lower VALs do not match during Control State MG62, a K register of memory array 45 is set equal to the address of the next node in the upper third level chain so that a determination can be made as to whether the end of the upper third level chain has been reached during Control State MG64. If the end of the original upper chain has not been reached, the process is repeated for the next node in the upper chain by resetting MG counter 33 to Control State MG61. When the end of the original chain has been reached, however, MG counter 33 is set to Control State MG66 where an IS register is set equal to the $ADP_f$ register of the lower chain node as determined by the contents of the KL register. Then during Control State MG67 a determination is made as to whether the third level node pointed to by the KL register is the last node in the lower level chain. If it is the last node, MG counter 33 is reset to Control State MG 28. If not, the KL register is set equal to the last node address stored in the IS register.

Control States MG70–MG84 (FIGS. 29e and 29f): Control State MG70 is reached when, during Control States MG69 and MG69, a determination has been made that the VAL registers of two nodes in the newly merged third level filial set are duplicates. During Control State MG69 the VAL register of the second or lower duplicate node has been set equal to 0. Now during Control States MG70–MG84 it will be necessary to merge the statistics of the second node whose VAL register has been set equal to 0 into the statistics of the upper duplicate node whose VAL register has remained unchanged.

During Control State MG71, an IA register of memory array 45 is utilized to store the statistics of an odd desired response classification ($Z_1$, $Z_3$, $Z_5$, $Z_7$ or $Z_9$) for the upper unchanged duplicate node. Likewise, an ID register of memory array 45 is utilized to store the statistics of a respective odd classified desired response for the lower zero'd duplicate node. The respective statistics are added together during Control State MG72. During Control State MG75 a pair of upper and lower statistical registers for even desired responses ($Z_2$, $Z_4$, $Z_6$, $Z_8$ and $Z_{10}$) are added together. The process is repeated five times as provided by the I indexing register during Control State MG78 so that the entire set of statistical registers are respectively added together. The respective sums are then stored in the statistical registers of the upper nonzero'd node during Control State MG81. The total number of times that the upper node and the lower node have been selected is respectively stored in the seventh statistical register $N_7$ of each. During Control State MG84, the contents of the $N_7$ registers for these two nodes is added together and the sum stored in the seventh statistical register of the upper nonzero'd node. When the operation performed during Control State MG84 is completed, MG counter 33 is reset to Control State MG66 for selection of the next lower node in the new third level filial set to be compared with the present upper node of such new third level filial set for determination of possible duplication.

Control State S1: Referring to FIG. 30*a*, the SEARCH subsystem is utilized exclusively for execution after conversion of the system is complete. Control State S1 is reached when, during Control State 76, a determination is made via MAIN logic circuitry 35 that the system is operating in an execution mode. If it is operating in an execution mode, during Control State 77 a signal is sent from MAIN logic circuitry 35 via time-pulse distributor logic circuitry 34 to switch 23. Switch 23 accordingly is set from the M position to the S position, thereby allowing pulses from clock 24 to operate S counter 27. On the next clock pulse, then, Control State S1*a* is reached.

The purpose of the SEARCH subsystem (SEARCH logic circuitry 43) is to compare an execution key function $\{i,j,k\}$ with the trained paths through the cascaded processor system after conversion for a match and selection for a best estimated desired response for the system to generate as its output. The *i* key component is compared with the values stored in VAL registers of the first processor, the *j* key component is compared to the contents of the VAL registers of a filial set in the second processor linked to a selected first level node by the first level node's outer ADP ($ADP_o$). Then, the *k* key component is compared with the values in VAL registers of a filial set in the third cascaded processor, such filial set being determined by the $ADP_o$ of a selected node in the second processor of the cascade.

Control States S1*a*–S4: During operation of preprocessor 6 and MAIN logic circuitry 35 the *i* key component has been stored in the K1 register of memory 45, the *j* key component has been stored in the K2 register and the *k* key component has been stored in the K3 register. During these control states, the SEARCH subsystem cycles down through the VAL registers of the first processor to find a match for the first key component (stored in the K1 register). If the last node in the filial set of the first processor is reached before a match is found, S counter 27 is set to Control State S10 during Control State S4. If a match has been found during Control State S2 before the end of the first processor filial set has been reached, S counter 27 continues to Control State S5.

Control States S5–S9: Control State S5 is reached when a match has been found for the first key component in the filial set of the first processor. In this embodiment, the first processor is automatically linked to the second processor according to a probability vector via the outer ADP register ($ADP_o$) of the node selected in the first processor. During Control State S5, the J register is set equal to the address stored in the $ADP_o$ register of the selected node in the first processor filial set. Then during Control State S7 the second key component stored in the K2 register is compared to the values stored in the VAL registers of the second level filial set addressed according to the first processor $ADP_o$ linkage. The nodes in the addressed second level filial set are cycled through one at a time during these control states until a match has been found at Control State S7. When a match has been found, S counter 27 is set to Control State S12 so that a match in the third processor may be found. Otherwise, if all nodes in the second level filial set have been searched for a match and there is no match, S counter 27 is set to Control State S10.

Control States S10 and S11: Control State S10 is reached if there is no match in the first processor or there is no match in the second processor or there is no match in the third processor. This means that the system has not been trained for the particular key function $\{i,j,k\}$ presently being introduced into the system. Thus, during Control State S10 an untrained key function counting register IUTURN is updated to reflect the untrained key function, and operation of the SEARCH subsystem is complete for that particular key function at Control State S11. At Control State S11, operation of the system is returned to MAIN logic circuitry 35 at Control State 80 by the resetting of switch 23 to the M position.

Control States S12–S17: During these control states, the third processor filial set (linked to a selected second processor node during Control State S7) is examined to find a match for the third key component stored in the K3 register. This is accomplished by following the address linkage stored in the $ADP_o$ register of the selected second processor node to an entry node in a filial set of the third processor. During Control State S14 the third level key component is compared with the contents of a VAL register of a node in the third level filial set. The comparison continues until a match has been found or the end of the filial set has been reached. If the end of the filial set has been reached as determined during Control State S16 before a match is found, S counter 27 is set to Control State S10 because the system has not been trained on the present key function. If a match has been found for the third key component stored in the K3 register during Control State S14, S counter 27 is advanced to Control State S17 where a trained key function counting register ITRN is updated to reflect the fact that the system has been trained on the present key function.

Control States S18–S26: These control states are reached when a path has been followed through the first, second and third processors in accordance with the present key function out to statistical registers in the leaf level of the third processor. It should be remembered that originally, the statistics derived during training were stored only in the first five statistical registers ($N_1-N_5$). During operation of the SEARCH subsystem the first five statistical registers will be decoded and the information stored therein respectively stored in all ten statistical registers ($N_1-N_{10}$) according to their respective word classes ($Z_1-Z_{10}$). Thus, the statistics associated with a desired response of $Z_1$ will be stored in the $N_1$ statistical register. This process of decoding is done only for those nodes selected during execution and need only be performed once for each selected node. Thus during Control State S18 a determination is made as to whether, for the node selected, the decode-encode process has already been done. If it has not been done, the first five statistical registers are decoded during these control states. If these statistical registers have already been decoded S counter 27 is set to Control State S28. Otherwise, the decoding process is accomplished during these control states.

Control States S28–S31: These control states are reached when, during Control State S18, it is determined that the statistics originally stored in the first five statistical registers of a third processor node have already been decoded and encoded into the tenth statistical registers $N_1-N_{10}$. Thus, during Control State S29 the statistics stored in the statistical registers of the selected third processor node as determined by the key function is also stored in ten ISTATE registers. When this operation has been completed, S counter 27 is skipped to Control State S36.

Control States S32–S35: Control State S32 is reached when, during Control State S18, it is determined that these statistics stored in a particular selected third processor node had not yet been decoded and encoded into all ten of the statistical registers. The decoding and encoding took place during Control States S22–S27 and now during Control State S33, the encoded statistics are stored in the ten ISTATE registers. When all 10 of the ISTATE registers have been filled, S counter 27 continues to Control State S36.

Control States S36–S45: Referring to FIG. 30*c*, during Control States S36–S36*c* the statistics stored in the ISTATE registers are respectively stored in their proper statistical register of the selected third level node.

Then during Control States S36*b*–S39, the respective statistics are summed to the statistics already accumulated in ten ISTAC registers. Thus, in each one of the ISTAC registers is stored an accumulated sum for one of the word classes $Z_1-Z_{10}$. During Control States S40–S44, the sum of the first nine statistical registers stored in the first nine ISTATE registers is determined. The sum is then stored in an ISUM register.

Operation of the SEARCH subsystem is completed when Control State S45 is reached.

As previously discussed, a general-purpose digital computer may be regarded as a storeroom of electrical parts and when properly programmed, becomes a special purpose digital computer or special electrical circuit. The FORTRAN IV program of TABLES II*a–i* carries out essentially the same operations in a general-purpose digital computer having a compatible FORTRAN IV compiler as the operations (represented by the flow charts of FIGS. 22*a–i*, 23*a* and 23*b*, 24*a* and 24*b*, 25, 26*a–c*, 27*a–d*, 28*a–d*, 29*a–f* and 30*a–c*) specifically described above with reference to the special-purpose system embodied in FIG. 21.

Several embodiments of the synthesized cascaded processor system of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

TABLE IIa

FORTRAN IV G LEVEL 18 MAIN AND PREPROCESSOR

```
      INTEGER*2 IN(13888), NR1, NR2
      DIMENSION U(13888)
      INTEGER*2 HABS
      DATA ISMX,NGRPS/1,6/,ICMX/10/
      DATA VM/1.7/
      DATA IZERO/10/,IVMAX/50/
      DIMENSION RS(3) ,NCOR(10)
      DATA NCOR/10*0/
      DATA RS/.015,.015,25./
      COMMON/BLK1/ICNT,ICT,IQ(3),ICLASS,ISUM,LPTR
      COMMON/BLK2/ID(30000)
      INTEGER*2 ID
      COMMON/IFIRST/IFIRST
      COMMON/ISTAC/ISTAC(10),IUTRN,ITRN
      LOGICAL*1 TRAIN,FT03A
      FT03A = .TRUE.
      IUTRN = 0
      ITRN = 0
      TIMAC = 0.
      SCALE = VM/32768.
      TRAIN = .TRUE.
  100 CONTINUE
      NR=0
      DO 990 ICLASS = 1,ICMX
      CALL STASK
      IF(FT03A) GO TO 120
      IF(.NOT. TRAIN) GO TO 104
      REWIND 10
      GO TO 108
  104 CONTINUE
      IF(ICLASS .EQ. 1) GO TO 120
      DO 106 I = 1,40
  106 BACKSPACE 10
      GO TO 120
  108 CONTINUE
C
C         POSITION TAPE TO FIRST RECORD OF TYPE ICLASS
C
      N = ICLASS
      DO 110 I = 1,N
      READ(10,1001,END=999) NR1,(IN(J), J = 1,6944)
      READ(10,1001,END=999) NR2,(IN(J), J = 6945,13888)
 1001 FORMAT(34(200A2),145A2)
  110 CONTINUE
C END OF LOOP
  120 CONTINUE
      DO 980 IS = 1,ISMX
      IFIRST = 1
      DO 970 ICNT = 1,NGRPS
```

```
             C
             C                 READ INPUT DATA FROM TAPE
             C  READ DATA FOR WORD OF TYPE 'ICLASS'
             C
...0046            READ(10,1001,END=999) NR1,(IN(J), J = 1,6944)
...0047            READ(10,1001,END=999) NR2,(IN(J), J = 6945,13888)
...0048            NR = NR + 1
...0049            WRITE(6,1000) NR1,NR2,(IN(I),I=1000,13000,1000),NR
...0050       1000 FORMAT(/ 1X,'OUTPUT RECORDS ', 15I7 , 'WORD',I5)
             C
             C            LOOK FOR DATA LARGER THAN THRESHOLD
             C
...0051            DO 140 I = 1,3000
...0052            IF(IN(I) .GE. 1927) GO TO 150
...0053        140 CONTINUE
...0054            WRITE(6,1002) NR
...0055       1002 FORMAT(1X,'WORD ',I5,' HAS AN INSIGNIFICANT SAMPLE
                     BASE ')
...0056            GO TO 308
...0057        150 CONTINUE
             C
             C            SCALE INPUT DATA
             C            FIND MAXIMUM DATA VALUE AND TERMINAL DATA
                            POINT
             C
...0058            UMAX = 0.
...0059            IST = I
...0060            DO 170 I = IST,13888
...0061            U(I) = IN(I) * SCALE
...0062            UABS = ABS(U(I))
...0063            IF(UABS .GT. UMAX) UMAX = UABS
...0064            IF(UABS .GT. .1)GO TO 170
...0065            IF(I .LT. 6945 ) GO TO 170
...0066            K = MIN( (I+50), 13888)
...0067            DO 160 J = I,K
...0068            IF( IABS( IN(J)  ) .GE. 1927) GO TO 170
...0069        160 CONTINUE
...0070            ITERM = I
...0071            GO TO 180
...0072        170 CONTINUE
...0073            ITERM = 13888
...0074        180 CONTINUE
             C
             C
             C          SHIFT DATA AND NORMALIZE
             C
...0075            IMAX = ITERM - IST + 1
...0076            DO 190 I = 1,IMAX
...0077            J = I-1+IST
...0078            U(I) = U(J)/UMAX
...0079        190 CONTINUE
...0080            IB = 1
```

```
      IU = 1
      IV = 1
      DO 194 I = 1,10
      ISTAC(I) = 0
  194 CONTINUE
  200 CONTINUE
      A = 0.
      B = 0.
      C = 0.
      JD = 0
      ICROSS = 0
      DO 300 IX = IB,IMAX
      JD = JD + 1
      A = A + U(IX)
      B = B + U(IX)*U(IX)
      IF(IX .GT. 1) C = C + ABS(U(IX-1) - U(IX) )
      IF(IX .EQ. 1)GO TO 300
      IF( U(IX-1) .EQ. 0.) GO TO 300
      P = U(IX-1) * U(IX)
      IF( P .LT. 0.) ICROSS = ICROSS + 1
      IF( ICROSS .LT. IZERO) GO TO 300
      D = JD
      U(IV) = A/D
      U(IV+1) = SQRT(B/D)
      U(IV+2) = C/D
      U(IV+3) = D
      U(IV+4) = IU
      DO 220 K = 1,3
      IQ(K) = U(IV+K)/RS(K) + 1.
  220 CONTINUE
      IF(TRAIN) GO TO 230
      CALL SEARCH
      GO TO 250
  230 CONTINUE
      CALL TREE
      IFIRST = 0
  240 CONTINUE
      L = IV + 2
  250 CONTINUE
      IU = IU + 1
      IV = IV + 5
      IF(IU .GT. IVMAX)GO TO 302
      IB = IX
      GO TO 200
  300 CONTINUE
  302 CONTINUE
      IF(TRAIN) GO TO 306
      MX = ISTAC(1)
      IANS = 1
      DO 304 IX = 2,10
      IF(ISTAC(IX) .LE. MX) GO TO 304
```

```
FORTRAN IV G LEVEL   18        MAIN AND PREPROCESSOR

...0132              IANS = IX
...0133              MX = ISTAC(IX)
...0134          304 CONTINUE
...0135              WRITE(6,1010) ISTAC
...0136         1010 FORMAT(1X,10I10)
...0137              WRITE(6,1012) ICLASS,IANS
...0138         1012 FORMAT(1X,'CORRECT ID IS WORD CLASS',I4,5X,
                    1      'EXECUTION ID IS WORD CLASS',I4)
...0139              IF(ICLASS .EQ. IANS) NCOR(IANS) = NCOR(IANS) + 1
...0140          306 CONTINUE
...0141          308 CONTINUE
...0142              IF(FT03A) GO TO 970
...0143              IF(IS .EQ. ISMX .AND. ICNT .EQ. NGRPS) GO TO 970
               C
               C        POSITION TAPE TO NEXT RECORD OF TYPE ICLASS
               C
...0144              DO 310 I = 1,9
...0145              READ(10,1001,END=999) NR1,(IN(J), J = 1,6944)
...0146              READ(10,1001,END=999) NR2,(IN(J), J = 6945,13888)
...0147          310 CONTINUE
               C                      END OF LOOP
...0148          970 CONTINUE
               C                      END OF LOOP
...0149              IF(.NOT. TRAIN) GO TO 980
...0150              ISUM = 0
...0151          320 CONTINUE
...0152              IF(LPTR .LE. 0)GO TO 980
...0153              CALL COMPRS
...0154              GO TO 320
...0155          980 CONTINUE
               C                      END OF LOOP
               C
...0156              CALL TTASK(TIME)
...0157              TIMAC = TIMAC + TIME
...0158              WRITE(6,2000) TIME,TIMAC
...0159         2000 FORMAT(1X,'TIME =', E16.4, 10X, 'TOTAL TIME
                      =',E16.4)
...0160          990 CONTINUE
               C                      END OF LOOP
...0161              IF(.NOT. TRAIN) GO TO 998
...0162              TRAIN = .FALSE.
...0163              WRITE(6,1009) ICT
...0164         1009 FORMAT(1X,'NUMBER OF TREE LOCATIONS USED =', I6)
...0165              MX = 5000
...0166              IC = MIN(MX,ICT)
...0167              WRITE(6,1008) ( I, (ID(J+I-1), J = 1,20),
                      I = 1,IC,20)
...0168         1008 FORMAT('1', (/ 1X,I5,3X,20I6) )
...0169              CALL STASK
...0170              CALL COMBN
...0171              CALL MERGE1
...0172              CALL COMBN2
```

```
FORTRAN IV G LEVEL  18        MAIN AND PREPROCESSOR

...0173          CALL MERGE2
...0174          CALL TTASK(TIME)
...0175          WRITE(6,2000) TIME
...0176          WRITE(6,1008) ( I, (ID(J+I-1), J = 1,20),
                   I = 1,IC,20)
...0177          NGRPS = 3
...0178          IF(FT03A) GO TO 100
...0179          DO 997 I = 1,20
...0180      997 BACKSPACE 10
...0181          GO TO 100
           C                         EXECUTE
...0182      998 CONTINUE
...0183          WRITE(6,1008) ( I, (ID(J+I-1), J = 1,20),
                   I = 1,IC,20)
...0184          WRITE(6,1011) IUTRN,ITRN
...0185     1011 FORMAT(1X,'UNTRAINED = ',I6,10X,'TRAINED =',I6 )
...0186          WRITE(6,1013) NCOR
...0187     1013 FORMAT(///,1X,'NUMBER OF CORRECT ID',5X,10I10)
...0188          STOP
...0189      999 CONTINUE
...0190          WRITE(6,1005) NR2
...0191     1005 FORMAT(// 1X,' READ EOF AFTER RECORD NUMBER ',I6)
...0192          STOP
...0193          END
```

TABLE IIb

```
FORTRAN IV G LEVEL   18                    TREE

                 SUBROUTINE TREE
                 COMMON/BLK1/ICNT,ICT,IU(3),ICLASS,ISUM,LPTR
                 COMMON/BLK2/ID(30000)
                 INTEGER*2 ID
                 COMMON/MI/MI
                 COMMON/IFIRST/IFIRST
                 DATA ISW/0/
                 IF(ISW .EQ. 0)GO TO 60
                 LEVEL = 1
                 IDUM = 1
              20 CONTINUE
                 IF(ID(IDUM) .EQ. IU(LEVEL) ) GO TO 50
                 IF(ID(IDUM+1) .LE. IDUM) GO TO 150
                 IDUM = ID(IDUM+1)
                 GO TO 20
              50 CONTINUE
                 IF(LEVEL .EQ. 1)IDUM = IDUM + 1
                 IDUM = IDUM + 2
                 LEVEL = LEVEL + 1
                 IF(LEVEL .LE. 3)GO TO 20
                 GO TO 185
              60 CONTINUE
                 NM1 = 3
                 LEVEL = 1
                 ICT = 1
                 ISW = 1
                 GO TO 160
             150 CONTINUE
           C     NO MATCH AT CURRENT LEVEL
                 IF(ICT .GT. MI-12) GO TO 1500
                 ID(ICT) = IU(LEVEL)
                 ID(ICT+1) = ID(IDUM+1)
                 ID(IDUM+1) = ICT
                 ICT = ICT + 2
                 IF(LEVEL .EQ. 1) ICT = ICT + 1
                 LEVEL = LEVEL + 1
                 IF(LEVEL .GT. 3) GO TO 180
             160 CONTINUE
                 DO 170 I = LEVEL,NM1
                 ID(ICT) = IU(I)
                 ID(ICT+1) = ICT
                 ICT = ICT + 2
                 IF(I .EQ. 1) ICT = ICT + 1
             170 CONTINUE
             180 CONTINUE
                 IDUM = ICT
                 ICT = ICT + 10
             185 CONTINUE
```

FORTRAN IV G LEVEL 18 TREE

```
...0048          IWORD = (ICNT-1)/2
...0049          IHAT = ID(IDUM+6+IWORD)
...0050          IF( MOD(ICNT,2) .EQ. 0)GO TO 190
...0051          IHAT = IHAT + 181
...0052          GO TO 200
...0053     190  CONTINUE
...0054          IHAT = IHAT + 1
...0055     200  CONTINUE
...0056          ID(IDUM+6+IWORD) = IHAT
...0057          IF(IFIRST .EQ. 1) LPTR = -1
...0058          IF( ID(IDUM+9) .NE. 0) GO TO 205
...0059          ID(IDUM+9) = LPTR
...0060          LPTR = IDUM + 9
...0061     205  CONTINUE
...0062     220  CONTINUE
...0063          RETURN
...0064    1500  CONTINUE
...0065          WRITE(6,1001)
...0066    1001  FORMAT( // 1X,'DIMENSION OF ID ARRAY INSUFFI-
                 CIENT' )
...0067          STOP
...0068          END
```

TABLE IIc

```
FORTRAN IV G LEVEL   18                    COMPRS

            SUBROUTINE COMPRS
            COMMON/BLK1/ICNT,ICT,IU(3),ICLASS,LSUM,LPTR
            COMMON/BLK2/ID(30000)
            INTEGER*2 ID
            DIMENSION IY(6)
            VAR = 0.
            ISUM = 0
            IDUM = LPTR - 4
            DO 10 I = 1,3
            J = 2*I-1
            IY(J) = ID(IDUM+I)/181
            IY(J+1) = ID(IDUM+I) - IY(J)*181
         10 CONTINUE
            DO 20 I = 1,6
            ISUM = ISUM + IY(I)
         20 CONTINUE
            SUM = ISUM
            AVE = SUM/6.
            DO 30 I = 1,6
            DUM = IY(I)
            VAR = VAR + ABS(DUM-AVE)
         30 CONTINUE
            AVEVAR = VAR/SUM
            IF(AVEVAR .GT. 1.) AVEVAR = 1.
            L = SUM * (1. - AVEVAR) + SUM
            ID(IDUM) = ID(IDUM) + L
            LSUM = LSUM + L
            K = (ICLASS+1)/2 + LPTR - 10
            IF( MOD(ICLASS,2) .EQ. 0) GO TO 40
            IF( ( ID(K)/181 ) + L   .GT.  180) CALL REDUC
            (ID,LPTR)
            ID(K) = ID(K) + 181*L
            GO TO 50
         40 CONTINUE
            IDK = ID(K)
            IF( ( MOD( IDK    , 181) + L) .GT. 180)
            CALL REDUC(ID,LPTR)
            ID(K) = ID(K) + L
         50 CONTINUE
            IDUM = ID(LPTR)
            DO 60 I = 1,4
            ID(LPTR-4+I) = 0
         60 CONTINUE
            LPTR = IDUM
            RETURN
            END
```

TABLE IId

FORTRAN IV G LEVEL 18 REDUC

```
      SUBROUTINE REDUC(ID,LPTR)
      INTEGER*2 ID(1)
      ID(LPTR-4) = ID(LPTR-4) + 10000
      J = LPTR - 10
      DO 10 I = 1,5
      IDUM1 = ID(J+I)/181
      IDUM2 = ID(J+I) - 181*IDUM1
      ID(J+I) = (IDUM1/2)*181 + IDUM2/2
   10 CONTINUE
      RETURN
      END
```

TABLE IIe

```
FORTRAN IV G LEVEL  18                    COMBN

          SUBROUTINE COMBN
          COMMON/BLK2/ID(30000)
          INTEGER*2 ID
          DIMENSION IAC(10),IK(10)
          LEV1 = 1
       10 CONTINUE
          IPTR = LEV1 + 6
          DO 20 I = 1,10
          IAC(I) = 0
       20 CONTINUE
          ITEF = 0
       30 CONTINUE
          DO 40 I = 1,5
          J = 2*I-1
          IK(J) = ID(IPTR+I)/181
          IK(J+1) = ID(IPTR+I) - IK(J)*181
       40 CONTINUE
          ITEF = ITEF + ID(IPTR+6)
          IDUM = ID(IPTR+6)
          IDUM = IDUM/10000
          IF(IDUM .LE. 0) GO TO 55
          DO 50 J = 1,9
          IK(J) = 2**IDUM * IK(J)
       50 CONTINUE
       55 CONTINUE
          DO 57 J = 1,9
          IAC(J) = IAC(J) + IK(J)
       57 CONTINUE
          IF( ID(IPTR) .LE. (IPTR-1) ) GO TO 60
          IPTR = ID(IPTR) + 1
          GO TO 30
       60 CONTINUE
          IPTR = ID(IPTR) - 1
          IF( ID(IPTR) .LE. IPTR-1) GO TO 70
          IPTR = ID(IPTR) + 3
          GO TO 30
       70 CONTINUE
          TEF = ITEF
          DO 75 I = 1,9
          A = IAC(I)
          IAC(I) = (A/TEF) * 31. + .5
       75 CONTINUE
          DO 90 I = 1,3
          IDUM = 0
          DO 80 J = 1,3
          JBN = 17 + 5*(J-1)
          CALL IPUT(JBN,5,IAC(I+3*(J-1) ) , IDUM)
       80 CONTINUE
```

```
FORTRAN IV G LEVEL   18                    COMBN

          ID(LEV1+12+I) = IDUM
       90 CONTINUE
          ID(LEV1+12) = ITEF
          IF( ID(LEV1+1) .LE. LEV1) GO TO 100
          LEV1 = ID(LEV1+1)
          GO TO 10
      100 CONTINUE
          RETURN
          END
```

TABLE IIf

```
FORTRAN IV G LEVEL  18                MERGE1

      SUBROUTINE MERGE1
      COMMON/BLK2/ID(30000)
      INTERGER*2 ID
      DIMENSION II(5),IJ(5)
      IPTR = 1
   10 CONTINUE
      IF( ID(IPTR+2) .EQ. 0)GO TO 20
   15 IF( ID(IPTR+2) .LE. 1)GO TO 300
      IPTR = ID(IPTR+1)
      GO TO 10
   20 CONTINUE
      ID(IPTR+2) = IPTR+3
      JPTR = IPTR
   30 CONTINUE
      IDUM = ID(JPTR+1)
      IF( IDUM .LE. 1)GO TO 15
      JPTR = IDUM
      IF(  ID(IDUM+13) .NE.  ID( IPTR+13) )GO TO 30
      IF(  ID(IDUM+14) .NE.  ID( IPTR+14) )GO TO 30
      IF(  ID(IDUM+15) .NE.  ID( IPTR+15) )GO TO 30
   50 CONTINUE
      ID( IDUM+2) = IPTR+3
      IQ = IPTR + 3
   60 CONTINUE
      IS = ID( IQ+1)
      IF( IS .LE. IQ)GO TO 70
      IQ = IS
      GO TO 60
   70 CONTINUE
      ISAV1 = IQ + 1
      IR = IDUM + 3
   80 CONTINUE
      ISS = ID( IR+1)
      IF( ISS .LE. IR)GO TO 90
      IR = ISS
      GO TO 80
   90 CONTINUE
      ISAV2 = IR + 1
      IQ = IPTR + 3
      IR = IDUM + 3
      ID( ISAV2) = IQ
      ID( ISAV1) = IR
  100 CONTINUE
      IK = ID( IR)
  110 IF( ID( IQ) .EQ. IK)GO TO 130
      IW = ID( IQ+1)
      IF( IQ+1 .EQ. ISAV1) GO TO 120
      IQ = IW
```

```
      GO TO 110
  120 CONTINUE
      IS = ID(IR+1)
      IF(IR+1 .EQ. ISAV2) GO TO 30
      IR = IS
      IQ = IPTR + 3
      GO TO 100
  130 CONTINUE
      ID(IR) = 0
      IT = IQ + 2
      IV = IR + 2
  140 CONTINUE
      ITT = ID(IT+1)
      IF(ITT .LE. IT) GO TO 150
      IT = ITT
      GO TO 140
  150 CONTINUE
      ISAV11 = IT + 1
  160 CONTINUE
      IVV = ID(IV+1)
      IF(IVV .LE. IV)GO TO 170
      IV = IVV
      GO TO 160
  170 CONTINUE
      ISAV22 = IV + 1
      IQQ = IQ + 2
      IRR = IR + 2
      ID(ISAV11) = IRR
      ID(ISAV22) = IQQ
  180 CONTINUE
      IKK = ID(IRR)
  190 CONTINUE
      IF(ID(IQQ) .EQ. IKK)GO TO 210
      IWW = ID(IQQ+1)
      IF(IQQ+1 .EQ. ISAV11)GO TO 200
      IQQ = IWW
      GO TO 190
  200 CONTINUE
      ISS = ID(IRR+1)
      IF(ISS .EQ. (IQ+2) ) GO TO 120
      IRR = ISS
      IQQ = IQ + 2
      GO TO 180
  210 CONTINUE
      ID(IRR) = 0
      K = 1
      DO 220 I=1,5
      IA = ID(IQQ+I+1)/181
      IB = ID(IRR+I+1)/181
      II(I) = IA + IB
      IF(II(I) .GT. 180) K = 2
```

```
FORTRAN IV G LEVEL  18                    MERGE1

            IJ(I) = ID(IQQ+I+1) - IQ*181 + ID(IRR+I+1) -
            IB*181
            IF(IJ(I) .GT. 180) K = 2
       220 CONTINUE
           DO 230 I = 1,5
           ID(IQQ+I+1) = IJ(I)/K + 181*(II(I)/K)
       230 CONTINUE
           ID(IQQ+7) = ID(IQQ+7) + ID(IRR+7)
           GO TO 200
       300 CONTINUE
           WRITE(6,1000)
      1000 FORMAT(1X,'COMPLETED FIRST LEVEL MERGER')
           RETURN
           END
```

TABLE IIg

FORTRAN IV G LEVEL 18 COMBN2

```
      SUBROUTINE COMBN2
      COMMON/BLK2/ID(30000)
      INTEGER*2 ID
      DIMENSION IAC(10),IK(10)
      LEV1 = 1
   10 CONTINUE
      IPTR = LEV1 + 6
      LEV2 = LEV1 + 3
      LEV3 = LEV1 + 5
   15 CONTINUE
      DO 20 I = 1,10
      IAC(I) = 0
   20 CONTINUE
      ITEF = 0
   30 CONTINUE
      DO 40 I - 1,5
      J = 2*I-1
      IK(J) = ID(IPTR+I)/181
      IK(J+1) = ID(IPTR+I) - ID(J)*181
   40 CONTINUE
      ITEF = ITEF + ID(IPTR+6)
      IDUM = ID(IPTR+6)
      IDUM = IDUM/10000
      IF(IDUM .LE. 0) GO TO 55
      DO 50 J = 1,9
      IK(J) = 2**IDUM * IK(J)
   50 CONTINUE
   55 CONTINUE
      DO 57 J = 1,9
      IAC(J) = IAC(J) + IK(J)
   57 CONTINUE
   58 CONTINUE
      IF( ID(IPTR) .EQ. (LEV2+2) ) GO TO 70
      IPTR = ID(IPTR) + 1
      IF( ID(IPTR-1) .NE. 0) GO TO 30
      GO TO 58
   70 CONTINUE
      TEF = ITEF
      DO 75 I = 1,9
      A = IAC(I)
      IAC(I) = (A/TEF) * 31. + .5
   75 CONTINUE
      DO 90 I = 1,3
      IDUM = 0
      DO 80 J = 1,3
      JBN = 17 + 5*(J-1)
      CALL IPUT(JBN,5,IAC(I+3*(J-1) ) , IDUM)
   80 CONTINUE
```

```
      ID(LEV2+9+I) = IDUM
      ID(LEV2+9) = ITEF
   90 CONTINUE
   92 CONTINUE
      IF( ID(LEV2+1) .NE. (LEV1+3) ) GO TO 100
   95 CONTINUE
      IF ( ID(LEV1+1) .LE. LEV1) GO TO 120
      LEV1 = ID(LEV1+1)
      IF( ID(LEV1+2) .EQ. LEV1) GO TO 10
      GO TO 95
  100 CONTINUE
      LEV2 = ID(LEV2+1)
      IF( ID(LEV2) .EQ. 0) GO TO 92
      LEV3 = LEV2 + 2
      IPTR = LEV3 + 1
      GO TO 15
  120 CONTINUE
      RETURN
      END
```

TABLE IIh

```
FORTRAN IV G LEVEL   18                    MERGE2

...0001          SUBROUTINE MERGE2
...0002          COMMON/BLK2/ID(30000)
...0003          INTEGER*2 ID
...0004          DIMENSION II(5),IJ(5)
...0005          COMMON/PRINT1/PRNT
...0006          LOGICAL*1 PRNT
...0007          IU = 1
...0008          IL = 1
...0009          JU = IU + 3
...0010          JUI = JU
...0011          JLI = JU
...0012       40 CONTINUE
...0013          IWRT = 1
...0014                    IF(PRNT)
                2WRITE(6,1001) IWRT,IU,IL,JU,JL,KU,KL,JUI,JLI,IS,
                1   ISS, ISAV1, ISAV2, JX, K, KKU, KKL
...0015      1001 FORMAT(/ 1X, 20I6)
           C  CHECK OUTER ADS FOR PREVIOUS LINK
...0016          IF( ID(JU+13) .EQ. 0)GO TO 60
...0017       50 CONTINUE
           C  CHECK FIRST SECOND LEVEL NODE FOR A CHAIN
...0018          IF( JU .EQ. JUI .AND. ID(JU+1) .EQ. JUI)GO TO 300
           C  CHECK FOR END OF UPPER SECOND LEVEL CHAIN
...0019          IF( ID(JU+1) .EQ. JUI) GO TO 320
...0020          JU = ID(JU+1)
...0021          GO TO 40
...0022       60 CONTINUE
           C  SET OUTER ADS
...0023          ID(JU+13) = JU+2
           C  CHECK FIRST SECOND LEVEL NODE FOR A CHAIN
...0024          IF( JU .EQ. JUI .AND. ID(JU+1) .EQ. JUI)GO TO 300
...0025       70 CONTINUE
...0026          JX = JU
...0027       80 CONTINUE
...0028          JL = ID(JX+1)
...0029       90 CONTINUE
...0030          IWRT = 2
...0031                    IF(PRNT)
                2WRITE(6,1001) IWRT,IU,IL,JU,JL,KU,KL,JUI,JLI,IS,
                1   ISS,ISAV1,ISAV2,JX,K,KKU,KKL
           C  CHECK TO SEE IF NODE IS A MERGE CANDIDATE
...0032          IF( ID(JL) .EQ. 0)GO TO 92
...0033          IF( ID(JL+13) .NE. 0)GO TO 92
...0034          IF( ID(JL+10) .NE. ID(JU+10) ) GO TO 92
...0035          IF( ID(JL+11) .NE. ID(JU+11) ) GO TO 92
...0036          IF( ID(JL+12) .NE. ID(JU+12) ) GO TO 92
...0037          GO TO 94
...0038       92 CONTINUE
```

```
FORTRAN IV G LEVEL  18                    MERGE2

...0039          JX = JL
              C  CHECK FOR END OF LOWER SECOND LEVEL CHAIN
...0040          IF( ID(JL+1) .NE. JLI) GO TO 80
...0041      300 CONTINUE
              C  CHECK FOR END OF LOWER FIRST LEVEL CHAIN
...0042          IF( ID(IL+1) .EQ. 1) GO TO 340
...0043      305 CONTINUE
...0044          IL = ID(IL+1)
              C  FIND BEGINNING OF NEXT FIRST LEVEL CHAIN
...0045          IF( ID(IL+2) .EQ. IL) GO TO 310
...0046          IF( ID(IL+1) .NE. 1) GO TO 305
...0047          GO TO 340
...0048      320 CONTINUE
              C  CHECK FOR END OF UPPER FIRST LEVEL CHAIN
...0049          IF( ID(IU+1) .EQ. 1) GO TO 200
...0050          IU = ID(IU+1)
              C  CHECK FIRST LEVEL OUTER ADS
...0051          IF( ID(IU+2) .EQ. IU) GO TO 330
              C  CHECK FOR END OF UPPER FIRST LEVEL CHAIN
...0052          IF( ID(IU+1) .NE. 1) GO TO 320
...0053          GO TO 200
...0054      330 CONTINUE
...0055          IL = IU
...0056          JU = IU+3
...0057          JUI = JU
...0058          JLI = JUI
...0059          GO TO 40
...0060      310 CONTINUE
...0061          JL = IL + 3
...0062          JLI = JL
...0063          GO TO 90
...0064      340 CONTINUE
              C  CHECK FOR END OF UPPER SECOND LEVEL CHAIN
...0065          IF(ID(JU+1) .EQ. JUI) GO TO 320
...0066          JU = ID(JU+1)
              C  CHECK TO SEE IF NODE HAS BEEN PREVIOUSLY MERGED
...0067          IF( ID(JU) .EQ. 0) GO TO 340
              C  SET OUTER ADS
...0068          IF( ID(JU+13) .EQ. 0) ID(JU+13) = JU+2
...0069          IL = IU
...0070          JLI = JUI
              C  CHECK FOR END OF UPPER SECOND LEVEL CHAIN
...0071          IF( ID(JU+1)  .EQ. JUI) GO TO 350
...0072          JL = ID(JU+1)
...0073          GO TO 90
...0074      350 CONTINUE
              C  CHECK FOR END OF UPPER FIRST LEVEL CHAIN
...0075          IF( ID(IU+1) .EQ. 1) GO TO 200
...0076          GO TO 305
...0077       94 CONTINUE
```

```
FORTRAN IV G LEVEL  18                    MERGE2

...0078          ID(JL+13) = JU+2
...0079          KU = JU + 2
...0080          KKU = KU
...0081          KL = JL + 2
...0082          KKL = KL
           C  FIND END OF UPPER THIRD LEVEL CHAIN
...0083      100 CONTINUE
...0084          IS = ID(KU+1)
...0085          IWRT = 3
...0086                            IF(PRNT)
                2WRITE(6,1001) IWRT,IU,IL,JU,JL,KU,KL,JUI,JLI,IS,
                1    ISS,ISAV1,ISAV2,JX,K,KKU,KKL
...0087          IF( IS .EQ. KKU)GO TO 110
...0088          KU = IS
...0089          GO TO 100
...0090      110 CONTINUE
...0091          ISAV1 = KU+ 1
           C  FIND END OF LOWER THIRD LEVEL CHAIN
...0092      120 CONTINUE
...0093          ISS = ID(KL + 1)
...0094          IWRT = 4
...0095                            IF(PRNT)
                2WRITE(6,1001) IWRT,IU,IL,JU,JL,KU,KL,JUI,JLI,IS,
                1    ISS,ISAV1,ISAV2,JX,K,KKU,KKL
...0096          IF(ISS .EQ. KKL)GO TO 130
...0097          KL = ISS
...0098          GO TO 120
...0099      130 CONTINUE
           C  LINK UPPER AND LOWER THIRD LEVEL CHAINS
...0100          ISAV2 = KL + 1
...0101          ID(ISAV1) = KKL
...0102          ID(ISAV2) = KKU
...0103          KL = KKL
...0104      140 CONTINUE
...0105          KU = KKU
...0106          IWRT = 5
...0107                            IF(PRNT)
                2WRITE(6,1001) IWRT,IU,IL,JU,JL,KU,KL,JUI,JLI,IS,
                1    ISS,ISAV1, ISAV2, JX,K,KKU,KKL
...0108          IF( ID(KL) .NE. 0)GO TO 150
...0109          IS = ID(KL+1)
...0110          IF(KL .EQ. ISAV2=1) GO TO 92
...0111          KL = IS
...0112          GO TO 140
...0113      150 CONTINUE
...0114          IF(KU .EQ. KL) GO TO 160
           C  CHECK TO SEE IF NODES CAN BE MERGED
...0115          IF( ID(KU) .EQ. ID(KL) ) GO TO 170
...0116          K = ID(KU+1)
...0117          IF( K.EQ. KKL)GO TO 160
...0118          KU = K
...0119          GO TO 150
```

```
FORTRAN IV G LEVEL  18                    MERGE2

...0120      160 CONTINUE
           C  GET NEXT NODE IN LOWER CHAIN THAT IS A MERGE
              CANDIDATE
...0121          IS = ID(KL+1)
...0122          IWRT = 6
...0123                           IF(PRNT)
             2WRITE(6,1001) IWRT,IU,IL,JU,JL,KU,KL,JUI,JLI,IS,
             1    ISS,ISAV1,ISAV2,JX,K,KKU,KKL
...0124          IF( KL .EQ. ISAV2-1) GO TO 92
...0125          KL = IS
...0126          GO TO 140
...0127      170 CONTINUE
...0128          ID(KL) = 0
...0129          IWRT = 7
...0130                           IF(PRNT)
             2WRITE(6,1001) IWRT,IU,IL,JU,JL,KU,KL,JUI,JLI,IS,
             1    ISS,ISAV1,ISAV2,JX,K,KKU,KKL
...0131          K = 1
...0132          DO 180 I = 1,5
...0133          IA = ID(KU+I+1)/181
...0134          IB = ID(KL+I+1)/181
...0135          II(I) = IA + IB
...0136          IF( II(I) .GT. 180) K = 2
...0137          IJ(I) = ID(KU+I+1) - IA*181 + ID(KL+I+1) - IB*181
...0138          IF( IJ(I) .GT. 180) K = 2
...0139      180 CONTINUE
...0140          DO 190 I = 1,5
...0141          ID(KU+I+1) = IJ(I)/K + 181*(II(I)/K)
...0142      190 CONTINUE
...0143          ID(KU+u) = ID(KU+7) + ID(KL+7)
...0144          GO TO 160
...0145      200 CONTINUE
...0146          IF( ID(JL+13) .EQ. 0) ID(JL+13) = JL+2
...0147          WRITE(6,1000)
...0148     1000 FORMAT(1X,'SECOND LEVEL MERGER COMPLETE' )
...0149          RETURN
...0150          END
```

TABLE III

```
FORTRAN IV G LEVEL  18                    SEARCH

          SUBROUTINE SEARCH
          COMMON/BLK1/ICNT,ICT,IQ(3),ICLASS,LSUM,LPTR
          COMMON/BLK2/ID(30000)
          INTEGER*2 ID
          DIMENSION IA(5),IB(5),ISTATE(10)
          COMMON/ISCALE/ISCALE
          EQUIVALENCE (IQ(1),K1),(IQ(2),K2),(IQ(3),K3)
          COMMON/ISTAC/ISTAC(10),IUTRN,ITRN
          WRITE(6,1005)      K1,K2,K3
     1005 FORMAT(13I10)
          I = 1
       10 CONTINUE
          IF( ID(I) .EQ. K1)GO TO 20
       15 CONTINUE
          I = ID(I+1)
          IF( I.EQ. 1)GO TO 160
          GO TO 10
       20 CONTINUE
C                          MATCH AT FIRST LEVEL
          J = ID(I+2)
          JI = J
       30 CONTINUE
          IF( ID(J) .EQ. K2)GO TO 40
          J = ID(J+1)
          IF( J .EQ. JI)GO TO 170
          GO TO 30
       40 CONTINUE
C                          MATCH AT SECOND LEVEL
          K = ID(J+13)
          KI = K
       50 CONTINUE
          IF( ID(K) .EQ. K3)GO TO 60
          K = ID(K+1)
          IF( K.EQ. KI)GO TO 180
          GO TO 50
       60 CONTINUE
C                          MATCH AT THIRD LEVEL
          ITRN = ITRN + 1
          IF( ID(K+7) .LE. 0)GO TO 100
          LL = K + 9
          WRITE (6,1005) (ID(L+2), L = K,LL)
          ITOT = 0
          DO 70 IX = 1,5
          IA(IX) = ID(K+1+IX)/181
          IB(IX) = ID(K+1+IX) - IA(IX)*181
          ITOT = ITOT + IA(IX) + IB(IX)
       70 CONTINUE
          DO 80 IX = 1,5
          JX = 2*IX-1
          KX = 2*IX
```

FORTRAN IV G LEVEL 18 SEARCH

```
              ISTATE(JX) = IA(IX) * ISCALE / ITOT
              ISTATE(KX) = IB(IX) * ISCALE / ITOT
           80 CONTINUE
              DO 90 IX = 1,9
              ID(K+1+IX) = -ISTATE(IX)
           90 CONTINUE
              GO TO 120
          100 CONTINUE
              DO 110 IX = 1,9
              ISTATE(IX) = -ID(K+1+IX)
          110 CONTINUE
          120 CONTINUE
              DO 124 IX = 1,10
              ISTAC(IX) = ISTAC(IX) + ISTATE(IX)
          124 CONTINUE
              IOMIT = 1
              ISUM = 0
              DO 130 IX = 1,9
              ISUM = ISUM + ISTATE(IX)
          130 CONTINUE
              ISTATE(10) = ISCALE - ISUM
              WRITE(6,1000) ISTATE
         1000 FORMAT(1X,'ISTATE', 5X, 10I10)
              RETURN
          160 CONTINUE
              WRITE(6,1001)
         1001 FORMAT( ' END OF LEVEL 1 ' )
          165 CONTINUE
              IUTRN = IUTRN + 1
              RETURN
          170 CONTINUE
              WRITE(6,1002)
         1002 FORMAT( ' END OF SECOND LEVEL CHAIN ' )
              GO TO 165
          180 CONTINUE
              WRITE(6,1003)
         1003 FORMAT( ' END OF THIRD LEVEL CHAIN ' )
              GO TO 165
              END
```

What is claimed is:

1. A synthesized cascaded processor system comprising:

a. a trainable nonlinear signal processor, and
b. means for converting said trainable nonlinear signal processor into a plurality of executable nonlinear signal processors in cascade.

2. The system of claim 1 wherein the trainable nonlinear signal processor includes means for storing statistical data derived from applied input signals and said conversion means includes means for linking said executable nonlinear signal processors in cascade according to said stored statistical data.

3. The system of claim 2 including means for applying input signals to the system and means for applying corresponding desired response signals to the trainable nonlinear signal processor.

4. The system of claim 3 wherein the last executable nonlinear signal processor in the cascade includes means for generating at least one actual output signal, said actual output signal being the system's best estimate of a desired response to an applied input signal.

5. The system of claim 1 wherein the trainable nonlinear signal processor is comprised of:

a. a plurality of storage registers,
b. means for arranging and linking said storage registers into an array according to applied input signals, and
c. means for accumulating and storing statistical data in one or more of said storage registers according to applied desired response signals associated with said applied input signals.

6. The system of claim 5 wherein said conversion means includes logic means for relinking said storage registers according to said stored statistical data, thereby providing said plurality of executable nonlinear signal processors in cascade.

7. The system of claim 1 including:

a. means for applying at least one input signal and corresponding desired response associated with such input signal to the system when it is operated in a training mode, and
b. means for applying at least one input signal to the system when it is operated in an execution mode.

8. The system of claim 7 wherein the trainable nonlinear signal processor is comprised of:

a. a multi-level tree-arranged storage array having storage registers arranged in at least a root level and a leaf level, and
b. means for defining a path through the levels of the tree-arranged storage array from said root level to said leaf level according to said applied input signals.

9. The system of claim 8 wherein said leaf level includes means for accumulating and storing the number of occurrences that a corresponding desired response signal is associated with each of said defined paths during training, thereby providing stored statistical data.

10. The system of claim 9 wherein said conversion means includes logic means for relinking said storage registers according to said stored statistical data, thereby providing said plurality of executable nonlinear signal processors in cascade.

11. The system of claim 9 wherein said conversion means includes:

a. means for deriving probability vectors for each level of the trainable nonlinear processor except the leaf level,
b. means for separating each level of said tree-arranged storage array into an executable nonlinear signal processor, and
c. logic means for relinking said storage registers in one of such levels to storage registers in the next separated level according to said probability vectors, thereby cascading said executable nonlinear processors.

12. The system of claim 11 wherein said logic means includes means, in each previous executable processor of the cascade, for directly addressing a filial set of registers in the next executable processor of the cascade.

13. The system of claim 8 including preprocessor means for encoding said at least one input signal into one or more key components, said key components providing means for defining said path through the levels of said tree-arranged storage array.

14. The system of claim 13 including means for sequentially comparing the key components of a present input signal with the key components of input signals which have previously defined paths through the levels of said tree-arranged storage array.

15. The system of claim 14 including means for defining a partial path through remaining levels of the tree-arranged storage array to said leaf level when a partial path has already been defined through one or more of the levels of the tree-arranged storage array.

16. The system of claim 15 wherein said leaf level includes means for accumulating and storing the number of occurrences that a corresponding desired response signal was associated with each of said defined paths during training, thereby providing stored statistical data.

17. The system of claim 16 wherein said conversion means includes logic means for relinking said storage registers according to said stored statistical data, thereby providing said plurality of executable nonlinear signal processors in cascade.

18. A synthesized cascaded processor system comprising:

a. a plurality of storage registers,
b. means for arranging, linking and chaining said storage registers into a tree-structured matrix having nodes in at least a root level and a leaf level including means for defining paths through the levels of the tree-structured matrix from said root level to said leaf level according to applied input signals,
c. means for accumulating and storing statistical data in one or more of said storage registers comprising nodes in said leaf level according to applied desired response signals associated with said applied input signals,
d. means for combining the statistical data stored in registers of said leaf level nodes to derive probability vectors for each level of the tree-structured matrix except the leaf level, and
e. means for merging the nodes of the tree-structured matrix to relink all nodes in the same level having the same probability vector to a common node in the next level of the tree-structured matrix.

19. The system of claim 18 wherein the merger means includes:

a. means for relinking all nodes in the same level having the same probability vector to a common node in the next level of the tree-structured matrix, b. means for chaining all nodes in said next level, previously linked to nodes in said same level having the same probability vector, to said common node, and c. means for eliminating duplicate nodes in said next level chained to said common node.

20. The system of claim 19 wherein said eliminating means includes:

a. means for combining the statistical data stored in the storage registers associated with said duplicate nodes, when said next level is the leaf level, and b. means for storing the combined statistics in storage registers of the first of such duplicate nodes in the leaf level.

21. The system of claim 19 wherein said eliminating means includes:

a. means for chaining all nodes in the level following said next level, linked to said duplicate nodes, to the node in the following level linked to the first of such duplicate nodes in said next level when said next level is not the leaf level, and b. means for eliminating duplicate nodes in said following level chained to the node in said following level which is linked to said first duplicate node in said next level.

22. The system of claim 19 including:

a. means for searching the nodes comprising each level of said relinked tree-structured matrix to find a path to a leaf level node defined according to an applied input signal thereby providing statistical data associated with such applied input signal, and b. means for generating from such provided statistical data an actual output signal, said actual output signal being the system's best estimate of a desired response to such applied input signal.

23. The system of claim 22 including:

a. counter means for generating signals to sequentially operate the system, b. clock means for operating said counter means, and c. time pulse distributor logic circuit means for resetting said counter means and distributing said generated signals to the system.

24. A method of providing a trained and executable system of cascaded nonlinear signal processors comprising the steps of:

a. training a single trainable nonlinear signal processor, and b. converting the trained single nonlinear processor into a plurality of executable nonlinear signal processors in cascade.

25. The method of claim 24 wherein the training step includes storing statistical data derived from applied input signals and the conversion step includes linking said executable nonlinear signal processors in cascade according to said stored statistical data.

26. The method of claim 25 including the step of applying input signals and corresponding desired response signals to the trainable nonlinear signal processor.

27. The method of claim 24 wherein the training step includes:

a. arranging and linking a plurality of storage registers into an array according to applied input signals, and b. accumulating and storing statistical data in one or more of said storage registers according to applied desired response signals associated with said applied input signals.

28. The method of claim 27 wherein said conversion step includes relinking said storage registers according to said stored statistical data, thereby providing said trained and executable system of cascaded nonlinear signal processors.

29. The method of claim 24 including the step of applying at least one input signal and corresponding desired response associated with such input signal to the single trainable nonlinear processor.

30. The method of claim 29 wherein the training step includes:

a. arranging storage registers into a multi-level tree-arranged storage array having at least a root level and a leaf level, and b. defining a path through the levels of the tree-arranged storage array from said root level to said leaf level according to said applied input signals.

31. The method of claim 30 wherein the training step further includes the steps of accumulating and storing the number of occurrences that a corresponding desired response signal is associated with each of said defined paths, thereby providing stored statistical data.

32. The method of claim 31 wherein said conversion step includes relinking said storage registers according to said stored statistical data, thereby providing said trained and executable system of cascaded nonlinear signal processors.

33. The system of claim 31 wherein said conversion step includes:

a. deriving probability vectors for each level of the trainable nonlinear processor except the leaf level, and b. separating each level of the tree-arranged storage array into a trained and executable nonlinear signal processor, and c. relinking said storage registers in one of such levels to storage registers in the next separated level according to said derived probability vectors, thereby cascading said trained and executable nonlinear processors.

34. The method of claim 33 wherein the relinking includes storing in a register of said one level the address of the entry register of a filial set of registers in said next level, thereby providing direct addressing between said trained and executable nonlinear processors.

35. The method of claim 34 including the step of executing said trained and executable nonlinear processors.

36. The method of claim 35 wherein the execution step includes:

a. following a defined path through the levels of the tree-arranged storage array from said root level to said leaf level according to an applied input signal, and b. generating from said statistical data stored in said leaf level at least one actual output signal which is the system's best estimate of a desired response to an applied input signal.

37. The method of claim 30 including the step of encoding said at least one input signal into a plurality of key components, said key components being utilized to define said path through the levels of said tree-arranged storage array.

38. The method of claim 37 wherein said training step includes sequentially comparing the key components of a present input signal with the key components of input signals which have previously defined paths through the levels of said tree-arranged storage array whereby all or part of a previously defined path is followed according to said present input signal.

39. The method of claim 38 wherein said training step further includes defining a partial path through remaining levels of the tree-arranged storage array to said leaf level when a previously defined path is partially followed through one or more of the levels of the tree-arranged storage array.

40. The method of claim 39 wherein said training step further includes accumulating and storing the number of occurrences that a corresponding desired response signal was associated with each defined path during training, thereby providing stored statistical data.

41. The method of claim 40 wherein said conversion step includes relinking said storage registers according to said stored statistical data, thereby providing said trained and executable system of cascaded nonlinear signal processors.

42. The method of claim 24 wherein said training step includes:

a. arranging, linking and chaining a plurality of storage registers into a tree-structured matrix having nodes in at least a root level and a leaf level,
b. defining paths through the levels of the tree-structured matrix from said root level to said leaf level according to applied input signals, and
c. accumulating and storing statistical data in one or more of said storage registers comprising nodes in said leaf level according to applied desired response signals associated with said applied input signals.

43. The method of claim 42 wherein the conversion step includes:

a. combining the statistical data stored in registers of said leaf level nodes to derive probability vectors for each level of the tree-structured matrix except the leaf level, and
b. merging the nodes of the tree-structured matrix to relink all nodes in the same level having the same probability vector to a common node in the next level of the tree-structured matrix.

44. The method of claim 43 wherein the merger step includes:

a. relinking all nodes in the same level having the same probability vector to a common node in the next level of the tree-structured matrix,
b. chaining all nodes in said next level, previously linked to nodes in said same level having the same probability vector, to said common node, and
c. eliminating duplicate nodes in said next level chained to said common node.

45. The method of claim 44 wherein said elimination step includes:

a. combining statistical data stored in the storage registers associated with said duplicate nodes, when said next level is the leaf level, and
b. storing the combined statistics in storage registers of the first of such duplicate nodes in the leaf level.

46. The method of claim 44 wherein said elimination step includes:

a. chaining all nodes in the level following said next level, linked to said duplicate nodes, to the node in the following level linked to the first of such duplicate nodes in said next level when said next level is not the leaf level, and
b. eliminating duplicate nodes in said following level chained to the node in said following level which is linked to said first duplicate node in said next level.

47. The method of claim 44 including:

a. searching the nodes comprising each level of said relinked tree-structured matrix to find a path to a leaf level node defined according to an applied input signal, whereby statistical data associated with such applied input signal is provided, and
b. generating from such provided statistical data an actual output signal which is the system's best estimate of a desired response to such applied input signal.

* * * * *